United States Patent [19]

Koyama et al.

[11] Patent Number: 4,580,229
[45] Date of Patent: Apr. 1, 1986

[54] METHOD AND APPARATUS FOR CONTROL OF AN ARTICULATED ROBOT

[75] Inventors: Hideo Koyama; Fumio Noguchi, both of Takarazuka; Shigeki Fujinaga, Minoo; Hirotoshi Yamamoto, Akashi; Takahiko Kondo, Kobe, all of Japan

[73] Assignee: Shin Meiwa Industry Co., Ltd., Japan

[21] Appl. No.: 540,177

[22] Filed: Oct. 7, 1983

[30] Foreign Application Priority Data

Oct. 15, 1982 [JP] Japan ................... 57-182002

[51] Int. Cl.$^4$ ............................................. G06F 15/50
[52] U.S. Cl. .................... 364/513; 364/731; 364/757
[58] Field of Search .................... 364/513, 731, 757

[56] References Cited

U.S. PATENT DOCUMENTS

| | | | |
|---|---|---|---|
| 3,763,358 | 10/1973 | Cargille | 364/731 |
| 4,156,835 | 5/1979 | Whitney et al. | 364/513 |
| 4,380,696 | 4/1983 | Masaki | 364/513 |

Primary Examiner—Jerry Smith
Assistant Examiner—Allen MacDonald
Attorney, Agent, or Firm—Darby & Darby

[57] ABSTRACT

An apparatus for controlling an articulated robot comprises coordinate transforming portions (5 to 8 and 18) and a calculating portion (9) for equation of motion. The coordinate transforming portions (5 to 8 and 18) perform coordinate transformation between the Cartesian coordinate system and the articular system with respect to the position data, speed data, acceleration data and force data. The coordinate transforming portions (5 to 8 and 18) are respectively formed of hardware and accordingly, the calculation speed therein is extremely high as compared with the case using software. The calculating portion (9) for equation of motion solves the inverse problem of an equation of motion using the speed data (dα) and acceleration data (d²α) in the articular coordinate system, whereby predictive control is performed. The calculating portion (9) for equation of motion is also formed of hardware and accordingly, the calculation speed therein is extremely high. In addition, the above described controlling apparatus further comprises a force feedback loop, so that the RCC (Remote Center of Compliance) can be realized in the arms per se of a robot.

10 Claims, 45 Drawing Figures

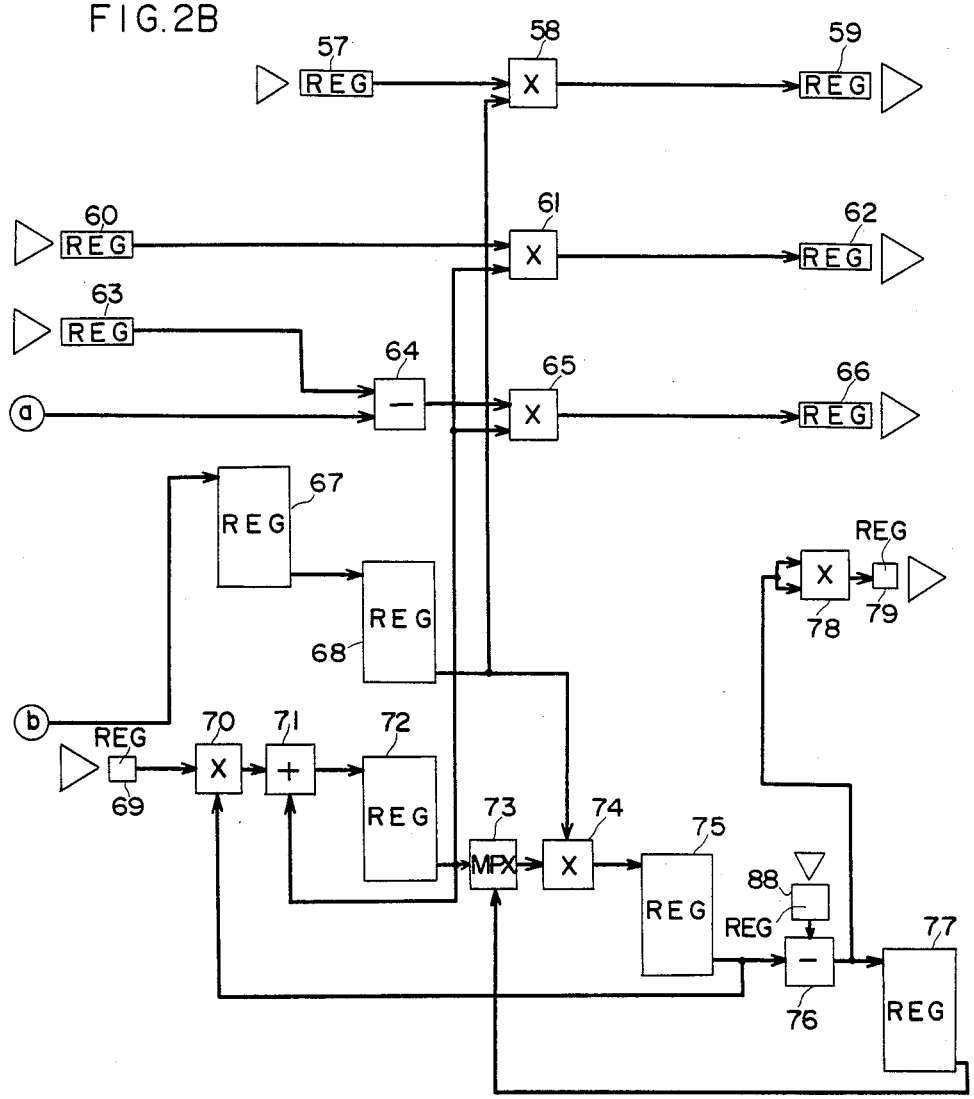

$$\vec{X}_i = F(\vec{a}_i)$$

$$d\vec{X}_{i+1} = \vec{X}_{i+1} - \vec{X}_i$$

$$d\vec{a}_{i+1} = [J(\vec{a}_i)]^{-1} \cdot d\vec{X}_{i+1}$$

$$\vec{a}_{i+1} = \vec{a}_i + d\vec{a}_{i+1}$$

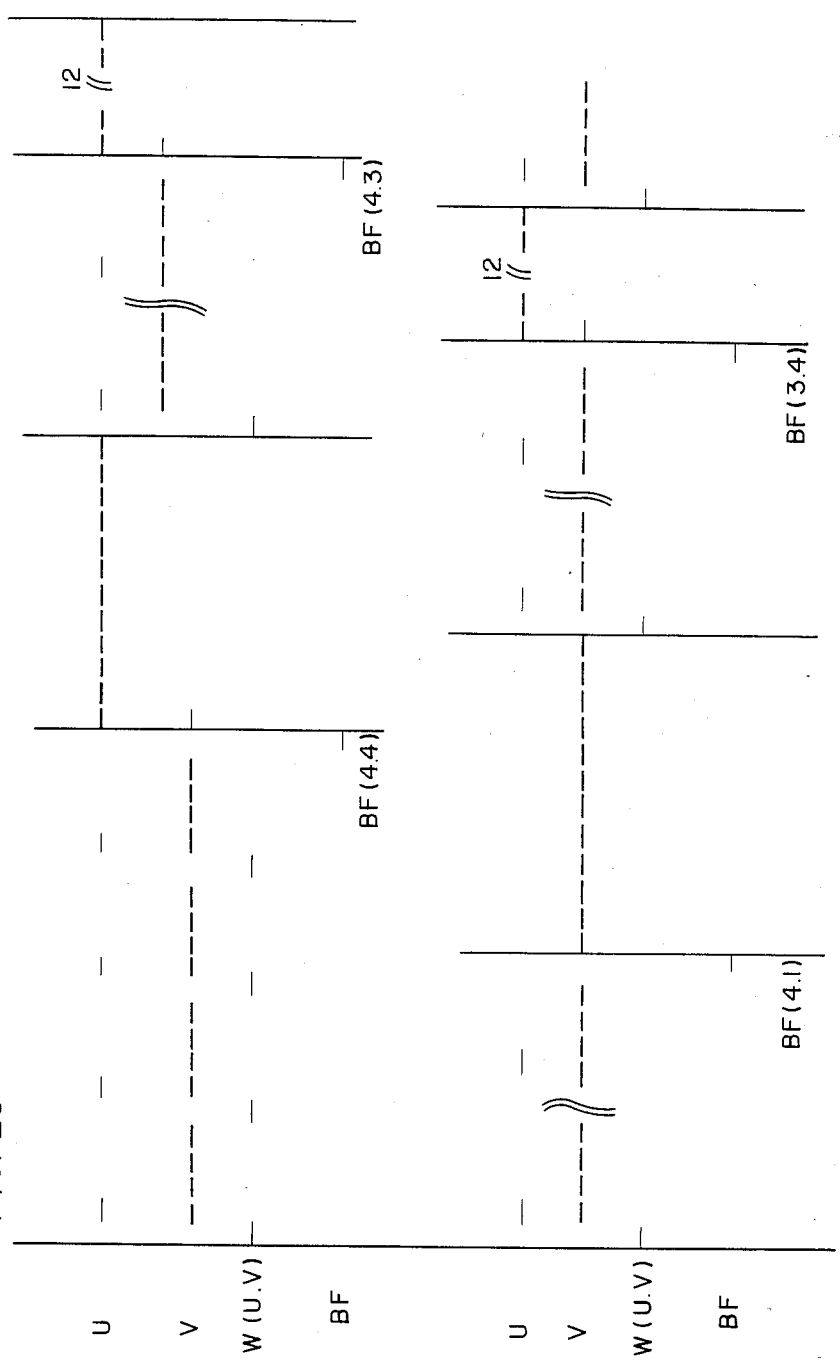

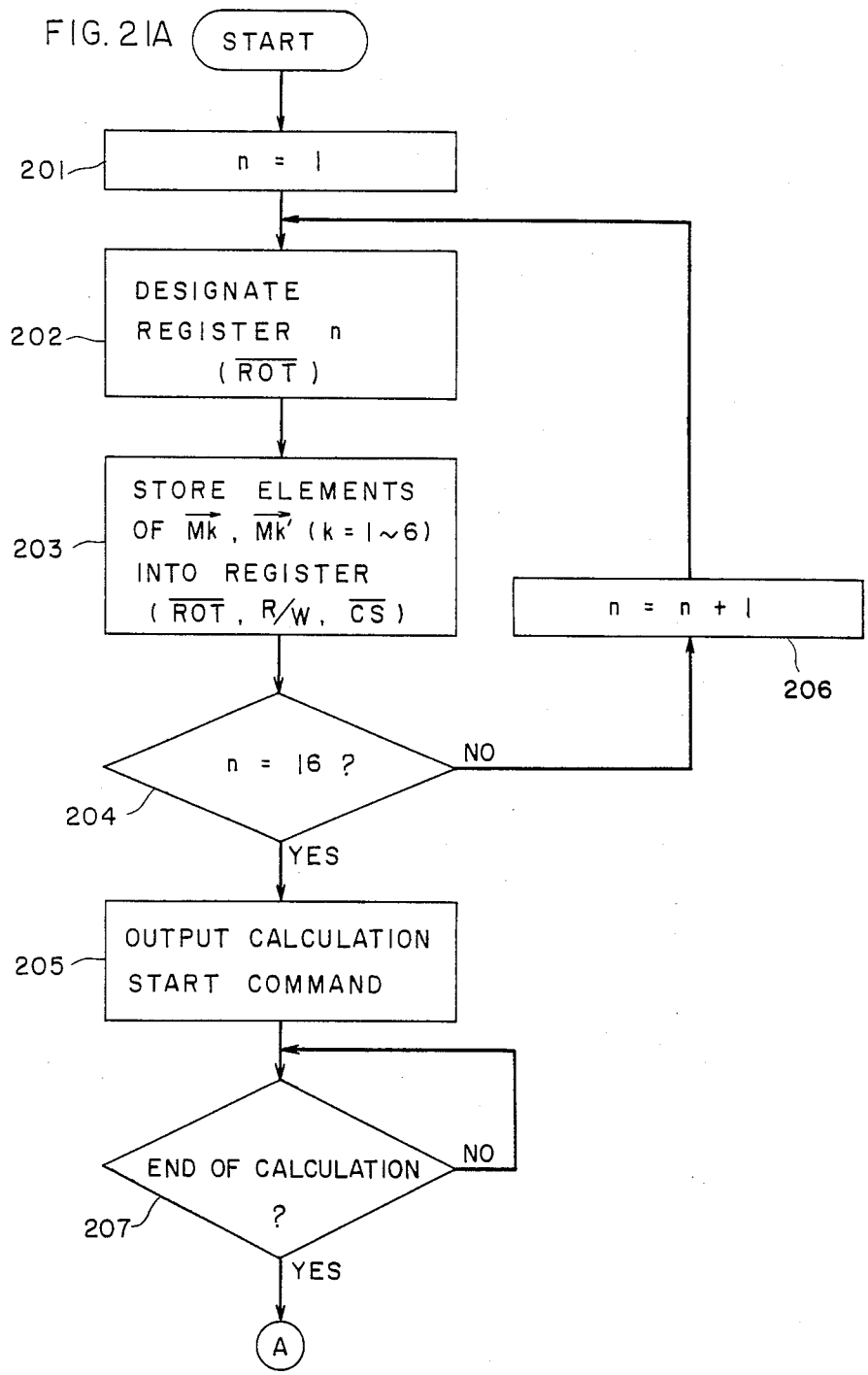

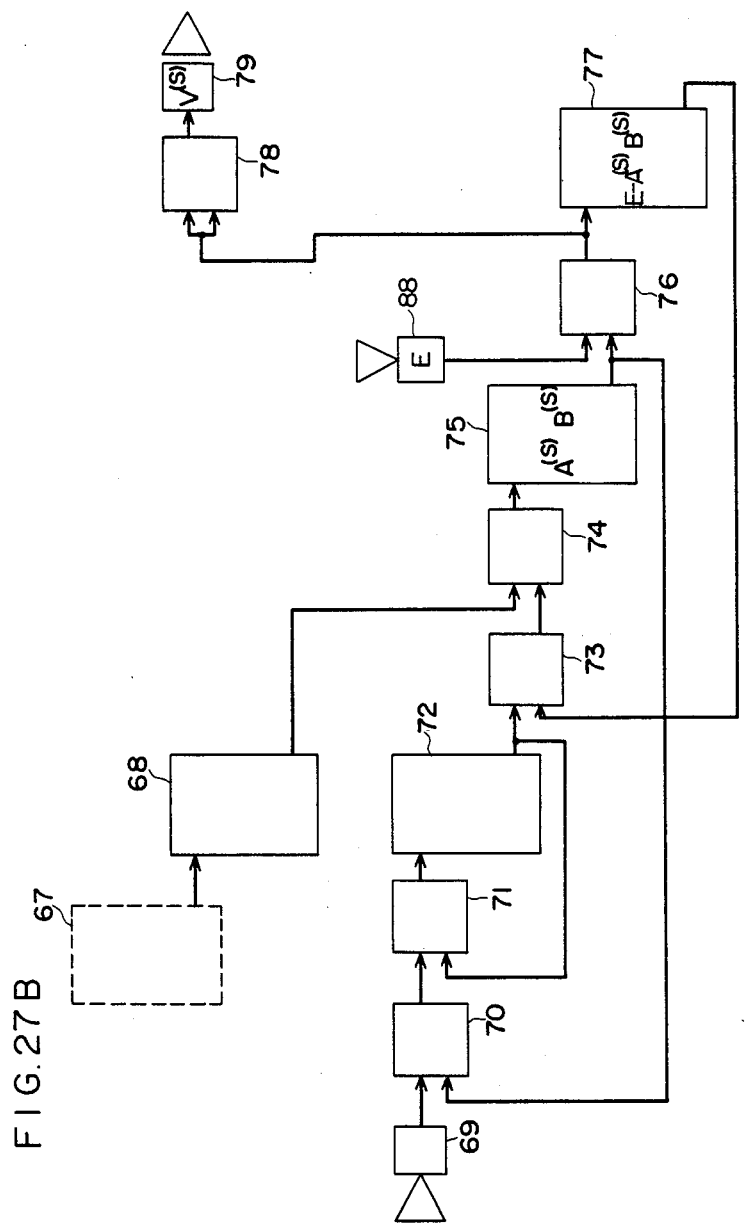

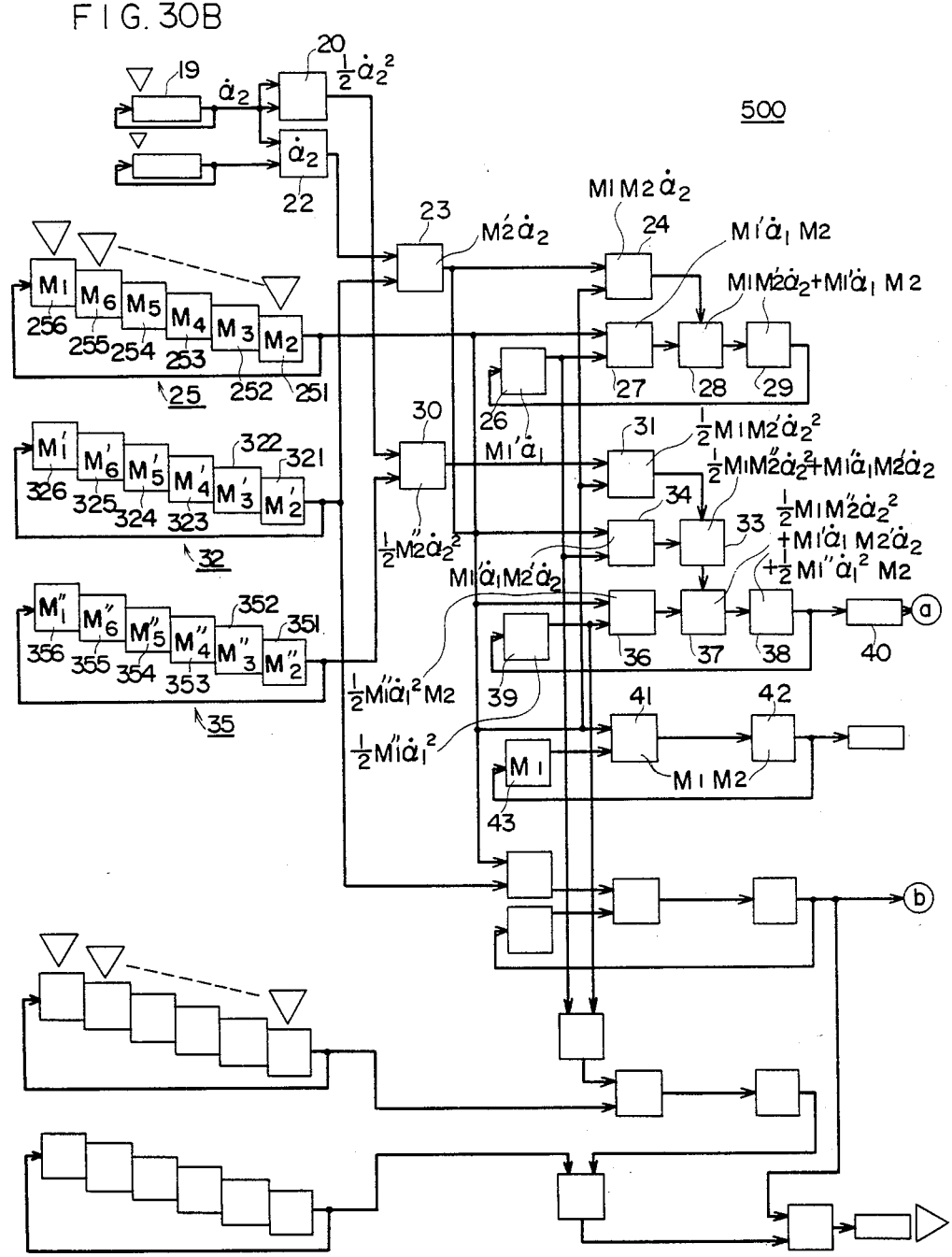

METHOD AND APPARATUS FOR CONTROL OF AN ARTICULATED ROBOT

BACKGROUND OF THE INVENTION

1. Field of the Invention

The present invention relates to a method and apparatus for controlling an articulated robot and particularly to a method and apparatus for controlling an articulated robot in which coordinate transformation between the Cartesian coordinate system and the articular coordinate system is performed not only for the position data but also for the speed data and the acceleration data and by solution of an inverse problem of an equation of motion, predictive control can be made and furthermore, force control can be realized.

2. Description of the Prior Art

An articulated robot has an excellent advantage that the area required for its installation is small and a large working region is provided. However, such a robot in which coordinate transformation is needed for control of its motions has a disadvantage that calculation for control, particularly coordinate transformation takes much time, which will be explained hereinafter in more detail.

First, coordinate systems will be described. As coordinate systems used for control of an articulated robot, there are a Cartesian coordinate system (defined by components with respect to three axes intersecting perpendicularly) and an articular coordinate system (defined by the angle of each articulation) as opposed to the Cartesian coordinate system and also an absolute coordinate system (a stationary coordinate system) and a hand coordinate system (fixed to each hand and moving according to the motion of each hand) as opposed to the absolute coordinate system, as shown in Table 1. In the present specification, the Cartesian coordinte system is also referred to as an XYZ coordinate system or an X coordinate system; the articular coordinate system is also referred to as an angular coordinate system or an $\alpha$ coordinate system; the hand coordinate system is also referred to as a local coordinate system.

TABLE 1

| Cartesian coordinate system | = | XYZ coordinate system, X coordinate system |
|---|---|---|
| Articular coordinate system | = | Angular coordinate system, $\alpha$ coordinate system |
| Absolute coordinate system | | |
| Hand coordinate system | = | Local coordinate system |

Now, the necessity of coordinate transformation will be explained. Let us taken an example. Processing lines of a work piece to be processed by an industrial robot, for example, welding lines for arc welding are provided generally in the perpendicularly intersecting directions and in many cases, a processing operation is succesively performed along these lines. In an articulated robot, in order to move an object to be controlled (an end effecter) such as a welding torch, for example, along such processing lines of a work piece, such lines are divided into small sections, the positions of the respective dividing points being established, and interpolation is made with respect to the intervals of the dividing points so that commands are given to move the object to be controlled to the position concerned. Such lines are represented in the form of a linear equation in the Cartesian coordinate system, whereas such lines are represented as a non-linear complicated equation in the articular coordinate system. Therefore, the position data for commanding movement of an object to be controlled is first calculated in the Cartesian coordinate system simply and advantageously and after that, the position data in the Cartesian coordinate system has to be transformed into the articular coordinate system so as to be the command data for moving each articulation axis. Reversely, it is also necessary to transform the position data in the articular coordinate system into the position data in the Cartesian coordinate system. To sum up, in an articulated robot, it is necessary to make coordinate transformation between the Cartesian coordinate system and the articular coordinate system with respect to the position data and the like. The coordinate transformation, particularly the transformation from the Cartesian coordinate system into the articular coordinate system needs a considerably large amount of calculations, which takes much time.

In the present specification, the articulations include not only rotating or revolving portions but also sliding portions. Such articulations are also referred to as axes or degrees of freedom.

Then, typically two systems have been proposed conventionally in order to reduce the calculation time. One is an approximate coordinate transformation control system disclosed, for example, in the Japanese Patent Laying-Open Gazette No. 100561/1978, where an approximate equation is obtained from a precise coordinate transforming equation and based on the approximate equation, the respective articulations of an articulated robot are rotated. According to this system, the calculation time can be certainly reduced, but a very significant important error (7 mm, for example) is caused and it cannot be used for precise positioning control. The other is a system disclosed, for example, in the Japanese Patent Laying-Open Gazette No. 121362/1978, where if a robot has five or six degrees of freedom, coordinate transformation is not made simultaneously with respect to all the axes but only three degrees of freedom, for example, out of these are simultaneously controlled based on a precise coordinate transformation equation. According to the latter system, positioning precision is improved, but the functions to be performed or the positioning manners are necessarily decreased. Aside from the above described two systems, a high speed device such as a Josephson device might be used as a calculation device, but such a device is far from practical and costs much. Therefore, first of all, a simplified method and apparatus for coordinate transformation by which high speed calculation can be made have been desired.

On the other hand, for position control, feedback control is conventionally applied in principle. In the feedback control, driving power is generated only after a difference is made between a desired position and an actual position. Particularly, if the inertia of the arms of a robot and the inertia of an end effecter take large values, deviation between a desired position and an actual position of the end effecter becomes large. In order to minimize the above stated deviation, the load by which the position deviation is multiplied (feedback gain) or the maximum driving torque might be made larger, but there was a limit in stability of the feedback control. Particularly, a serious problem such as a deviation in the path of an end effecter would be caused in case of control of more than two axes. Besides the above stated deviation due to the inertia following the linear movement of the arms, a difference between the actual movement and the desired movement of a robot would be made due to the force generated by rotational movement of the other arm such as centrifugal force, Coriolis' force and the like or due to the gravity generated by the mass of the arms per se and the end effecter, and such deviation became a serious problem in an apparatus requiring high speed operation and high precision. This problem can be solved only by a method in which casuality between a desired value and a current value, that is, between a desired position as a control input and a present position as a control result is predicted in the form of an equation of motion so as to apply control inputs causing desired results. This method is called feedforward control, or predictive control or optimum control. Therefore, secondly, a predictive control method and an apparatus for it by which an end effecter can move in a desired path have been desired.

Furthermore, force which is generated in the arms of a robot controlled only by feedback of the positions when the robot copes with any obstacle is changed due to the position deviation in the direction of the force. However, in applied processes such as assembling, surface finishing and the like, it has been required that by applying a fixed force in a certain direction, position control should be made in a direction perpendicular to the above stated direction, the direction being defined not by the design of a mechanism of a robot, but by an object to be processed. Accordingly, it is necessary to make selection between position control and force control in the coordinate system defined by an arbitrary object to be processed or to make selection with respect to the load. Therefore, thirdly, an apparatus for performing the above stated operations and means for converting the force in the coordinate system defined by an object to be processed into the force (torque) in the coordinate system defined by a robot mechanism have been desired. In addition, particularly in assembling operation, there is a phenomenon in which insertion of parts becomes easy by soft (compliant) positioning in one direction out of several directions including a rotating direction in the coordinate system defined by the parts to be inserted. This phenomenon is applied to a mechanism of a special end effecter, which is realized as an RCC (Remote Center of Compliance). Three different types of RCC are disclosed in the U.S. Pat. Nos. 4,098,001 and 4,155,169 and the U.S. patent application Ser. No. 140,768 filed on Apr. 16, 1980. These U.S. Patents and Patent Application are incorporated herein by reference thereto. Besides, it has been requested to provide an RCC in the arms per se, not in a special end effecter.

SUMMARY OF THE INVENTION

Briefly, the present invention intends to fulfill the above described first to third requests and for this purpose, the present invention comprises a method and apparatus for performing the operations described below.

First, with respect to the first request, a Jacobian $J(\vec{\alpha})$ is calculated at least in hardware provided for this purpose and calculating operation for coordinate transformation from the position data $\alpha$ in the articular coordinate system to the position data $\vec{X}$ in the Cartesian coordinate system is also performed therein. In addition, preferably, an Jacobian inverse $[J(\vec{\alpha})]^{-1}$ is calculated in hardware and calculating operation for coordinate transformation from the speed data $d\vec{X}$ in the Cartesian coordinate system to the speed data $d\vec{\alpha}$ in the articular coordinate system is also performed therein.

With respect to the second request, predictive control is performed by solding the inverse problem of an equation of motion. Since an equation of motion is represented in the articular coordinate system, data in the articular coordinate system is required for solving it. Therefore, operation of transforming the speed data $d\vec{X}$ in the Cartesian coordinate system to the speed data $d\vec{\alpha}$ in the articular system and operation of transforming the acceleration data $d^2\vec{X}$ in the Cartesian coordinate system to the acceleration data $d^2\vec{\alpha}$ in the articular coordinate system are performed. These transforming operations and the operation of solving the inverse problem of an equation of motion are also performed in hardware.

Furthermore, with respect to the third request, force feedback control is performed. For this purpose, transformation from the force data $\vec{F}$ in the Cartesian coordinate system to the torque data $\vec{\tau}$ in the articular coordinate system is performed. This transforming operation is also performed in hardware.

One aspect of the present invention is that coordinate transformation can be performed at a extremely high speed since coordinate transformation is performed in hardware of a simple structure. Thus, the calculation time is so much reduced that substantial change may be caused in quality of control.

Another aspect of the present invention is that the time required for coordinate transformation in a microcomputer is extremely shortened since coordinate transformation is performed in hardware of a simple structure. Accordingly, even if a microcomputer of high speed performance is not used, an extremely accurate coordinate transformation is realized. In addition, using the microcomputer, further different functions can be performed easily.

A further aspect of the present invention is that since a calculating circuit for coordinate transformation functions to simply iterate almost the same operations many times, the structure of the calculating circuit becomes simplified and adjustment can be made easily with respect to the change or the increase or decrease in degrees of freedom to be controlled. In other words, the present invention can be said to have wide universality, because it is only necessary to increase or decrease calculating functions to be applied in the calculating circuit such adjustment and modification is hardly needed as to the software (program) of a microcomputer. Therefore, an apparatus in accordance with the present invention can easily comply with the change in the kinds or number of degrees of freedom.

Still a further aspect of the present invention is that feedforward control can be performed by solution of the inverse problem of an equation of motion. Accordingly, control can be made such that an end effecter moves in a desired path.

Still a further aspect of the present invention is that position feedback is applied in the Cartesian coordinate system. Generally, a very long time of calculation is required for transformation from the position data $\vec{X}$ in the Cartesian coordinate system to the position data $\vec{\alpha}$ in the articular coordinate system and it is almost impossible to perform such transformation on a real-time basis. However, in the system of the present invention, such coordinate transformation is not needed.

Still a further aspect of the present invention is that in a total system, selection between the force control and the position control can be made in the Cartesian system. Accordingly, control such as RCC can be realized in a robot per se.

Still a further aspect of the present invention is that if a controlling apparatus in accordance with the present invention is applied in an articulated robot using a direct drive motor in its articulations, a remarkable effect can be attained in predictive control. This is because in a direct drive motor, there is little resistance or irregular looseness, while a conventional harmonic drive motor produces a considerable amount of resistance or irregular looseness, that cannot be included in an equation of motion.

These objects and other objects, features, aspects and advantages of the present invention will become more apparent from the following detailed description of the present invention when taken in conjunction with the accompanying drawings.

BRIEF DESCRIPTION OF THE DRAWINGS

FIGS. 2A and 2B are block diagrams showing in detail the structure of a total system. The right end of FIG. 2A is connected to the left end of FIG. 2B.

FIGS. 18 to 20 are views showing processes of multiplication of matrices, explaining the principle of a shift timing generating circuit. Particularly, FIG. 18 shows a principle of multiplication of matrices; FIG. 19 shows shifting operation in the calculating processes; FIG. 20 shows a timing chart of the shift timing signals necessary for multiplication of matrices.

FIGS. 21A and 21B are flow charts for explaining the operation of an embodiment of the present invention.

FIGS. 27A to 27D are views for explaining the operation of a Jacobian inverse calculating portion.

FIGS. 30A and 30B are views for explaining the operation of a $\Sigma\Sigma$ calculating portion.

DESCRIPTION OF THE PREFERRED EMBODIMENTS

In order to fulfill the above stated first to third requests, in brief, the following measures should be taken.

With respect to the first request, Jacobian $J(\vec{\alpha})$ which is a coordinate transformation matrix between the absolute coordinate system and the articular coordinate system needs to be obtained at least in hardware provided for this purpose and calculation for coordinate transformation from $\vec{\alpha}$ to $\vec{X}$ has to be performed. More preferably, a Jacobian inverse $[J(\vec{\alpha})]^{-1}$ which is an inverse matrix of the Jacobian is obtained in hardware, and further calculation for coordinate transformation from $d\vec{X}$ to $d\vec{\alpha}$ is also performed.

Next, with respect to the second request, an inverse problem of an equation of motion needs to be solved so that predictive control can be performed. Since the equation of motion is represented in the $\alpha$ coordinate system, data in the $\alpha$ coordinate system is needed to solve it. For this purpose, transformation from $d\vec{X}$ to $d\vec{\alpha}$ and transformation from $d^2\vec{X}$ to $d^2\vec{\alpha}$ are performed.

Further, with respect to the third request, feedback control of force needs to be performed. For this purpose, transformation from the force $\vec{F}$ in the $X$ coordinate system into the torque $\vec{\tau}$ in the $\alpha$ coordinate system is performed.

Formation of a Total System

Figure 1A:
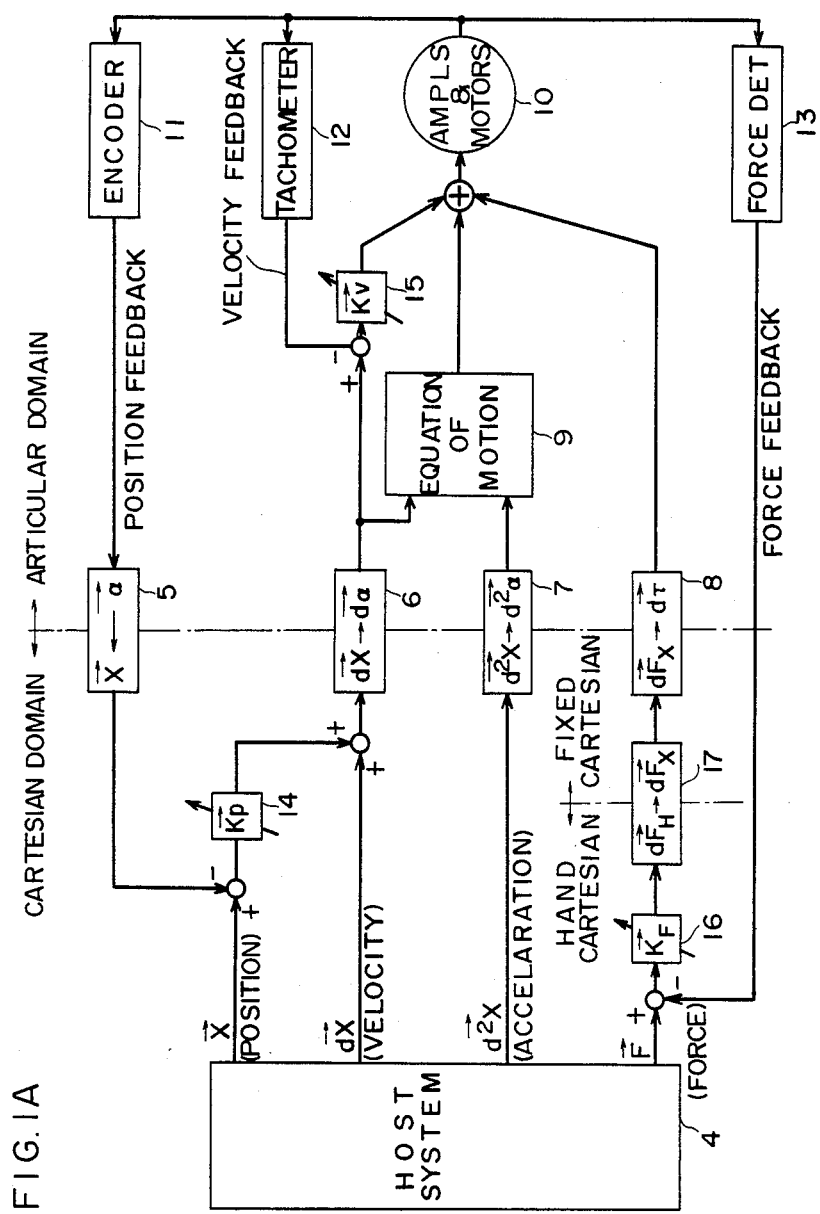
FIGS. 1A and 1B are block diagrams roughly showing the structure of a total system of apparatus for controlling an articulated robot, respectively.
Figure 1B:
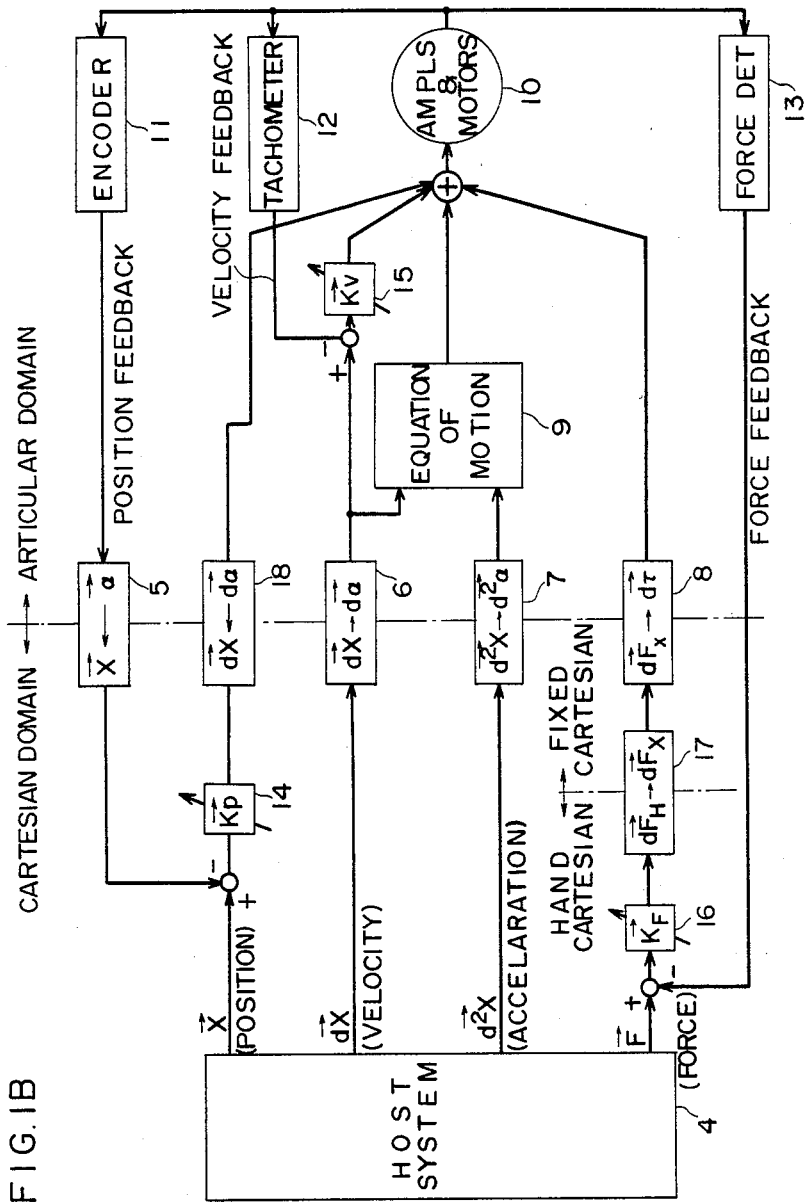

The outline of a formation of a total system in which all of the above described operations can be applied will be described below. FIGS. 1A and 1B are respectively block diagrams roughly showing a formation of a total system of a control apparatus of an articulated robot. In these drawings, the left side from a dot-and-dash line is a portion in which the amount represented in the Cartesian coordinate system is treated and the right side is a portion in which the amount represented in the articular coordinate system is treated.

First, description is made of a system shown in FIG. 1A. From a host system 4, desired values in the Cartesian coordinate system at every moment are outputted in the form of matrices. The host system 4 comprises a microcomputer which is not shown. The desired values outputted from the hose system 4 are classified into two groups: desired values as to the path end desired values as to the pressing force. A desired value as to the path includes position instructing data $\vec{X}$, speed instructing data $d\vec{X}$ and acceleration instructing data $d^2\vec{X}$. A desired value as to the pressing force includes force instructing data $\vec{F}$. The position instructing data $\vec{X}$ from the host system 4 is added as a correction to the below described speed instructing data through a gain adjustment process in a gain adjustment portion 14 after the below described feedback data is subtracted. The speed instructing data $d\vec{X}$ from the host system 4 is added to the correction from the gain adjustment portion 14 and transformed into the articular coordinate system in a coordinate transforming portion 6 so as to be supplied to a calculating portion 9 for equation of motion. The speed instructing data from the coordinate transforming portion 6 is subjected to a gain adjustment process in a gain adjustment portion 15 after the below described speed feedback signal is subtracted, and the result is supplied to an articulation portion 10 as a correction. The acceleration instructing data $d^2\vec{X}$ from the host system 4 is transformed into the articular coordinate system in a coordinate transforming portion 7 so as to be supplied to the calculating portion 9 for equation of motion. In the calculating portion 9 for equation of motion, an inverse problem of an equation of motion is solved based on the supplied speed data and acceleration data, and torque data to be supplied to each articulation is outputted so that this data is supplied to the articulation portion 10. The articulation portion 10 includes an amplifier and a motor. The position of the articulation portion 10 is detected by an encoder 11. From the encoder 11, position feedback data is outputted so as to be transformed into the Cartesian coordinate system in the coordinate transforming portion 5 and the data thus transformed is subtracted from the position instructing data $\vec{X}$ from the host system 4, as described above. In the same manner, the speed of the articulation portion 10 is detected by a tachometer 12 and the tachometer 12 outputs speed feedback data, which is subtracted from the speed instructing data from the coordinate transforming portion 6 as described above. On the other hand, the host system 4 outputs force instructing data $\vec{F}$, from which the below described force feedback data is subtracted so that deviation between the two data is caluclated and gain adjustment is made in a gain adjustment portion 16. Force deviation $d\vec{F}_H$, which is represented in the hand coordinate, is transformed into the absolute coordinate system in a coordinate transforming portion 17 so as to be $d\vec{F}_X$. This $d\vec{F}_X$ is further transformed into the articular coordinate system in a coordinate transforming portion 8 to become $d\vec{\tau}$, which is supplied to the articulation portion 10 as a correction. Force generated in the articulation portion 10 is detected by a force detector 13, which outputs force feedback data as described above.

Next, the system shown in FIG. 1B will be described principally with respect to the difference from the FIG. 1A system. In the FIG. 1A system, position feedback is applied to the articulation portion 10 through the calculating portion 9 for equation of motion. However, this system in FIG. 1A has a disadvantage that the effect of feedback is not shown clearly since the calculating portion 9 for equation of motion includes complicated elements. On the other hand, in the FIG. 1B system, position feedback is applied directly to the articulation portion 10, not through the calculating portion 9. This system needs additionally a coordinate transforming portion 18 but has an advantage that the effect of feedback is produced clearly.

The features of the systems shown in FIGS. 1A and 1B will be briefly described below. First, coordinate transforming portions 5 to 8 are provided so that coordinate transformation between the Cartesian coordinate system and the articular coordinate system is performed. Secondly, there are provided a feedforward line from the host system 4 to the calculating portion 9 for equation of motion through the coordinate transforming portion 6 and a feedforward line from the host system 4 to the calculating portion 9 for equation of motion through the coordinate transforming portion 7. Thirdly, position feedback is applied in the Cartesian coordinate system. Accordingly, it is not needed to make coordinate transformation from the position data $\vec{X}$ in the Cartesian coordinate system into the position data $\vec{a}$ in the articular coordinate system, calculation for such transformation being almost impossible. In addition, speed feedback is also applied. Fourthly, there is provided a force feedback control line from the host system 4 to the articulation portion 10 through the coordinate transforming portion 8.

Figure 2A:
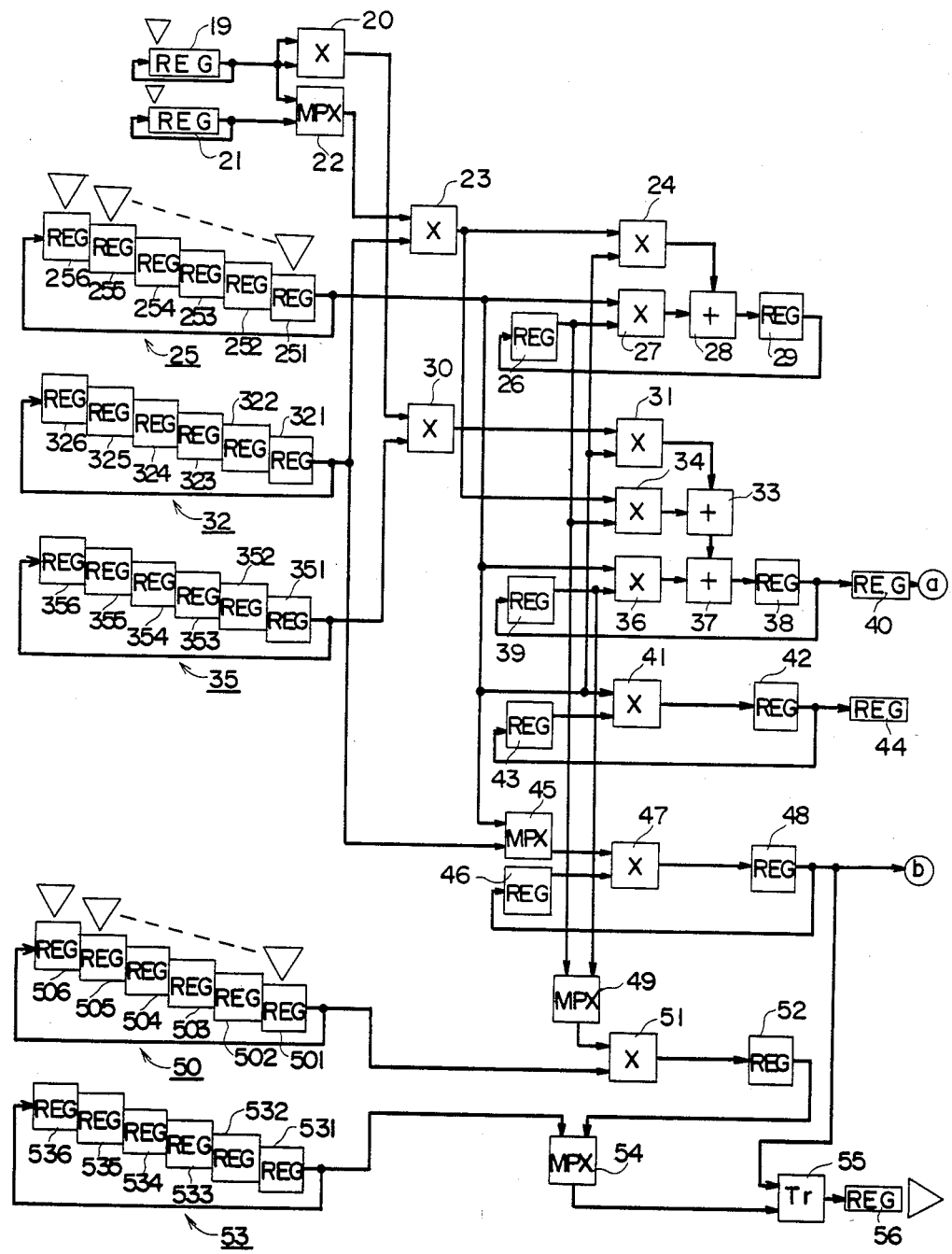

The characteristic portions in the systems in FIGS. 1A and 1B will be described in detail in the following. FIGS. 2A and 2B are block diagrams respectively showing in detail a formation of the total system. The right end of FIG. 2A is connected to the left end of FIG. 2B. These block diagrams correspond to the coordinate transforming portions 5 to 8 and the calculating portion 9 for equation of motion shown in FIGS. 1A and 1B. Now, a detailed description will be made of FIGS. 2A and 2B in the following.

General Theory of Coordinate Transformation

Figure 3:
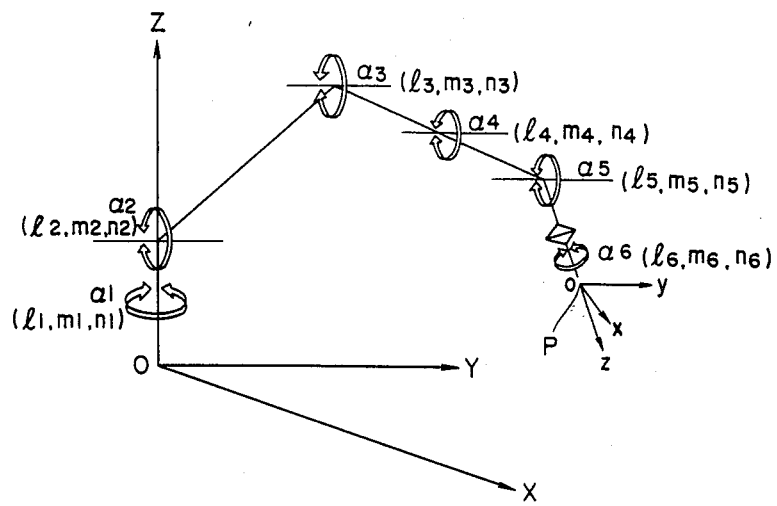
FIGS. 3 to 5 are typical views for explaining coordinate transformation in an articulated robot.

First, the general theory of coordinate transformation is explained. FIG. 3 is a typical view of an articulated robot. In an example of FIG. 3, an articulated robot has six degrees of freedom, or articulation angles $\alpha_1$, $\alpha_2$, $\alpha_3$, $\alpha_4$, $\alpha_5$ and $\alpha_6$. The absolute coordinate system is defined as XYZ and the local coordinate system (hand coordinate system) of an end effecter is defined as xyz.

The relation between the position vector $\vec{Y}$ in the absolute coordinate system and the position vector $\vec{y}$ in the hand coordinate system is obtained by the following equation, if the coordinate transformation matrix between them is represented as M.

$$\vec{Y} = M \times \vec{y} \tag{1}$$

The transformation matrix M is obtained by the following equation (2).

$$M = \begin{bmatrix} 1 & 0 & 0 & l_1 \\ 0 & 1 & 0 & m_1 \\ 0 & 0 & 1 & n_1 \\ 0 & 0 & 0 & 1 \end{bmatrix} \times \begin{bmatrix} C_1 & -S_1 & 0 & 0 \\ S_1 & C_1 & 0 & 0 \\ 0 & 0 & 1 & 0 \\ 0 & 0 & 0 & 1 \end{bmatrix} \times \begin{bmatrix} 1 & 0 & 0 & l_2 \\ 0 & 1 & 0 & m_2 \\ 0 & 0 & 1 & n_2 \\ 0 & 0 & 0 & 1 \end{bmatrix} \times$$

$$\begin{bmatrix} C_2 & 0 & -S_2 & 0 \\ 0 & 1 & 0 & 0 \\ S_2 & 0 & C_2 & 0 \\ 0 & 0 & 0 & 1 \end{bmatrix} \times \begin{bmatrix} 1 & 0 & 0 & l_3 \\ 0 & 1 & 0 & m_3 \\ 0 & 0 & 1 & n_3 \\ 0 & 0 & 0 & 1 \end{bmatrix} \times \begin{bmatrix} C_3 & 0 & -S_3 & 0 \\ 0 & 1 & 0 & 0 \\ S_3 & 0 & C_3 & 0 \\ 0 & 0 & 0 & 1 \end{bmatrix} \times$$

$$\begin{bmatrix} 1 & 0 & 0 & l_4 \\ 0 & 1 & 0 & m_4 \\ 0 & 0 & 1 & n_4 \\ 0 & 0 & 0 & 1 \end{bmatrix} \times \begin{bmatrix} C_4 & -S_4 & 0 & 0 \\ S_4 & C_4 & 0 & 0 \\ 0 & 0 & 1 & 0 \\ 0 & 0 & 0 & 1 \end{bmatrix} \times \begin{bmatrix} 1 & 0 & 0 & l_5 \\ 0 & 1 & 0 & m_5 \\ 0 & 0 & 1 & n_5 \\ 0 & 0 & 0 & 1 \end{bmatrix} \times$$

-continued $$\begin{bmatrix} C_5 & 0 & -S_5 & 0 \\ 0 & 1 & 0 & 0 \\ S_5 & 0 & C_5 & 0 \\ 0 & 0 & 0 & 1 \end{bmatrix} \times \begin{bmatrix} 1 & 0 & 0 & l_6 \\ 0 & 1 & 0 & m_6 \\ 0 & 0 & 1 & n_6 \\ 0 & 0 & 0 & 1 \end{bmatrix} \times \begin{bmatrix} C_6 & -S_6 & 0 & 0 \\ S_6 & C_6 & 0 & 0 \\ 0 & 0 & 1 & 0 \\ 0 & 0 & 0 & 1 \end{bmatrix} =$$

$$\begin{bmatrix} C_1 & -S_1 & 0 & l_1 \\ S_1 & C_1 & 0 & m_1 \\ 0 & 0 & 1 & n_1 \\ 0 & 0 & 0 & 1 \end{bmatrix} \times \begin{bmatrix} C_2 & 0 & -S_2 & l_2 \\ 0 & 1 & 0 & m_2 \\ S_2 & 0 & C_2 & n_2 \\ 0 & 0 & 0 & 1 \end{bmatrix} \times \begin{bmatrix} C_3 & 0 & -S_3 & l_3 \\ 0 & 1 & 0 & m_3 \\ S_3 & 0 & C_3 & n_3 \\ 0 & 0 & 0 & 1 \end{bmatrix} \times$$

$$\begin{bmatrix} C_4 & -S_4 & 0 & l_4 \\ S_4 & C_4 & 0 & m_4 \\ 0 & 0 & 1 & n_4 \\ 0 & 0 & 0 & 0 \end{bmatrix} \times \begin{bmatrix} C_5 & 0 & -S_5 & l_5 \\ 0 & 1 & 0 & m_5 \\ S_5 & 0 & C_5 & n_5 \\ 0 & 0 & 0 & 1 \end{bmatrix} \times \begin{bmatrix} C_6 & -S_6 & 0 & l_6 \\ S_6 & C_6 & 0 & m_6 \\ 0 & 0 & 1 & n_6 \\ 0 & 0 & 0 & 1 \end{bmatrix} =$$

$$M_1 \times M_2 \times M_3 \times M_4 \times M_5 \times M_6$$

where $C_i = \cos \alpha_i$, $S_i = \sin \alpha_i$, and $l_i$, $m_i$ and $n_i$ indicate relations between the origins in the coordinate system of each articulation. In this case, $i = 1, \ldots 6$.

Accordingly, the above stated equation (1) is represented by the following equation (3).

$$\vec{Y} = M_1 \times M_2 \times M_3 \times M_4 \times M_5 \times M_6 \times \vec{y} \qquad (3)$$

where $M_1$ to $M_6$ indicate transformation matrices for the respective arms.

Figure 4:
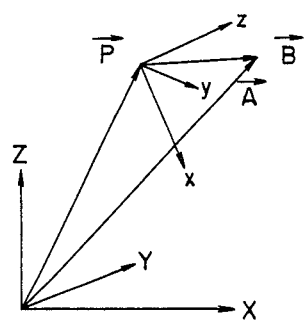

On the other hand, the hand coordinate system is positioned at the point of vector $\vec{P}$ ($P_X$, $P_Y$, $P_Z$) shown in FIG. 4. Assuming that the unit vectors of the respective axes in the absolute coordinate system are i, j and k and the unit vectors of the respective axes in the hand coordinate system are i', j' and k', the vectors $\vec{A}$, $\vec{B}$ and $\vec{P}$ in FIG. 4 are given by the following equation (4).

$$\left. \begin{array}{l} \vec{A} = Xi = Yj + Xk \\ \vec{B} = xi' + yj' + xk' \\ \vec{P} = P_X i + P_X j + P_Z k \end{array} \right\} \qquad (4)$$

If $\vec{A} = \vec{B} + \vec{P}$, the interrelation between the absolute coordinate system ($\vec{Y}$) and the hand coordinate system ($\vec{y}$) is obtained by the following equation (5).

$$\begin{bmatrix} X \\ Y \\ Z \\ 1 \end{bmatrix} = \begin{bmatrix} i \cdot i' & i \cdot j' & i \cdot k' & P_X \\ j \cdot i' & j \cdot j' & j \cdot k' & P_Y \\ k \cdot i' & k \cdot j' & k \cdot k' & P_Z \\ \hline 0 & 0 & 0 & 1 \end{bmatrix} \begin{bmatrix} x \\ y \\ z \\ 1 \end{bmatrix} \qquad (5)$$

where $i \cdot j'$ indicates an inner product of the vector i and the vector j'.

From the foregoing, the coordinate transformation matrix in the equation (1) is summarized as follows.

(i) M is a function for the respective articulation angles $\alpha_1$, $\alpha_2$, $\alpha_3$, $\alpha_4$, $\alpha_5$ and $\alpha_6$ but the transformation matrix $M_i$ ($i = 1, \ldots, 6$) for the respective arms is a function for only the articulation angle $\alpha_1$ of the axis concerned.

(ii) $P_X$, $P_Y$ and $P_Z$ indicate positions of origins in the hand coordinate system.

Figure 5:
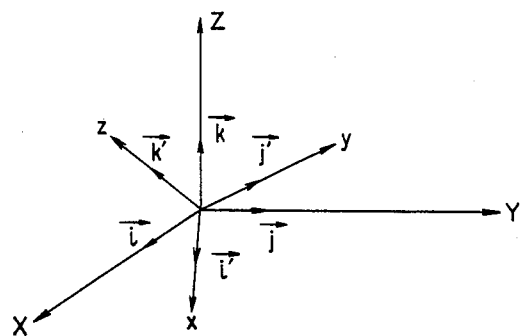

(iii) A block matrix m of the matrix M (for example, a portion surrounded by a dotted line in the equation (5)) has posture data (direction cosine) in the coordinate system and a relation $m^{-1} = m^T$ is established, where the superscripts $-1$ and T indicate respectively an inverse matrix and a transposing matrix. More specifically, the block matrix m representing rotation of the coordinate system is in a relation shown in FIG. 5, taking account of the direction cosine, and accordingly, it is understood that inverse transformation needs only transposition of this block matrix (an orthogonal matrix).

Since the position and posture of an end effecter are taken by the rotational angle of each degree of freedom, transformation from the absolute coordinate system to the $\alpha$ coordinate system of each axis is needed. The posture and position vector (X) of an end effecter of a robot is represented by the following equation, assuming that position data are X, Y and Z and posture data are $n_X$, $n_Y$, $n_Z$.

$$\vec{X} = \begin{pmatrix} X \\ Y \\ Z \\ n_X \\ n_Y \\ n_Z \end{pmatrix}$$

The rotational angle of each axis is represented by the following equation.

$$\vec{\alpha} = \begin{pmatrix} \alpha_1 \\ \alpha_2 \\ \alpha_3 \\ \alpha_4 \\ \alpha_5 \\ \alpha_6 \end{pmatrix}$$

Accordingly, the above stated position data and posture data are represented respectively by the following equation (7).

$$\left. \begin{array}{l} P_X = f_1(\alpha_1, \ldots, \alpha_6) \\ P_Y = f_2(\alpha_1, \ldots, \alpha_6) \\ P_Z = f_3(\alpha_1, \ldots, \alpha_6) \\ n_X = f_4(\alpha_1, \ldots, \alpha_6) \\ n_Y = f_5(\alpha_1, \ldots, \alpha_6) \\ n_Z = f_6(\alpha_1, \ldots, \alpha_6) \end{array} \right\} \qquad (7)$$

Summarizing the equation (7), the following equation (8) is obtained.

$$\vec{X} = \vec{F}(\alpha) \qquad (8)$$

This equation (8) signifies that the posture and position vector $\vec{X}$ in the absolute coordinate system is a function for the vector $\vec{\alpha}$ of each articulation angle.

Transformation from $\vec{\alpha}$ to $\vec{X}$

Next, description will be made of a method and apparatus for coordinate transformation from the vector $\alpha$ to the vector $\vec{X}$, which correspond to the coordinate transforming portion 5 shown in FIGS. 1A and 1B.

As can be seen from the equation (2), $M_1$ is a matrix represented by $\alpha_1$, $l_1$, $m_1$ and $n_1$. $M_2$ is represented by $a_2$, $l_2$, $m_2$ and $n_2$, and $M_3$ to $M_6$ are represented in the same manner. Accordingly, the product of these matrices $M_1 \times M_2 \times M_3 \times M_4 \times M_5 \times M_6$, that is, M is a matrix including $a_i$, $l_i$, $m_i$, $n_i$ ($i=1$ to 6), among which $l_i$, $m_i$ and $n_i$ indicate distances between the articulations, that is amounts related to the length of the respective arms and take constant values. For this reason, each element of M is an amount including $\alpha_i$ ($i=1$ to 6) as a variable. In consequence, M can be represented as follows:

$$M = [a_{jk}(\alpha_i)] \quad (9)$$

The jk element $a_{jk}(\alpha_i)$ of M is, specifically, an element of the j-th row and the k-th column obtained as the result of the matrix multiplication of the equation (2). Now, let us consider the meaning of the element $a_{jk}(\alpha_i)$ thus obtained.

From the definition of the equation (1), M indicate a relation between a position vector $\vec{y}$ of the hand coordinate system at an arbitrary point in the space and a position vector $\vec{Y}$ of the absolute coordinate system at the same point. Then let us consider how an origin in the hand coordinate system, that is, a tip end of an end effecter is represented in the absolute coordinate system. This origin is represented in the hand coordinate system as $x=0$, $y=0$ and $z=B\ 0$, and accordingly, assuming that the coordinates of this point in the absolute coordinate system are $X_0$, $Y_0$, $Z_0$, the following equation (10) is obtained from the equation (1).

$$\begin{pmatrix} X_0 \\ Y_0 \\ Z_0 \\ 1 \end{pmatrix} = [a_{jk}(\alpha_i)] \begin{pmatrix} 0 \\ 0 \\ 0 \\ 1 \end{pmatrix} \quad (10)$$

If multiplication of the right side of the equation (10) is performed, the following equation is obtained.

$$\begin{pmatrix} X_0 \\ Y_0 \\ Z_0 \\ 1 \end{pmatrix} = \begin{pmatrix} a_{14}(\alpha_i) \\ a_{24}(\alpha_i) \\ a_{34}(\alpha_i) \\ a_{44}(\alpha_i) \end{pmatrix} \quad (11)$$

Accordingly, the equation:

$$\left. \begin{aligned} X_0 &= a_{14}(\alpha_i) \\ Y_0 &= a_{24}(\alpha_i) \\ Z_0 &= a_{34}(\alpha_i) \\ 1 &= a_{44}(\alpha_i) \end{aligned} \right\} \quad (12)$$

is obtained. In other words, $a_{14}(\alpha_i)$, $a_{24}(\alpha_i)$, $a_{34}(\alpha_i)$ of the matrix M correspond respectively to the coordinate components in the absolute coordinate system as to the tip end of an end effecter. Since the left side of the equation (12) represents an amount in the absolute coordinate system and the right side thereof is indicated by $\alpha_i$ ($i=1$ to 6), so that $X_0$, $Y_0$, $Z_0$ are obtained when $\alpha_i$ is given. Also, with respect to an amount $n_{X0}$, $n_{Y0}$, $n_{Z0}$ representing the posture data of the end effecter, a relation with the elements included in the block matrix m of M is obtained in the same manner. Since it is the position and posture of the tip end of an end effecter that assume an important role in the control of an articulated robot, the below indicated relation is established from the equation (12), etc., if $X_0$, $Y_0$, $Z_0$ in the equation (12) are modified as X, Y, Z by taking away the subscript 0. (It is the same with $n_{X0}$, $n_{Y0}$, $n_{Z0}$).

$$M = \begin{bmatrix} \dots a_{12}(\alpha_i) & a_{13}(\alpha_i) & a_{14}(\alpha_i) \\ \dots\dots\dots & a_{23}(\alpha_i) & a_{24}(\alpha_i) \\ \dots\dots\dots\dots & & a_{34}(\alpha_i) \\ \dots\dots\dots\dots & & a_{44}(\alpha_i) \end{bmatrix} \quad (13)$$

$$= \begin{bmatrix} \dots n_X & n_Y & X \\ \dots\dots & n_Z & Y \\ \dots\dots\dots & & Z \\ \dots\dots\dots & & 1 \end{bmatrix}$$

More specifically stated, (i) multiplication of $M_i$ represented by $\alpha_i$ is made so as to obtain M (which is represented by $\alpha_i$);

(ii) $a_{12}(\alpha_i)$, $a_{13}(\alpha_i)$, $a_{14}(\alpha_i)$, $a_{23}(\alpha_i)$, ..., $a_{34}(\alpha_i)$ are taken out of the elements of M and since these elements correspond to $n_X$, $n_Y$, $n_Z$, ..., Z, a relation such as the equation (12) and the like is established;

(iii) since the relation of the equation (12) and the like shows a relation of $\vec{X} \rightleftharpoons \vec{\alpha}$, it follows that a reciprocally transforming equation between $\vec{\alpha}$ and $\vec{X}$. More specifically, for transformation from $\vec{\alpha}$ to $\vec{X}$, calculation of the above stated equation (2), that is, calculation of the following equation has only to be made.

$$M_1 \times M_2 \times M_3 \times M_4 \times M_5 \times M_6 = M \quad (14)$$

In other words, for transformation from $\vec{\alpha}$ to $\vec{X}$, it is only needed to obtain a product matrix M according to the number of degrees of freedom of a coordinate transformation matrix $M_i$ which represents the motion of each degree of freedom of a robot.

Figure 6:
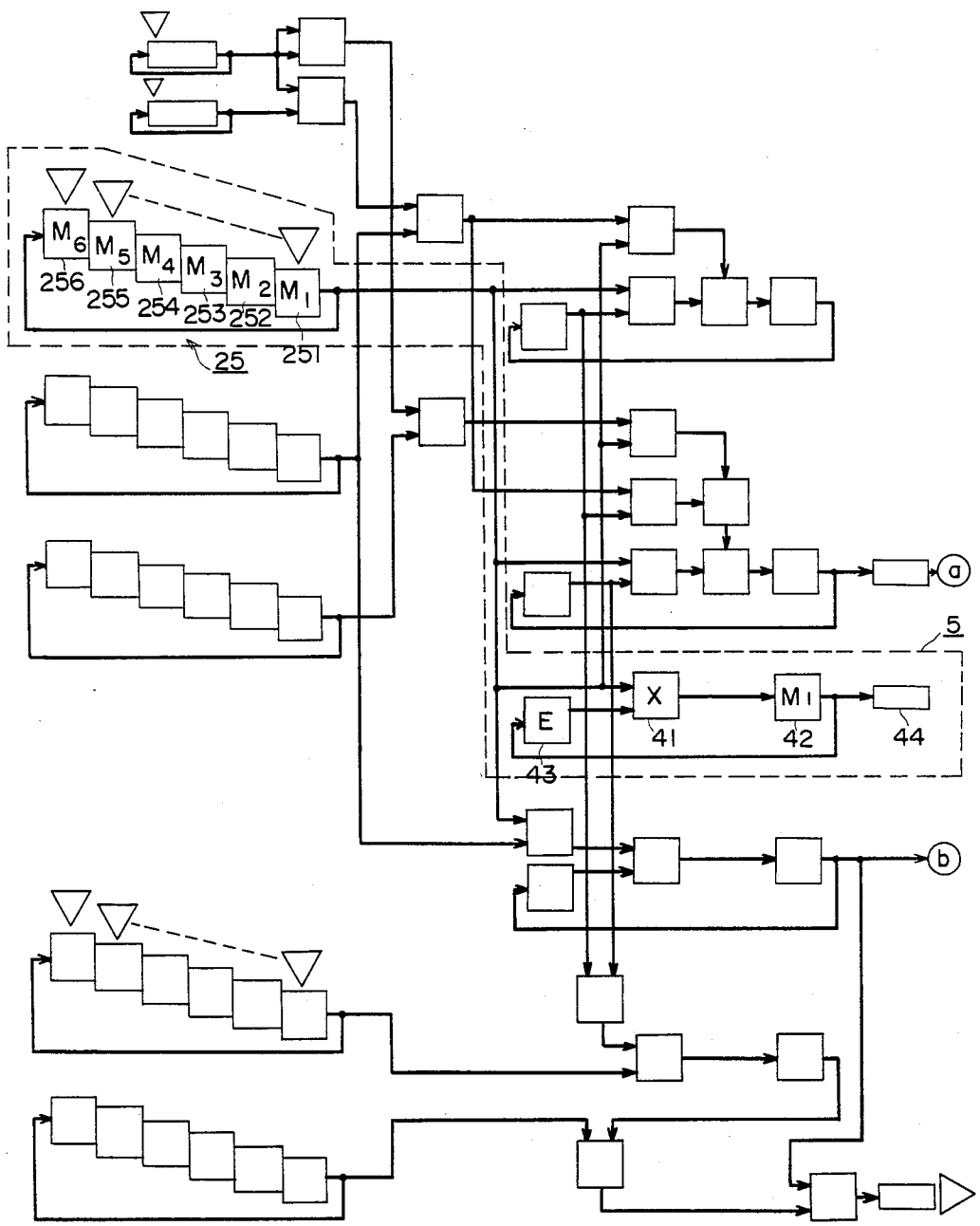
FIG. 6 is a block diagram for explaining an apparatus for coordinate transformation from $\vec{\alpha}$ to $\vec{X}$.

Then, description will be made of a n apparatus for calculating the above stated equation (14). FIG. 6 is a block diagram for explaining an apparatus for coordinate transformation from $\vec{\alpha}$ to $\vec{X}$. FIG. 6 corresponds to FIG. 2A and a portion surrounded by a dotted line corresponds to a coordinate transforming portion 5 shown in FIGS. 1A and 2A.

The coordinate transforming portion 5 comprises a matrix shift register 25, a matrix multiplier 41 connected to the shift register 25, a matrix register 42 connected to the multiplier 41, a matrix register 43 connected thereto and a buffer register 44. The matrix shift register 25 is composed of matrix registers corresponding to the number of degrees of freedom, for example, six matrix registers 251 to 256 in case of six degrees of freedom. The matrix registers 251 to 256 maintain respectively motions of the degrees of freedom as coordinate transformation matrices. The matrix multiplier 41 inputs two matrices and outputs a matrix of the product of the two matrices. This matrix multiplier 41 will be described in more detail afterwards. The matrix register 42 maintains the result of multiplication in the matrix multiplier 41.

Now, clock signals will be described. Two kinds of clock signals ∅A and ∅B are supplied from a timing circuit (not shown) to the coordinate transforming portion 5. More particularly, clock signals ∅A are supplied to the matrix register 42, while clock signals ∅B are supplied to the matrix shift register 25, the matrix multiplier 41, the matrix register 43 and the buffer register 44. The clock signal ∅A serves for obtaining the product of matrices and comprises finely 64 pulses. The clock signal ØB serves for shifting the registers and comprises finely 16 pulses. These clock signals ØA and ØB are inputted to all the blocks shown in FIGS. 2A and 2B, in accordance with the same principle as described above. More particularly, to the registers receiving products of matrices, clock signals ØA are inputted, and to the other blocks, block signals ØB are inputted.

Next, operation of the coordinate transforming portion 5 will be described. Transformation matrices $M_1$ to $M_6$ are supplied from a microcomputer (not shown) to the matrix registers 251 to 256, respectively. In the drawings, a mark ∇ indicates input from the microcomputer. More particularly, a read-only memory in the microcomputer includes a table for calculating the sine and cosine of each degrees of freedom and based on this table, interpolation is performed by software, whereby transformation matrices $M_1$ to $M_6$ are supplied from the microcomputer to the matrix registers 251 to 256 as described above. At first, a matrix $M_1$ is maintained in the matrix register 251 and the matrix register 43 is in a state initialized to a unit matrix E. Accordingly, the matrix multiplier 41 multiplies the matrix $M_1$ and the unit matrix E and the matrix $M_1$ which is the result of multiplication is maintained in the matrix register 42. FIG. 6 shows this state. Then, in response to the above described clock signal, the matrix in the matrix shift register 25 is shifted by one block in the right direction in FIG. 6. More specifically, the matrix $M_2$ is loaded in the matrix register 251 and the matrix $M_1$ from the matrix register 42 is loaded in the matrix register 43. In the matrix multiplier 41, the matrix $M_2$ from the matrix register 251 and the matrix $M_1$ from the matrix register 43 are multiplied and as a result, a matrix $M_1 \times M_2$ is loaded in the matrix register 42. Subsequently, the same operation is iterated. After the predetermined 6 clock time, a matrix $M_1 \times M_2 \times M_4 \times M_5 \times M_6$, that is, a matrix M is loaded in the matrix register 42 and the buffer register 44. Thus, transformation from $\vec{a}$ to $\vec{X}$ is performed. In the above described operation, the buffer register 44 is not necessarily needed and the matrix register 43 can be omitted if a buffer function for at least one row (or one column) substituted for the matrix register 43 is included in the matrix register 42 or added to the matrix multiplier 41. In such a case, the matrix register 42 is initialized to the unit matrix E.

If transforming operation from $\vec{a}$ to $\vec{X}$ as described above is performed only in the software of a microcomputer, the calculation time needs to be approximately 50 to 100 m sec, for example. However, if the same calculation operation is performed in hardware as in the present embodiment, the calculation can be made at an extremely high speed, for example, with less than 1 m sec.

Figure 7:
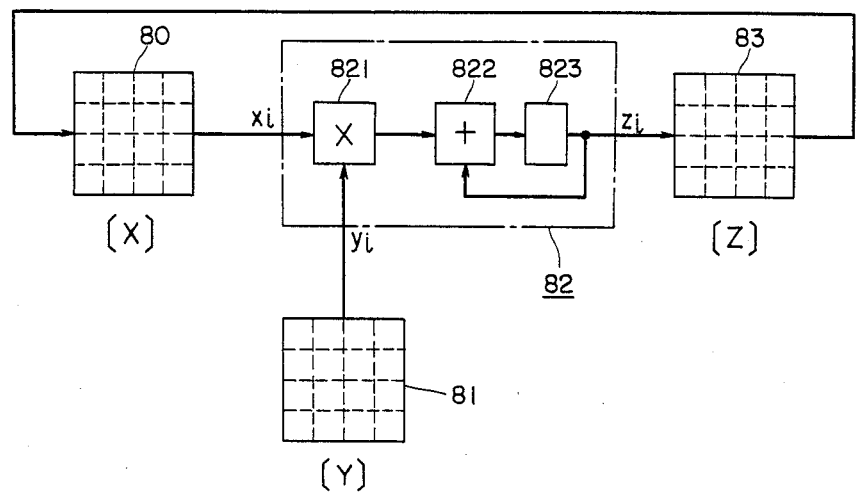
FIG. 7 is a block diagram for explaining a matrix multiplier.

Now, a detailed description will be made of the above described matrix multiplier 41. FIG. 7 is a block diagram for explaining a matrix multiplier. The functions of the matrix multiplier can be fulfilled by operation of all the components in this block diagram. The matrix multiplier 41 in FIG. 6 is represented, for facilitating the explanation, as one matrix multiplier by which all the functions can be fulfilled. It is the same with other matrix multipliers shown in FIGS. 2A and 2B which will be described later.

$4 \times 4$ matrix registers 80 and 81 are connected to the input portion of a multiplier-adder 82. A $4 \times 4$ matrix register 83 is connected to the output portion of the multiplier-adder 82. These matrix registers 80, 81 and 83 correspond respectively to the matrix register 43, matrix shift register 25 and matrix register 42 shown in FIG. 6. The multiplier-adder 82 comprises a multiplier 821, an adder 822 connected to the multiplier 821 and a buffer register 823 connected to the adder 822. Assuming that the input from the matrix register 80 to the multiplier-adder 82 is $x_i$, the input from the matrix register 81 to the multiplier-adder 82 is $y_i$ and the output from the multiplier-adder 82 to the matrix register 83 is $z_i$, calculation shown in the following equation is performed in the multiplier-adder 82.

$$z_i = z_{i-1} + x_i \times y_i \qquad (15)$$

where i indicates timing for one multiplication time unit in the conditions of $i = 1$ to 4. The apparatus in this block diagram has two functions. One is a function of matrix multipliers as shown in the following equation.

$$[X] \times [Y] = [Z]$$

The second is a function of transferring the content of the matrix register 83 to the matrix register 80.

Figure 8:
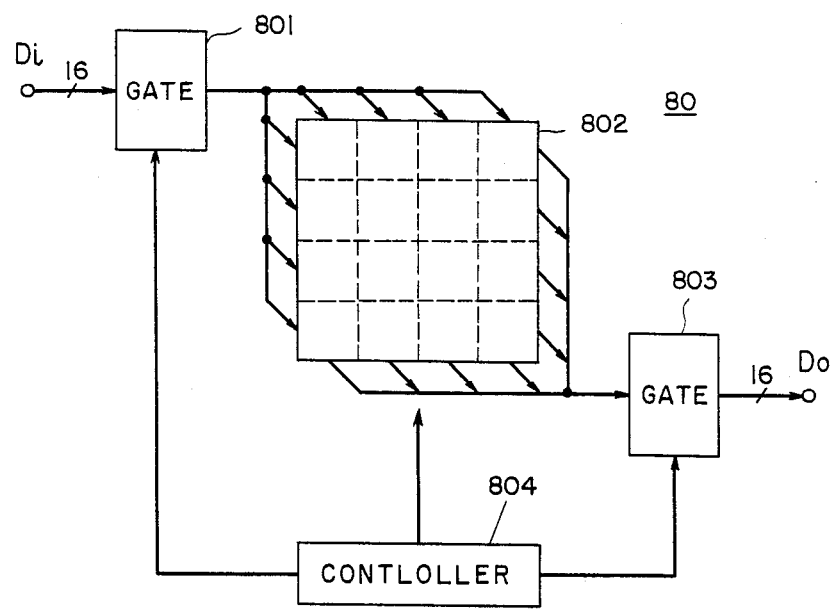
FIG. 8 is a block diagram showing an example of a matrix register.

FIG. 8 is a block diagram showing an example of a matrix register. This figure represents a $4 \times 4$ matrix register. However, it is the same with $6 \times 6$ matrix register. Hereinafter, an example of a matrix register 80 will be described. The input portion and output portion of a $4 \times 4$ shirt register 802 are connected with gates 801 and 803, respectively. Furthermore, a control device 804 is connected with the gates 801 and 803 and the shift register 802. This matrix register 80 has four functions as follows.

(i) Two modes can be selected. One is a shift mode for shifting each element of the shift register 802. This shifting operation is performed only for one row or column designated. Circulation is made in the other rows or columns. The other mode is a rotation mode for circulating each element of the shift register 802. This rotation operation is performed in all the rows or all the columns.

(ii) A horizontal mode of shifting or rotating data in the horizontal direction and a vertical mode for shifting or rotating data in the vertical direction can be selected.

(iii) The shift register 802 is capable of designating an element receiving the data from outside. More particularly, in the shift register 802, a row or column to be shifted can be designated (Data is rotated in the other rows or columns.)

(iv) In the shift register 802, an element for outputting data to outside can be designated.

The above described four functions are controlled by the control device 804.

Figure 9:
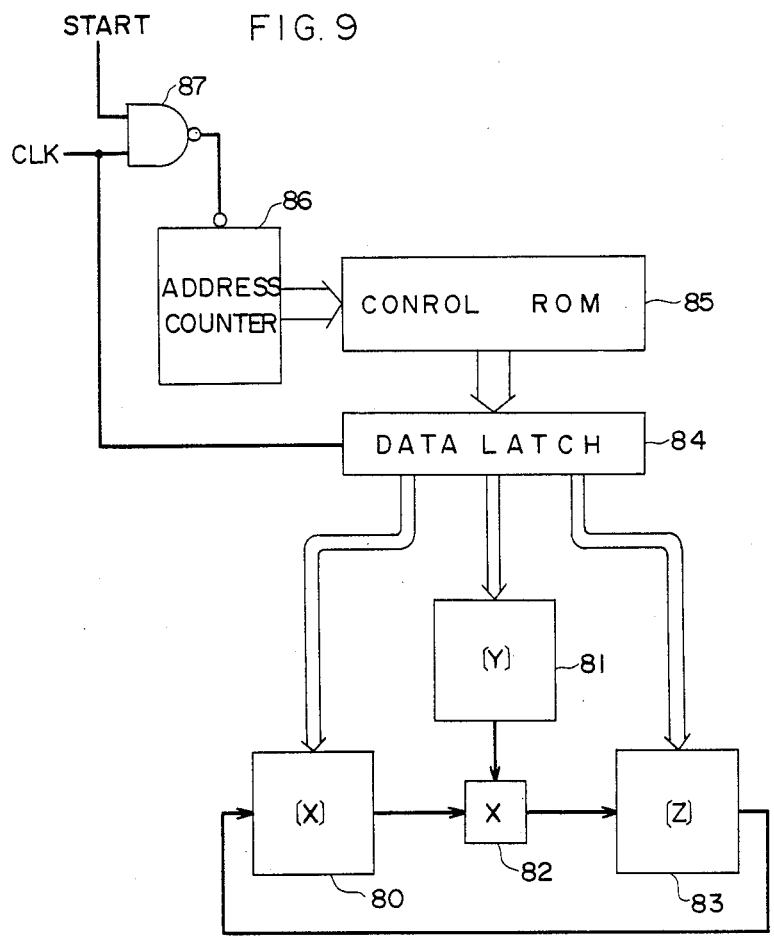
FIG. 9 is a block diagram showing connection between a controlling apparatus and matrix multipliers.

FIG. 9 is a block diagram showing connection between a control device and a matrix multiplier. The matrix registers 80, 81 and 83 are connected to a data latch circuit 84, which is connected to a read-only memory (ROM) 85 for control. To the control ROM 85, an address counter 86 is connected. To the address counter 86, a NAND gate 87 is connected.

In the respective matrix registers 80, 81 and 83, the above described four functions are selected according to the signals from the data latch circuit 84. In the control ROM 85, predetermined data for controlling the respective matrix registers 80, 81 and 83 are stored. The data are read out successively from the addresses designated by an address counter 86. The content of the address counter 86 is renewed in response to a clock signal CLK from a host system (not shown).

Figure 10:
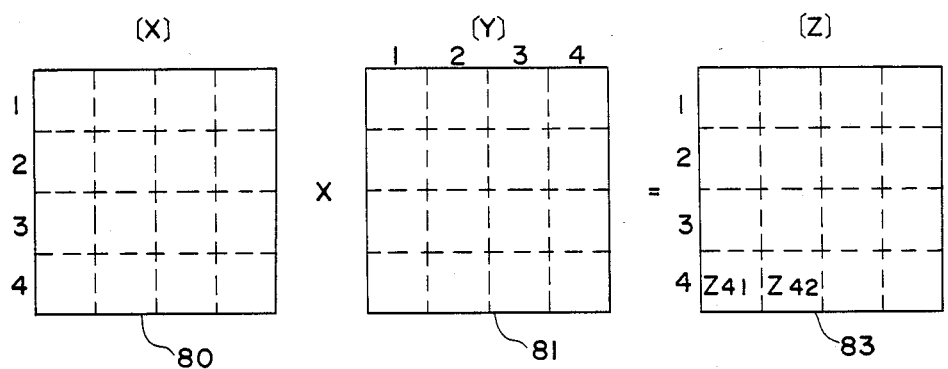
FIG. 10 is a view for explaining the operation method of matrix registers.

FIG. 10 is a view for explaining an operation method of matrix registers. With reference to FIG. 10 and the below indicated table 2, description will be made of the operation of matrix registers and multiplication of matrices performed thereby.

TABLE 2

| X<br>Horizontal,<br>Rotation | Y<br>Vertical,<br>Rotation | Z<br>Horizontal,<br>Rotation |
|---|---|---|
| 4 | 4 | 4 |
|   | 3 |   |
|   | 2 |   |
|   | 1 |   |
| 3 | 4 | 3 |
|   | 3 |   |
|   | 2 |   |
|   | 1 |   |
| 2 | 4 | 2 |
|   | 3 |   |
|   | 2 |   |
|   | 1 |   |
| 1 | 4 | 1 |
|   | 3 |   |
|   | 2 |   |
|   | 1 |   |

Modes of the matrix registers 80, 81 and 83 are selected. More particularly, the horizontal mode and the rotation mode are selected for the matrix register 80; the vertical mode and the rotation mode are selected for the matrix register 81; the horizontal mode and the shift mode are selected for the matrix register 83.

First, the respective elements of the fourth row of the matrix register 80 and the respective elements of the fourth column of the matrix register 81 are multiplied and the sum of the respective products is loaded in the fourth row and the first column of the matrix register 83. This is attained by calculation of the above stated equation (15). Then, the respective elements of the fourth row of the matrix register 80 and the respective elements of the third column of the matrix register 81 are multiplied in the same manner as described above and the result of calculation is loaded in the fourth row and the first column of the matrix register 83 by shifting the data previously loaded in the fourth row and the first column of the matrix register 83 to the fourth row and the second column. Subsequently, in the same manner, calculation between the respective elements of the fourth row of the matrix register 80 and the respective elements of the second column or the first column of the matrix register 81 is performed and the result of calculation is loaded in the fourth row of the matrix register 83.

Then, calculation between the respective elements of the third row of the matrix register 80 and the respective elements of each column of the matrix register 81 is performed and the result of calculation is loaded in the third row of the matrix register 83. Subsequently, in the same manner, the respective elements of the second row or the first row of the matrix register 80 and the respective elements of each column of the matrix register 81 are calculated and the result of calculation is loaded in the second row or the first row of the matrix register 83. Thus, matrix multiplication of the following equation is performed.

$$[X] \times [Y] = [Z]$$

Calculation of $\vec{J(\alpha)}$

Now, description will be made of a method and apparatus for obtaining Jacobian $\vec{J(\alpha)}$ by hardware, which correspond to a part of the coordinate transforming portion 6 shown in FIGS. 1A and 1B.

The above stated equation (8) is an equation as to $\vec{\alpha}$, where a non-linear relation exists between the posture and position vector $\vec{X}$ of the absolute coordinate system and each articulation angle vector $\vec{\alpha}$. Therefore, it is generally complicated to make a direct transformation of $\vec{X} \to \vec{\alpha}$ based on the equation (8).

According to the present embodiment, Jacobian $\vec{J(\alpha)}$ is utilized, noticing that linearity can be established if the above stated equation (8) is limited to the infinitesimal changes $d\vec{X}$ and $d\vec{\alpha}$. The Jacobian is well known, for example, in the article written by Daniel E. Whitney under the title of "Resolved Motion Rate Control of Manipulators and Human Prosthesis" in IEEE TRANSACTIONS ON MAN-MACHINE SYSTEMS, VOL. MMS-10, No. 2, June 1969. It can be understood that the Jacobian for transformation between $d\vec{X}$ and $d\vec{\alpha}$ is represented by the following equation (16) on condition that Taylor expansion is made with respect to the infinitesimal $d\vec{\alpha}$ in the right side of the equation (7), leaving only the lowest order term.

$$\vec{J(\partial)} = \begin{bmatrix} \frac{\partial f_1}{\partial \alpha_1} & \frac{\partial f_1}{\partial \alpha_2} & \frac{\partial f_1}{\partial \alpha_3} & \frac{\partial f_1}{\partial \alpha_4} & \frac{\partial f_1}{\partial \alpha_5} & \frac{\partial f_1}{\partial \alpha_6} \\ \frac{\partial f_2}{\partial \alpha_1} & \text{---} & \text{---} & \text{---} & \text{---} & \text{---} \\ \frac{\partial f_3}{\partial \alpha_1} & \text{---} & \text{---} & \text{---} & \text{---} & \text{---} \\ \frac{\partial f_4}{\partial \alpha_1} & \text{---} & \text{---} & \text{---} & \text{---} & \text{---} \\ \frac{\partial f_5}{\partial \alpha_1} & \text{---} & \text{---} & \text{---} & \text{---} & \text{---} \\ \frac{\partial f_6}{\partial \alpha_1} & \text{---} & \text{---} & \text{---} & \text{---} & \frac{\partial f_6}{\partial \alpha_6} \end{bmatrix} \quad (16)$$

On the other hand, $$d\vec{X} = \vec{J(\alpha)} \cdot d\vec{\alpha} \quad (17)$$

Therefore, solving the simultaneous equations, the following equation is established.

$$d\alpha = [\vec{J(\alpha)}]^{-1} \cdot d\vec{X} \quad (18)$$

In the embodiment of the present invention, the equations (17) and (18) are utilized so as to transform the coordinates from the Cartesian coordinate system into the $\alpha$ system. The above described two equations concern the infinitesimal changes and accordingly, it is necessary to perform calculation for them at least with the servo rate.

Consequently, the present embodiment aims to realized algorithm as described above in a calculation circuit.

Now, returning to the above described equation (3), $\vec{Y}$ is partially differentiated by $\alpha_1$ to $\alpha_5$, and then the equation (19) is obtained.

$$\left.\begin{array}{l} \frac{\partial \vec{Y}}{\partial \alpha_1} = M_1' \times M_2 \times M_3 \times M_4 \times M_5 \times M_6 \times \vec{y} \\ \frac{\partial \vec{Y}}{\partial \alpha_1} = M_1 \times M_2' \times M_3 \times M_4 \times M_5 \times M_6 \times \vec{y} \\ \vdots \\ \frac{\partial \vec{Y}}{\partial \alpha_6} = M_1 \times M_2 \times M_3 \times M_4 \times M_5 \times M_6' \times \vec{y} \end{array}\right\} \quad (19)$$

Differentiation of the transformation matrix signifies differentiation of the respective elements in the matrix. Accordingly, $\partial \vec{Y}/\partial \alpha_1$ in the above described equation (19) is represented by the following equation (20) when the equation (5) is used.

$$\frac{\partial \vec{Y}}{\partial \alpha_1} = \begin{bmatrix} & & \frac{\partial P_X}{\partial \alpha_1} \\ & \frac{\partial m}{\partial \alpha_1} & \frac{\partial P_Y}{\partial \alpha_1} \\ & & \frac{\partial P_Z}{\partial \alpha_1} \\ 0 & & 0 \end{bmatrix} \vec{y} \quad (20)$$

By making the equation (20) correspond to the above described equation (16), the following relation is established.

$$\left.\begin{array}{l} \frac{\partial f_1}{\partial \alpha_1} = \frac{\partial P_X}{\partial \alpha_1} \\ \frac{\partial f_2}{\partial \alpha_1} = \frac{\partial P_Y}{\partial \alpha_1} \\ \frac{\partial f_3}{\partial \alpha_1} = \frac{\partial P_Z}{\partial \alpha_1} \end{array}\right\} \quad (21)$$

For $\partial f_4/\partial \alpha_1$, $\partial f_5/\partial \alpha_1$ and $\partial f_6/\partial \alpha_1$, choose suitably three out of the above described block matrix $\partial m/\partial \alpha_1$. Also, the other elements in the equation (19) can be dealt with in the same manner as in the equations (20) and (21). Thus, by calculating $\partial M/\partial \alpha_i (i=1, 2, \ldots, 6)$, the respective elements of Jacobian $J(\vec{\alpha})$ are obtained. The elements thus obtained are substituted into the above described equation (17) so that coordinate transformation can be made in the infinitesimal changes.

According to the present embodiment, in order to obtain each element of the above described Jacobian matrix, calculation is performed in a hardware other than a microcomputer or a microprocessor, noticing that the same calculation process is iterated many times in the equation (19), and coordinate transformation is finally made in a microcomputer or a microprocessor by substituting the elements thus obtained. As a result, processes required for coordinate transformation in a microcomputer or microprocessor are extremely simplified. Accordingly, it is not necessary to use a high speed device and furthermore, other functions can be added to a CPU in a microcomputer or a microprocessor. In a conventional type, a very long calculation time was required for coordinate transformation and interpolation could not be made finely unless the processing speed of the CPU is high. In addition, if such a conventional type is made to have other functions, calculation time for polation point must be limited and for this reason, the interpolation interval might be made larger, which would cause lack of precision in the locus. On the contrary, if calculation necessary for coordinate transformation is performed in a specially provided calculation circuit as in the present embodiment, a high speed performance is not required in a microprocessor or a microcomputer and other functions can be easily added.

Furthermore, in a coordinate transforming method as in the present embodiment, it is relatively easy to make an adjustment according to the change of the structure of the articulated robot and the increase or decrease in the number of the degrees of freedom. For example, in case where a different kind of the degree of freedom is required according to the type of an end effecter, software of a microcomputer or the like has only to be modified a little in an apparatus in accordance with the present embodiment and thus application range of the present embodiment is further enlarged.

Figure 11:
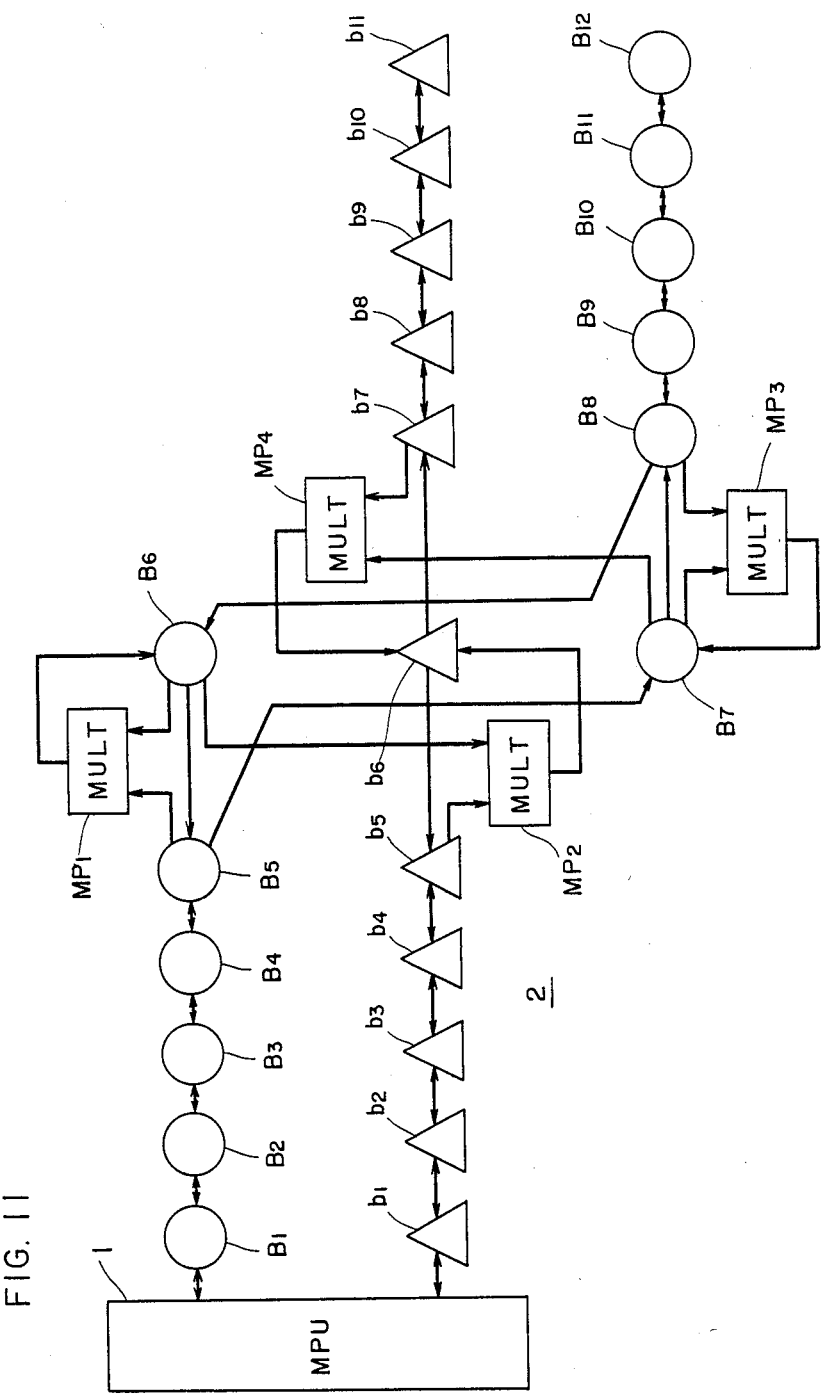
FIG. 11 is a conceptional view showing a basic principle of a calculating circuit.

FIG. 11 is a block diagram shown for the purpose of explaining the concept of the present embodiment. A microprocessor 1 is connected to a calculation circuit 2. Transformation matrices $M_1$ to $M_6$ and $M_1'$ to $M_6'$ for the respective arms in the above described equation (19) are given from the microprocessor 1 to the calculation circuit 2, where calculation is performed based on the equation (19). The calcuation circuit 2 comprises buffer registers $B_1$ to $B_{12}$ and $b_1$ to $b_{11}$. Multipliers $MP_1$ to $MP_4$ multiply the data stored in these buffer registers. The multiplier $MP_1$ multiplies the content of the buffer register $B_5$ and the content of the buffer register $B_6$ and reloads the result of multiplication to the buffer register $B_6$. The multiplier $MP_2$ multiplies the content of the buffer register $B_6$ and the content of the buffer register $b_6$ and loads the result of multiplication to the buffer register $b_6$. The multiplier $MP_3$ multiplies the content of the buffer register $B_7$ and the content of the buffer register $B_8$ and loads the result to the buffer register $B_7$. The multiplier $MP_4$ multiplies the content of the buffer register $B_7$ and the content of the buffer register $b_7$ and loads the result to the buffer register $b_6$. This calculation circuit 2 includes two calculation processes: the one has a flow of data in the right direction shown in FIG. 11 and the other has a flow of data in the opposite direction. In each process, calculation and shifting of data from one buffer register to another buffer register are performed for one predetermined unit time, respectively. The buffer registers $B_6$ and $B_7$ receive the data from the buffer register $B_5$ and the buffer register $B_6$ further receives the data from the buffer register $B_8$. The buffer registers $B_1$ to $B_{12}$ and the multipliers $MP_1$ and $MP_3$ associated therewith are utilized for calculation of the transformation matrices $M_1$ to $M_6$ in the equation (20). The buffer registers $b_1$ to $b_{11}$ and multipliers $MP_2$ and $MP_4$ are used for calculation of the differentiated transformation matrices $M_1'$ to $M_6'$ in the equation (20).

In a state where input of data from the microprocessor 1 is completed, the transformation matrices $M_1$, $M_2$, $M_3$, $M_4$, $M_5$, $M_6$ and $M_6$ are loaded respectively in the buffer registers $B_1$, $B_2$, $B_3$, $B_4$, $B_5$, $B_6$ and $B_7$ and the differentiated transformation matrices $M_1'$, $M_2'$, $M_3'$, $M_4'$, $M_5'$ and $M_6'$ are loaded respectively in the buffer registers $b_1$, $b_2$, $b_3$, $b_4$, $b_5$ and $b_6$. During the subsequent unit time, the transformation matrix $M_5$ loaded in the buffer register $B_5$ and the transformation matrix $M_6$ loaded in the buffer register $B_6$ are multiplied by the multiplier MP$_1$ and simultaneously, the differentiated transformation matrix M$_5'$ loaded in the buffer register b$_5$ and the transformation matrix M$_6$ loaded in the buffer register B$_6$ are multiplied by the multiplier MP$_2$ and the results of M$_5 \times$M$_6$ and M$_5' \times$M$_6$ are respectively loaded in the buffer registers B$_6$ and b$_6$. During this time, the transformation matrices (including the differentiated ones) loaded in the respective buffer registers are shifted for one block toward the right direction shown in FIG. 11 so that they are prepared for the next multiplication. The transformation matrices M$_1$ to M$_6$ are loaded in the buffer registers B$_7$ to B$_{12}$, respectively. In the buffer register B$_6$, the result of multiplication of all the transformation matrices, that is, M$_1 \times$M$_2 \times$M$_3 \times$M$_4 \times$M$_5 \times$M$_6$ is loaded. In the buffer registers b$_{11}$, b$_{10}$, b$_9$, b$_8$, b$_7$ and b$_6$, the results of M$_6'$, M$_5' \times$M$_6$, M$_4' \times$M$_{5 \times M6}$, M$_3' \times$M$_4 \times$M$_5 \times$M$_6$, M$_2' \times$M$_3 \times$M$_4 \times$M$_5 \times$M$_6$ and M$_1' \times$M$_2 \times$M$_3 \times$M$_4 \times$M$_5 \times$M$_6$ are loaded respectively. Then, the first calculation process is completed.

The flow of data in the next calculation process is in the left direction of FIG. 11. In this process, the multipliers MP$_3$ and MP$_4$ are used. The respective data moved in the right buffer registers in FIG. 11 in the first calculation process are all shifted again to the left side during the subsequent five unit times. As a result, the respective products of the matrices, that is,
M$_1 \times$M$_2 \times$M$_3 \times$M$_4 \times$M$_5 \times$M$_6$,
M$_1' \times$M$_2 \times$M$_3 \times$M$_4 \times$M$_5 \times$M$_6$,
M$_1 \times$M$_2' \times$M$_3 \times$M$_4 \times$M$_5 \times$M$_6$,     .     .     .     ,
M$_1 \times$M$_2 \times$M$_3 \times$M$_4 \times$M$_5 \times$M$_6'$ are loaded in the buffer registers B$_1$, b$_1$, b$_2$, . . . b$_6$, respectively.

The elements of the equation (19) thus calculated are transferred successively from the buffer register b$_1$ to the microprocessor 1. The matrices thus obtained are $\partial M/\partial \alpha_1$, $\partial M/\partial \alpha_2$, . . . , $\partial M/\partial \alpha_6$, respectively, as described above. Among these matrices, let us consider a matrix $\partial M/\partial \alpha_1$, for example. This matrix is a matrix shown in [   ] in the equation (20). The elements of $\partial P_X/\partial \alpha_1$, $\partial P_Y/\partial \alpha_1$, $\partial P_Z/\partial \alpha_1$, etc. are made to correspond, by the equation (21), to a part of the elements of the Jacobian $J(\vec{\alpha})$ in the equation (16). It is also the case with other matrices $\partial M/\partial \alpha_2$, . . . , $\partial M/\partial \alpha_6$. As a result, all the elements of Jacobian $J(\vec{\alpha})$ of the equation (16) can be obtained by taking the necessary elements respectively from the six matrix products loaded as described above. When the Jacobian $J(\vec{\alpha})$ is obtained, the change amount of each articulation angle can be obtained using the equation (18). These processing operations are performed in the microprocessor 1.

Thus, using a specially provided calculation circuit 2 for calculating the respective elements of the Jacobian matrix, the calculation speed in the calculation circuit 2 is far higher than the calculation speed by the software processing in the microprocessor 1, and accordingly, the calculation time required in the microprocessor 1 is reduced and the transformation from d$\vec{X}$ to d$\vec{\alpha}$ can be performed at the servo rate. In addition, with such an calculation circuit comprising specially provided hardware as described above, adjustment can be easily made according to the change of the structure of the robot and the increase or decrease in the number of the degrees of freedom, since only the hardware circuits need to be increased or decreased for the increase or decrease in the number of the degrees of freedom.

The data M$_1 \times$M$_2 \times$M$_3 \times$M$_4 \times$M$_5 \times$M$_6$ obtained from the buffer register B$_1$ are the transformation matrices in the above described equations (1) and (3) and the CPU can perform the transformation from the hand coordinates into the absolute coordinates, using these data.

Figure 12:
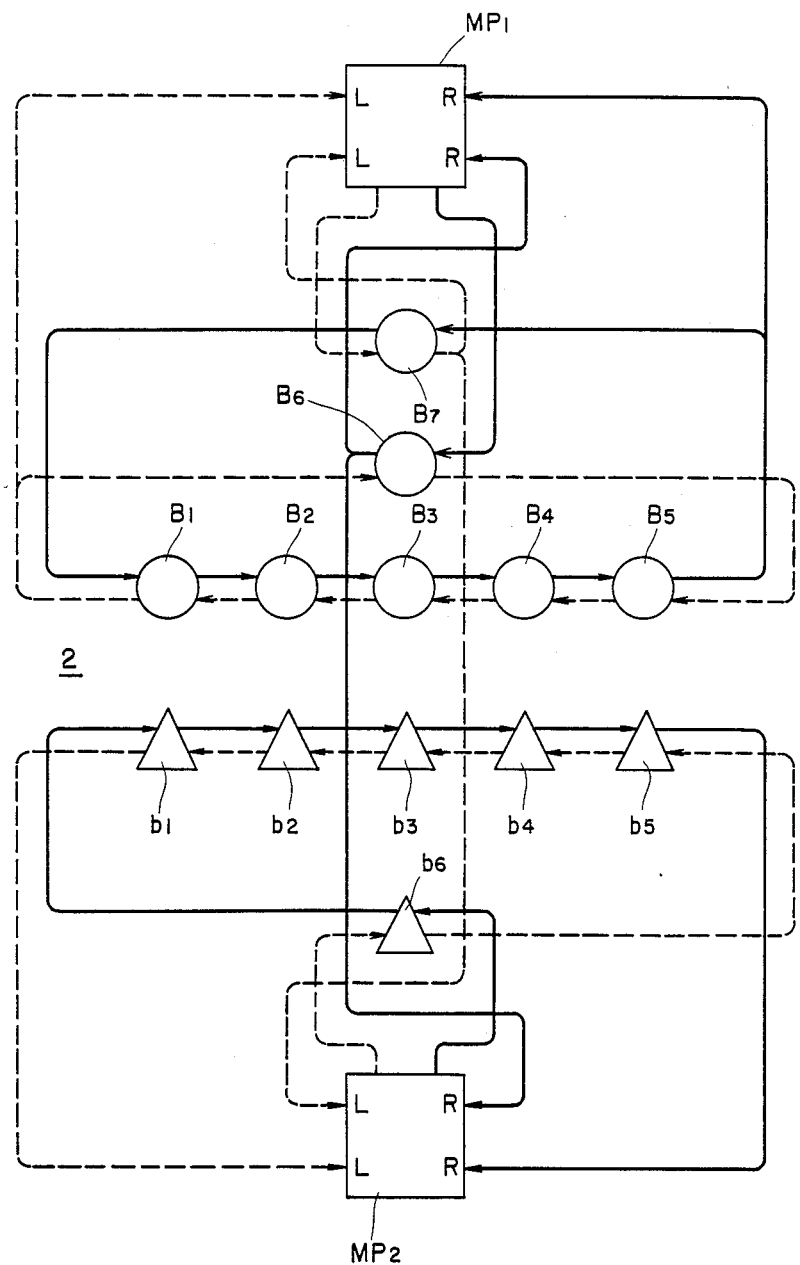
FIG. 12 is a conceptional view explaining the principle of a calculating circuit on which an embodiment is based.

FIG. 12 is another block diagram explaining the concept of the present embodiment. In the FIG. 12 circuit, the calculation time can be more reduced than in the FIG. 11 circuit. For example, for calculating the respective elements of the Jacobian matrix in the same manner, the circuit in FIG. 12 can be made small in scale as compared with the FIG. 11 circuit. This is because the number of data transfer times can be considerably decreased. The calculation circuit 2 shown in FIG. 12 comprises buffer registers B$_1$ to B$_7$ and b$_1$ to b$_6$ and the microprocessor 1 (in FIG. 11) is connected with the buffer registers B$_1$ and b$_1$. The multiplier circuit MP$_1$ multiplies the content of the buffer register B$_5$ and the content of the buffer register B$_6$ and reloads the result of multiplication into the buffer register B$_6$ and also multiplies the content of the buffer register B$_1$ and the content of the buffer register B$_7$ so as to reload the result into the buffer register B$_7$. In the same manner, the multiplier circuit MP$_2$ multiplies the content of the buffer register B$_6$ and the content of the buffer register b$_5$ so as to load the result into the buffer register b$_6$ and also multiplies the content of the buffer register B$_7$ and the content of the buffer register b$_1$ so as to the result into the buffer register b$_6$.

In the state where the data input from the microprocessor (not shown) is completed, the transformation matrices M$_1$, M$_2$, M$_3$, M$_4$, M$_5$, M$_6$ and M$_6$ in the equation (19) are loaded respectively in the buffer registers B$_1$, B$_2$, B$_3$, B$_4$, B$_5$, B$_6$ and B$_7$ and the differentiated transformation matrices M$_1'$ to M$_6'$ are loaded in the buffer registers b$_1$ to b$_6$. In the next unit time, M$_5$ loaded in the buffer register B$_5$ and M$_6$ loaded in the buffer register B$_6$ are multiplied by means of the multiplier circuit MP$_1$ so that M$_5 \times$M$_6$ is loaded in the buffer register B$_6$. In the same manner, M$_5' \times$M$_6$ is loaded in the buffer register b$_5$ by means of the multiplier circuit MP$_2$. During this time, the matrices in the blocks (including the differentiated matrices) are shifted by one block so that they are prepared for the following multiplication. In the next unit time, M$_4 \times$M$_5 \times$M$_6$ is loaded in the buffer register B$_6$ and M$_4' \times$M$_5 \times$M$_6$ is loaded in the buffer register b$_6$. At this time, in the buffer register b$_1$, M$_5' \times$M$_6$ which was loaded previously in the buffer register b$_6$ is loaded. In the buffer register B$_7$, M$_4$ which was loaded initially in the buffer register B$_4$ will be loaded. Subsequently, such processing is repeated and finally, M$_1 \times$M$_2 \times$M$_3 \times$M$_4 \times$M$_5 \times$M$_6$, M$_2$, M$_3$, M$_4$, M$_5$, M$_6$ and M$_1 \times$M$_2 \times$M$_3 \times$M$_4 \times$M$_5 \times$M$_6$ are loaded respectively in the buffer registers B$_1$, B$_2$, B$_3$, B$_4$, B$_5$, B$_6$ and B$_7$. On the other hand, M$_1' \times$M$_2 \times$M$_3 \times$M$_4 \times$M$_5 \times$M$_6$, M$_1 \times$M$_2' \times$M$_3 \times$M$_4 \times$M$_5 \times$M$_6$, M$_1 \times$M$_2 \times$M$_3' \times$M$_4 \times$M$_5 \times$M$_6$, M$_1 \times$M$_2 \times$M$_3 \times$M$_4' \times$M$_5 \times$M$_6$, M$_1 \times$M$_2 \times$M$_3 \times$M$_4 \times$M$_5' \times$M$_6$ and M$_1 \times$M$_2 \times$M$_3 \times$M$_4 \times$M$_5 \times$M$_6'$ are loaded respectively in the buffer registers b$_1$, b$_2$, b$_3$, b$_4$, b$_5$ and b$_6$. The date are transferred from the buffer register b$_1$ to the microprocessor.

In the microprocessor, an inverse $[J(\vec{\alpha})]^{-1}$ of the Jacobian $J(\vec{\alpha})$ thus obtained is calculated and the change amount of each articulation angle is calculated using the equation (18).

In the same manner as stated above, transformation from the hand coordinate system into the absolute coordinate system can be made using the data $M_1 \times M_2 \times M_3 \times M_4 \times M_5 \times M_6$ obtained in the buffer register $B_7$.

In a preferred embodiment of the present invention, a hardware circuit in accordance with the FIG. 12 circuit is composed of an integrated circuit provided aside from the CPU.

Figures 13, 22:
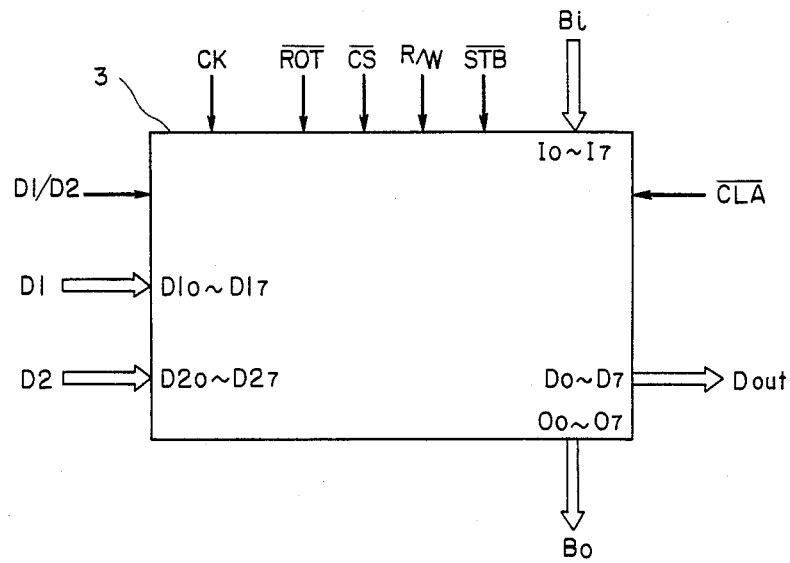
FIG. 13 is a block diagram showing an integrated circuit to be used in an embodiment of the present invention.
FIG. 22 shows a processing calculation loop in the Resolved Motion Rate Control.

FIG. 13 is a block diagram showing an example of an integrated circuit to be used in the present embodiment. This integrated circuit 3 is a shift register in which 16 eight-bit registers are provided, which will be explained afterwards in detail. The integrated circuit 3 is connected to the microprocessor or CPU and includes input ports $I_0$ to $I_7$ connected to an input bus Bi and output ports $O_0$ to $O_7$ connected to an output bus Bo. The data from the microprocessor or CPU is given by means of the input ports $I_0$ to $I_7$ of the input bus Bi and data is outputted to the CPU through the output ports $O_0$ to $O_7$ of the output bus Bo. The data from other integrated circuits are given to the corresponding input ports $D1_0$ to $D1_7$ or $D2_0$ to $D2_7$, respectively, through the data bus D1 or D2. The data output to other integrated circuits is supplied through the output Dout ($D_0$ to $D_7$). The selection of data is made by signals $D_1/D_2$ given from the CPU. In addition, the integrated circuit 3 receives a shift clock CK for the shift register included therein as well as other signals $\overline{ROT}$, $\overline{CS}$, R/W, $\overline{STB}$ and $\overline{CLA}$.

Figure 14:
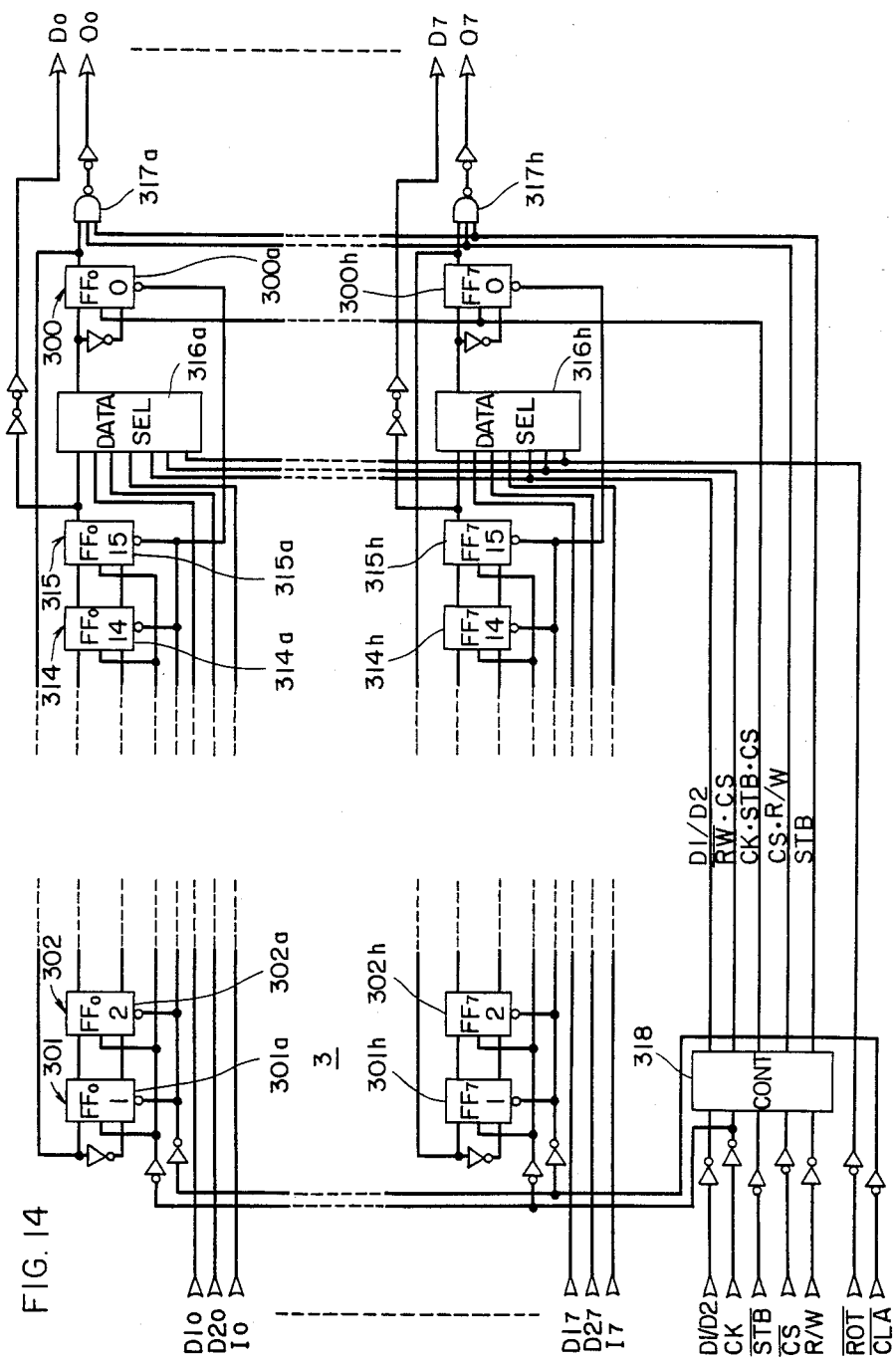
FIG. 14 is a circuit diagram showing a more detailed internal structure of the integrated circuit in FIG. 13.

FIG. 14 is a block diagram showing in detail the above described integrated circuit. The integrated circuit 3 includes 16 eight-bit registers 300 to 315, each of which is composed of eight flip-flops. For example, a register 300 is composed of flip-flops 300a to 300h and a register 315 is composed of flip-flops 315a to 315h. The respective flip-flops 300a to 300h of the register 300 receive the data output from the respective data selectors 316a to 316h and the output from these flip-flops 300a to 300h is supplied to one input of each of the NAND gates 317a to 317h and is also supplied to the respective flip-flops 301a to 310h constituting the register 301 of the next stage. Then, the content of the register 301 is sent to the registers 302, . . . 314 and 315, successively. The shift register is thus comprised of the registers 300 to 315. The outputs of the respective flip-flops 315a to 315h of the register 315 are given to the corresponding data selectors 316a to 316h and also serve as the respective bits $D_0$ to $D_7$ of the data output Dout. The data selectors 316a to 316h are provided respectively with data inputs D1 and D2, that is, $D1_0$ to $D1_7$ and $D2_0$ to $D2_7$ and also with input buses Bi, that is, $I_0$ to $I_7$. To the data selectors 316a to 316h, furthermore, a signal $D_1/D_2$ through a controller 318 and a logical product $\overline{R} \cdot \overline{CS}$ of an inversion of signal R/W and an inversion of signal $\overline{CS}$ are supplied and also a signal $\overline{ROT}$ is supplied. In this case, the signal $D_1/D_2$ is a command signal for selectively taking either the data inputs $D1_0$ to $D1_7$ or $D2_0$ to $D2_7$. For example, when the signal is "1", the data inputs $D1_0$ to $D1_7$ are selected, and when the signal is "0", the data inputs $D2_0$ to $D2_7$ are selected. The signal R/W makes a selection for writing data to the register or reading data from the register. With "1", reading is to be done and with "0", writing is to be done. The signal $\overline{CS}$ is a tip selecting signal and with "0", the corresponding device is selected. The signal $\overline{ROT}$ is a rotation signal which serves for shifting the contents of the registers 300 to 315 respectively to the registers of the next stage, the shifting operation being commanded by "0". Such shifting operation is needed for writing of data as well as for reading of data, since the apparatus is structured such that writing and reading of data can be performed only from the register 300.

The remaining two inputs of the NAND gates 317a to 317h receiving the outputs of the flip-flops 300a to 300h of the register 300 are supplied, through the controller 318, with a logical product $\overline{CS} \cdot R/W$ of an inversion of signal $\overline{CS}$ and a signal R/W and with an inversion $\overline{STB}$ of signal $\overline{STB}$. The signal $\overline{STB}$ is a strobe signal. The flip-flops 300a to 315h constituting the registers 300 to 315 are supplied with a signal CLA, which is clear signal. The flip-flops 301a to 315h of the registers 301 to 315 are supplied with a clock signal CK. The flip-flops 300a to 300h of the register 300 are, supplied, through the controller 318, with a logical product of the clock signal CK, a reversion of the strobe signal $\overline{STB}$ and an inversion of the tip selecting signal $\overline{CS}$, that is, $CK \cdot STB \cdot CS$, instead of the clock signal CK.

The outputs of the NAND gates 317a to 317h serve as bits $B_0$ to $B_7$ of the output bus Bo.

In the integrated circuit 3 shown in FIG. 14, 16 times of shifting between the registers 300 to 315, that is, rotation operation corresponds to one shift between the buffer registers $B_0$ to $B_7$ and $b_0$ to $b_6$ shown in FIG. 12 above. The corresponding tip is enabled with "0" of the signal $\overline{CS}$, and the data input D1 ($D1_0$ to $D1_7$) or D2 ($D2_0$ to $D2_7$) is supplied to the register 300 by means of the signal $D_1/D_2$ through the data selectors 316a to 316h when the signal R/W is "0". When the signal R/W is "1", the NAND gates 317a to 317h are rendered effective and data is read out from the flip-flops 300a to 300h of the register 300 to the output buses $B_0$ to $B_7$. The signal $D_1/D_2$ indicates the data shifting direction shown in the conceptional view of FIG. 12.

The rotation of data between the registers 300 to 315 is performed in response to the signal $\overline{ROT}$ and all the registers 300 to 315 are cleared in response to the signal $\overline{CLA}$.

Figure 15:
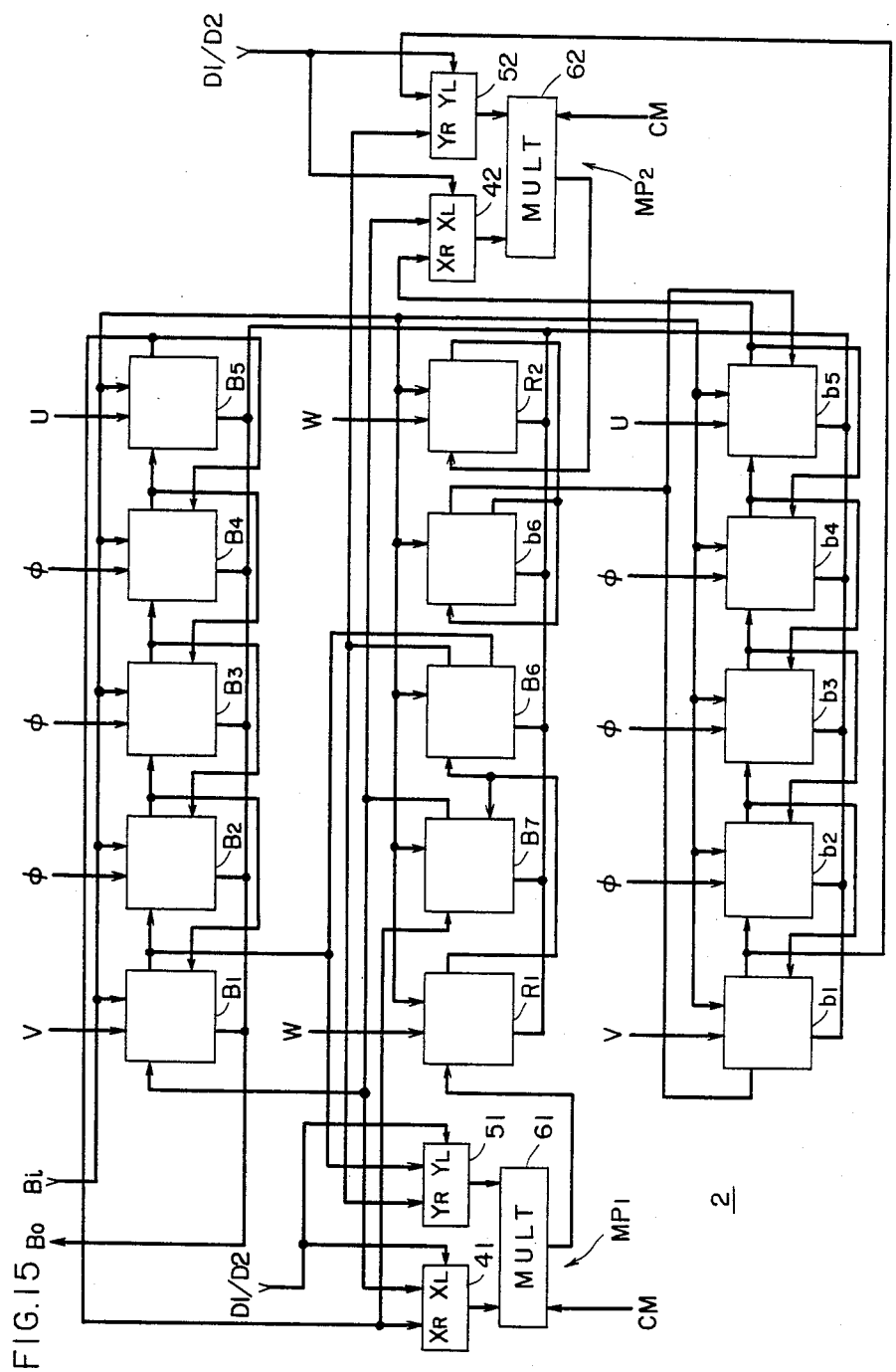
FIG. 15 is a block diagram of a calculating circuit in which the integrated circuit shown in FIG. 14 is utilized.

FIG. 15 is a block diagram showing an example of a structure for applying the FIG. 12 circuit using the integrated circuit 3 shown in FIGS. 13 and 14. The parts functionally corresponding to those in the FIG. 12 circuit are denoted by the same reference characters. The buffer registers $B_1$ to $B_7$ and $b_1$ to $b_6$ in FIG. 15 correspond respectively to those denoted by the same reference characters in FIG. 12. Each buffer register includes, in parallel, two integrated circuits as shown in FIG. 14, and accordingly, the buffer registers are constituted as 16 stages of 16-bit shift registers. The multiplier circuit $MP_1$ includes data selectors 41 and 51 and a multiplier 61. The multiplier circuit $MP_2$ includes data selectors 42 and 52 and a multiplier 62. To the data selector 41, the output of the buffer register $B_5$ is supplied as $X_R$ and the output of the register $B_7$ is supplied as $X_L$. To the data selector 51, the output of the register $B_6$ is supplied as $Y_R$ and the output of the register $B_1$ is supplied as $Y_L$. The multiplier 61 multiplies the inputs from the data selectors 41 and 51 in response to the command signal CM and the result of multiplication is loaded in the temporary storage register $R_1$. ON the other hand, to the data selector 42 included in the multiplier circuit $MP_2$, the output of the buffer register $b_5$ is supplied as $X_R$ and the output of the buffer register $B_7$ is supplied as $X_L$. To the data selector 52, the output of the buffer register $B_6$ is supplied as $Y_R$ and the output of the buffer register $b_1$ is supplied as $Y_L$. The multiplier 62 multiplies the data from the data selectors 42 and 52 in response to the command signal CM and the result of multiplication is loaded in the temporary storage register $R_2$. To the data selectors 41, 52, 42 and 52, respectively, a data selecting signal D1/D2 is applied. By means of this signal, the signals $X_R$, $Y_R$, or $X_L$, $Y_L$ are selected. The temporary storage registers $R_1$ and $R_2$ are also 16-bit shift registers comprising a combination of the integrated circuits shown in FIG. 14, in the same manner as in the other buffer registers.

The shift registers $B_1$ to $B_7$, $b_1$ to $b_6$, $R_1$ and $R_2$ are connected respectively with an input bus Bi and an output bus Bo. To the registers $B_1$ and $b_1$, a shift timing signal V from the FIG. 16 circuit described below is supplied. The registers $B_5$ and $b_5$ are supplied with a shift timing signal U. The temporary storage registers, i.e. buffer registers $R_1$ and $R_2$ are supplied with a shift timing signal W and the other registers $B_2$ to $B_4$ and $b_2$ to $b_4$ are supplied with a clock signal ∅.

Figure 16:
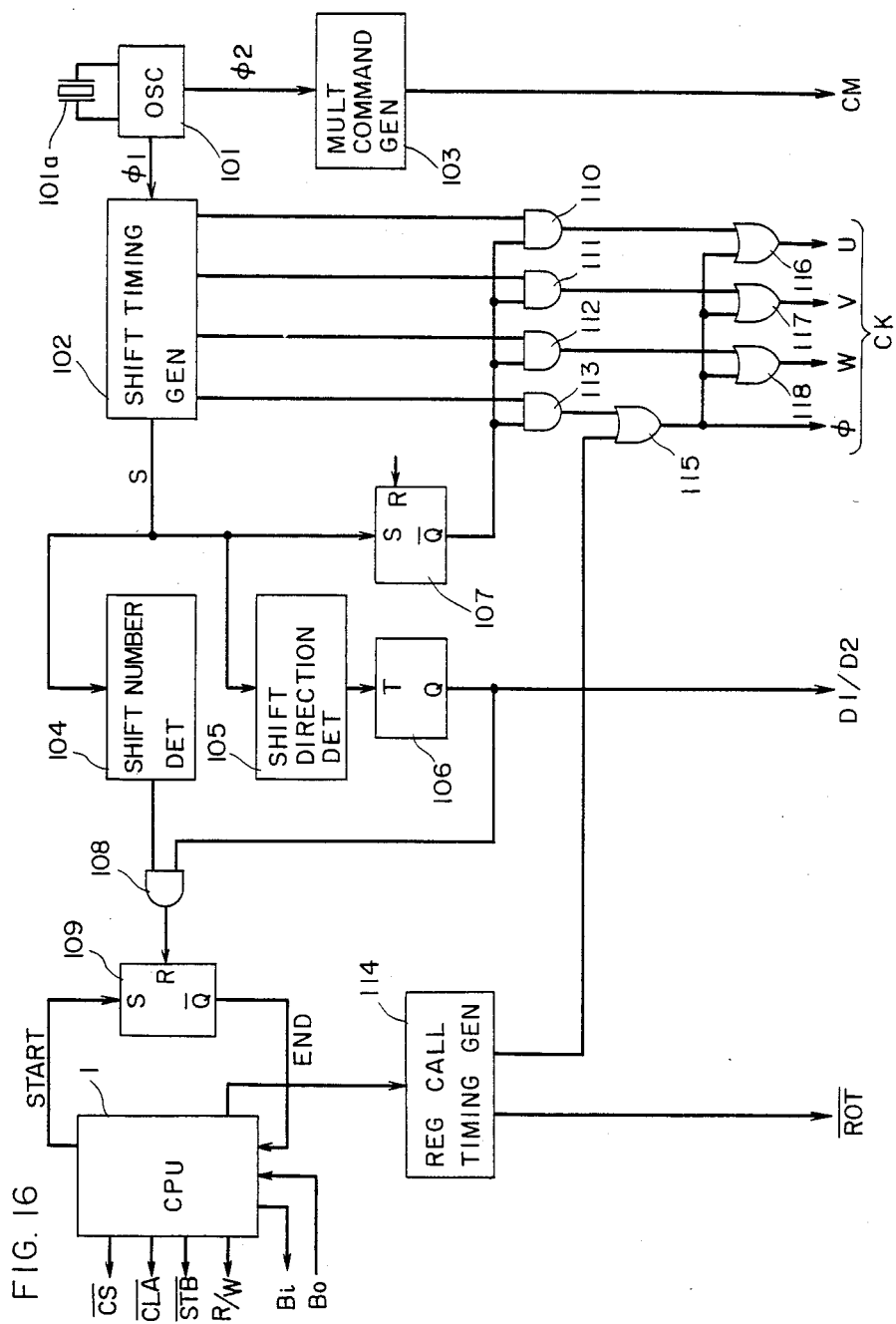
FIG. 16 is a block diagram showing circuits associated with a CPU for controlling a calculating circuit.

FIG. 16 is a block diagram showing circuits associated with the microprocessor to be connected to the calculation circuit shown in FIG. 15. Referring to FIG. 16, an oscillator 101 has a quartz 101a and outputs two-phase clock signals ∅1 and ∅2. The clock signal ∅1 is applied to a shift timing generating circuit 102 (to be described below) and the clock signal ∅2 is applied to a multiplication command generating circuit 103. From the shift timing generating circuit 102, shift timing signals U, V and W and clock signals ∅ are outputted and a signal S indicating that a sequence of shifting operation has been performed in the respective registers $B_1$ to $B_7$, $b_1$ to $b_6$, $R_1$ and $R_2$ is outputted. The signal S from the shift timing generating circuit 102 is applied to a shift number detecting circuit 104, a shift direction detecting circuit 105 and a flip-flop 107. The shift number detecting circuit 104 includes a hexadecimal counter and a flip-flop and generates output each time the number of signals S from the shift timing generating circuit 102 is counted up to 16. In other words, the circuit 104 detects completion of one circulation of data between the registers 300 to 315 shown in FIG. 14. The shift direction detecting circuit 105 includes a quinary counter and generates output each time shifting operation is performed five times in the left or right direction between the buffer registers shown in FIGS. 12 and 15. The output of the shift direction detecting circuit 105 is supplied to a flip-flop 106, which comprises a toggle flip-flop, for example, and reverses the output Q each time a signal from the circuit 105 is supplied. The output of the flip-flop 106 serves as the data selecting signal D1/D2. The flip-flop 107 comprises a J-K flip-flop, for example, and determines whether shifting operation or multiplication operation is to be performed. When the output $\overline{Q}$ is "0", data shifting operation between the buffer registers is made to be performed and when the output $\overline{Q}$ is "1", multiplication operation is made to be performed.

The output of the shift number detecting circuit 104 is applied to the input of the AND gate 108 together with the output of the flip-flop 106. The output of the AND gate 108 is applied to the reset input of the flip-flop 109. The flip-flop 109 is set by a start signal START from the CPU1 and the output $\overline{Q}$ thereof is supplied to the CPU1 as an end signal END (or an interrupting signal).

The output $\overline{Q}$ of the flip-flop 107 is supplied as one input of the respective four AND gates 110, 111, 112 and 113. To the other input of these AND gates, signals U, V, W and ∅ from the shift timing generating circuit 102 are supplied respectively. Accordingly, when the output $\overline{Q}$ of the flip-flop 107 is "1", the shift registers in the buffer registers are shifted so that multiplication operation is performed, as described above.

The CPU 1 supplies the signals from an address decoder (not shown) to a register call timing generating circuit 114. The register call timing generating circuit 114 serves for designating addresses in the respective registers shown in FIG. 15, and designates a register which is to load an initial value in response to the address input, so that it outputs a signal $\overline{ROT}$ for performing shifting, that is, rotation, of data between the registers shown in FIG. 14. When the signal $\overline{ROT}$ is "0", shifting operation is performed in the registers. When the signal is "1", shifting operation is not performed.

The designating signal from the address decoder included in the CPU1 is applied to one input of an OR gate 115 through the register call timing generating circuit 114. To the other input of the OR gate 115, the output of the AND gate 113 is applied. The output of the OR gate 115 is also applied as one input of OR gates 116, 117 and 118, to which the outputs of the AND gates 110, 111 and 112 are applied respectively. Thus, the outputs of the OR gates 115, 116, 117 and 118 serve as shift timing signals ∅, U, V and W.

From the CPU1, signals $\overline{CS}$, $\overline{CLA}$, $\overline{STB}$ and R/W are outputted.

Figure 17:
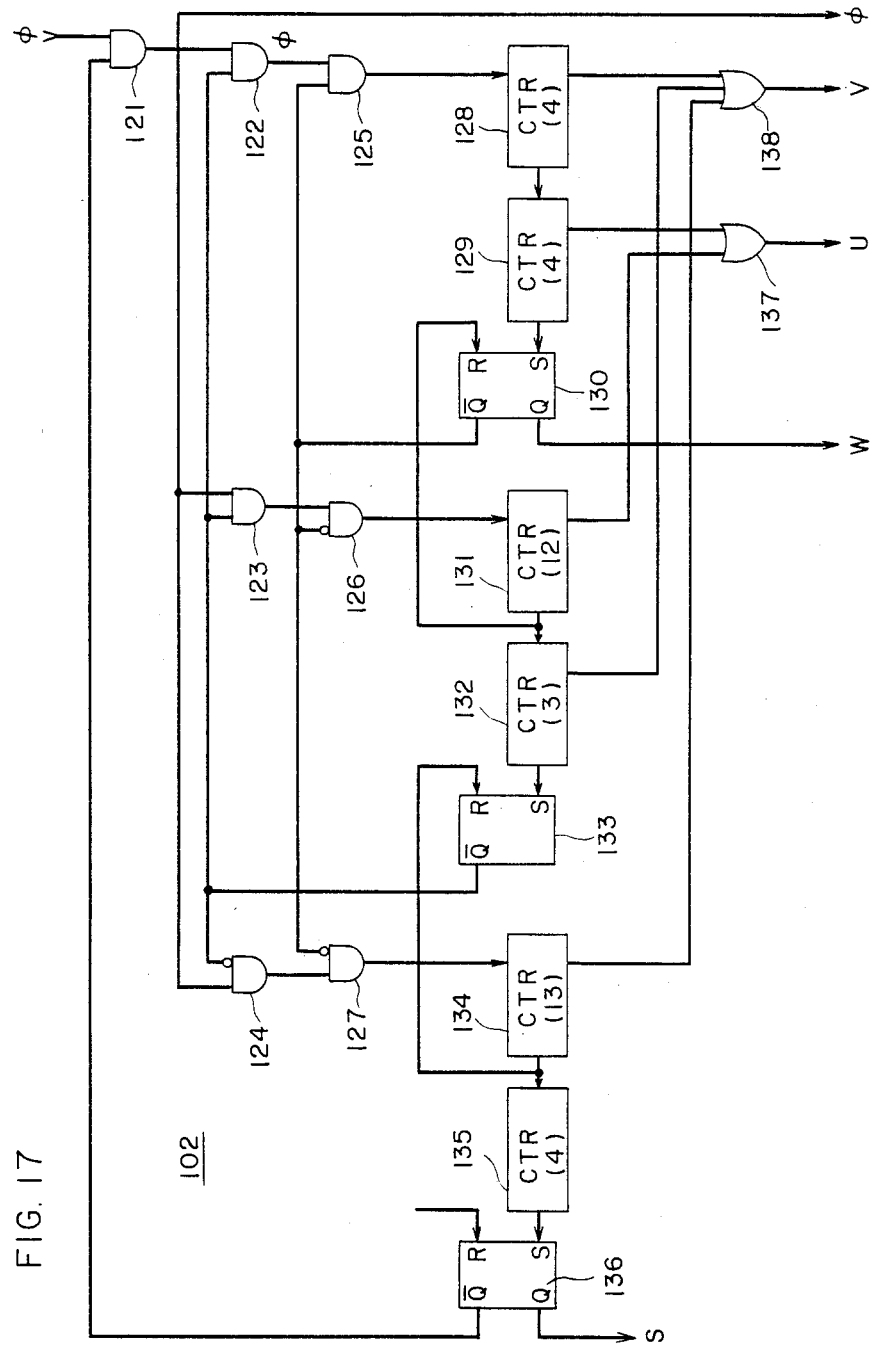
FIG. 17 is a circuit diagram showing an example of a shift timing generating circuit.

Referring to FIG. 17, a detailed description will be made of the shift timing generating circuit 102. First, in an initial state, the flip-flops 130, 133 and 136 are all reset. Accordingly, the respective outputs $\overline{Q}$ are "1". In consequence, the inputs of the AND gates 121, 122 and 123 are "1"; the input of the AND gate 124 is "0"; the input of the AND gate 125 is "1" and the inputs of the AND gates 126 and 127 are "0".

When a clock signal ∅ is applied to the AND gate 121, a clock signal ∅ is applied to a quaternary counter 128 through the AND gates 122 and 125. The counter 128, as well as other counters 129, 131, 132 and 134, includes a terminal through which the applied count input is outputted directly and a count-up output terminal through which a signal is outputted after a predetermined number is counted. When one clock signal ∅ enters the counter 128, output is generated from the OR gate 138. This output of the OR gate 138 serves as a shift timing signal V. When four clocks ∅ are given to the counter 128, a count-up signal is outputted from the counter 128 so as to be inputted to the quaternary counter 129. As a result, a shift timing signal U is outputted from the quaternary counter 129 through the OR gate 137. Accordingly, in certain cases, a shift timing signal U is outputted for four shift timing signals V. When the counter 129 counts up, that is, when 16 clock signals ∅ are outputted from the AND gate 125, the flip-flop 130 is set so that the output Q thereof becomes "1". The output Q of the flip-flop 130 serves as a data loading signal to the registers $R_1$ and $R_2$ (in FIG. 15), that is, a shift timing signal W.

When the output Q of the flip-flop 130 becomes "1" and the output $\overline{Q}$ becomes "0", the AND gates 126 and 127 are opened. However, to the AND gate 127, the output ∅ from the AND gate 124 is not applied at this time since the output $\overline{Q}$ of the flip-flop 133 is "1". On the other hand, the AND gate 125 is closed when the output $\overline{Q}$ of the flip-flop 130 is "0". Accordingly, in this state, the clock ∅ from the AND gate 121 are applied to the counter 131 through the AND gates 123 and 126. Each time the clock ∅ is applied from the gate 126, the shift timing signal U is outputted from the counter 131 through the OR gate 137. The counter 131 is a duodenary counter by which 12 clock ∅ are outputted as shift timing signals U. When the counter 131 counts 12 clocks, count-up output is applied to the counter 132 and the reset input of the flip-flop 130.

Consequently, the flip-flop 130 is reset and the counter 128 and 129 are enabled again. Then, counting of 16 clocks ∅ as described above is repeated and the flip-flop 130 is set again so that the counter 131 is enabled. This sequential operation is repeated each time the counter 131 counts up, and a signal is supplied to the counter 132 each time. The signals thus supplied are counted by the ternary counter 132, which sets the flip-flop 133. Meanwhile, each time a signal is supplied from the counter 131 to the counter 132, the shift timing signal V is outputted from the counter 132 through the OR gate 138.

When the flip-flop 133 is reset, the output $\overline{Q}$ thereof becomes "0" so that the AND gates 122 and 123 are closed and only the AND gate 124 is opened. At this time, the AND gate 127 is being opened since the flip-flop 130 is reset. Accordingly, the clock ∅ from the AND gate 121 is supplied to the counter 134. Each time the clock is supplied to the counter 134, the shift timing signal V is outputted through the OR gate 138. The counter 134 is a tridecimal counter which provides count-up output each time 13 clocks ∅ are counted. The count-up output from the counter 134 is applied to the counter 135 as well as to the reset input of the flip-flop 133. The counter 135 is a quaternary counter. The count-up output thereof is applied to the set input of the flip-flop 136. To the reset input of the flip-flop 136, a reset signal from the CPU is supplied. The output Q of the flip-flop 136 serves as a signal S shown in FIG. 16. When the flip-flop 136 is reset, the output $\overline{Q}$ becomes "1" and the AND gate 121 opens again so that the previously stated operation is repeated.

Now, referring to FIGS. 18 to 20, the meaning of the shift timing signals U, V and W from the shift timing generating circuit 102 will be explained in more detail. Generally, multiplication of the matrices as shown in FIG. 18 is carried out according to the following equations.

$$W_{44} = U_{41} \cdot V_{14} + U_{42} \cdot V_{24} + U_{43} \cdot V_{34} + U_{44} \cdot V_{44}$$
$$W_{43} = U_{41} \cdot V_{13} + U_{42} \cdot V_{23} + U_{43} \cdot V_{33} + U_{44} \cdot V_{43}$$
$$\vdots$$
$$W_{11} = U_{11} \cdot V_{11} + U_{12} \cdot V_{21} + U_{13} \cdot V_{31} + U_{14} \cdot V_{41}$$

Figures 18, 19:
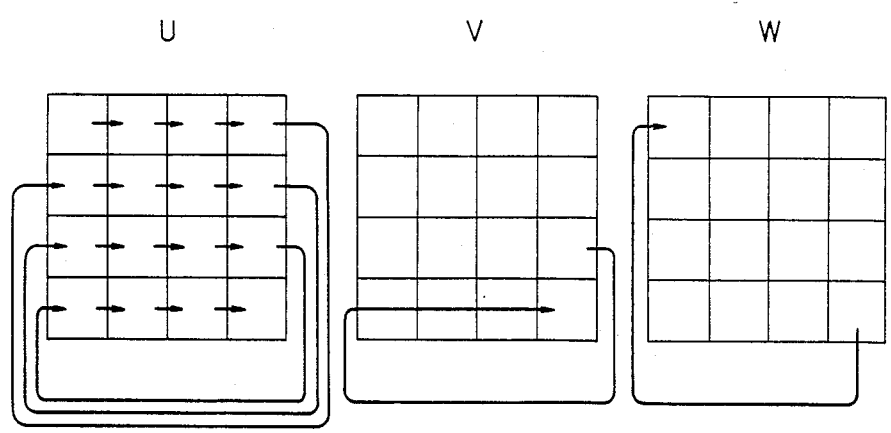

In an integrated circuit as shown in FIG. 15, the multiplication operations of the matrices shown in FIG. 18 and in the above described equations cannot be performed simultaneously. For example, first, the multiplication of $U_{44} \cdot V_{44}$ is performed and then, data shifting operation such as $U_{43} \rightarrow U_{44}$, $U_{42} \rightarrow U_{43}$, ... $V_{34} \rightarrow V_{44}$, $V_{24} \rightarrow V_{34}$, ... is performed. More specifically stated, in this embodiment, multiplication of the position of $U_{44}$ and the position of $V_{44}$ shown in FIG. 18 is made so that the data necessary for the respective positions are shifted or rotated.

The rotation or shifting operation of the data U, V and W in such matrices is performed once for each corresponding shift timing signal from the shift timing generating circuit (in FIG. 16). Each time one operation as described above is completed, the data is shifted successively, the shifting order being shown in FIG. 19. The data U are shifted by one column for one shift timing signal U. Accordingly, in the example of FIG. 18, only one shift timing signal U needs to be supplied in order that the data in the position $U_{43}$ is shifted to the position $U_{44}$. At this time, the data in $U_{42}$ is simultaneously transferred to the position $U_{43}$, and therefore, in order to transfer the data in $U_{42}$ to the position $U_{44}$, one timing signal U has only to be applied. In other words, as to the data U, one shift timing signal U has only to be applied respectively so that the respective data can be brought to the position $U_{44}$.

As to the data V, four shift timing signals V are needed. For example, referring to the example of FIG. 18, four shift timing signal V are needed in order that the data in $V_{34}$ may be shifted to the position $V_{44}$.

The data W are shifted one by one in response to one shift timing signal. Accordingly, in the example in FIG. 18, one shift timing signal W has only to be applied in order that the data in $W_{44}$ may be transferred to the position $W_{11}$.

Briefly stated, with regard to $W_{44}$ of the above described equation, if the shift timing signal W is outputted once and then the shift timing signal U is applied once and the signal V is applied four times, multiplication of one term, for example, $U_{44} \cdot V_{44}$ is performed, and therefore, the above described operation needs to be performed four times so that calculation of all the terms of $W_{44}$ is made. For the calculation of $W_{43}$, the shift timing signal U is outputted twelve times and V is shifted once so that the initial state for the calculation of $W_{43}$ is set. Then, in order to perform the calculation of $W_{43}$, operation with $W = 1$, $U = 1$ and $V = 4$ needs to be iterated four times, in the same manner as for the calculation of $W_{44}$. The subsequent calculation will be performed in the same manner.

The above described operations are represented in the timing chart in FIG. 20.

The shift timing generating circuit in FIG. 17 is structured such that the respective timing signals U, V and W are outputted in accordance with the chart in FIG. 20. More specifically, the timing signal V is outputted by the counter 128, the timing signal U is outputted by the counter 129 and the timing signal W is outputted by the flip-flop 130. After that, 12 timing signals U are outputted from the counter 131.

Figure 21B:
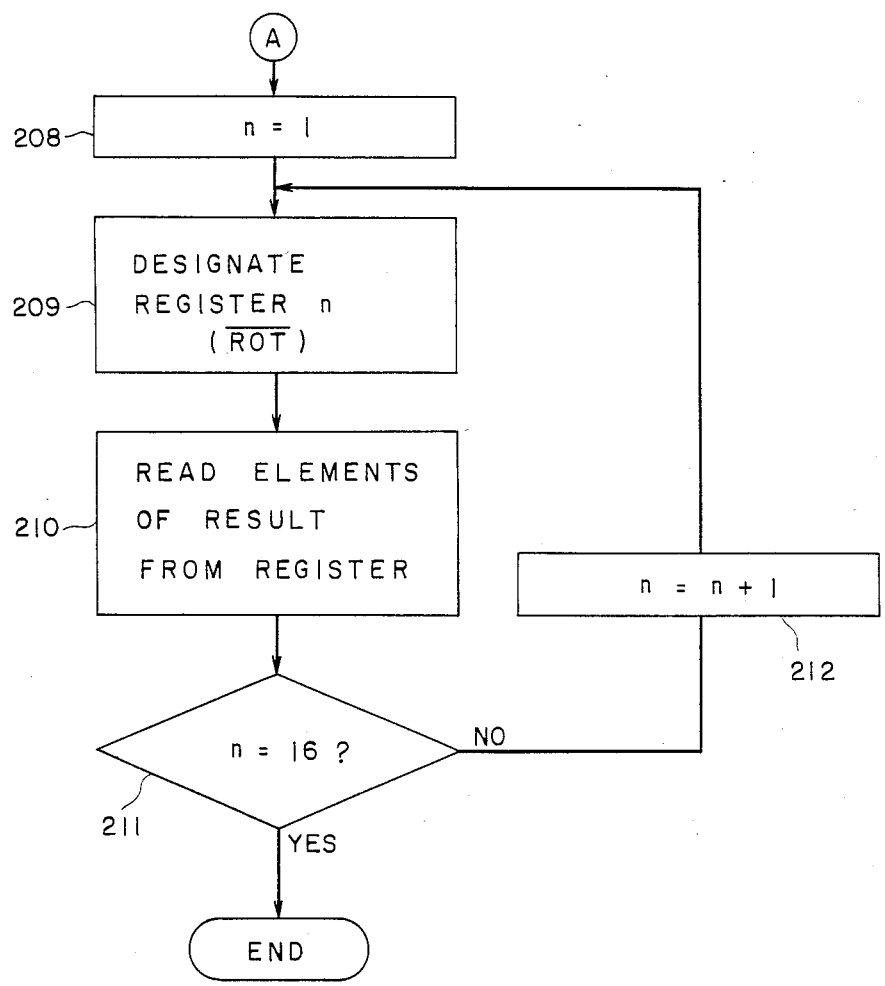

FIGS. 21A and 21B are flow charts for explaining the operation in the embodiment shown in FIGS. 15 and 16. Referring to FIGS. 21A and 21B, the operation of the embodiment is described hereinafter. First, the CPU1 (in FIG. 16) makes initial setting at the beginning of the operation. At this time, the signal $\overline{CLA}$ is outputted, if necessary, so that each register shown in FIG. 15 is cleared. In the step 201, the value n of the counter (not shown) included in the CPU1 is set to 1. This value n can take a value from 0 to 15. In the subsequent step 202, the CPU1 designates the registers 300 to 315 shown in FIG. 14 according to the value n of the counter. This designation can be made by outputting a register designating address from the CPU1 to the register call timing generating circuit 114. Accordingly, in this step 202, a signal $\overline{ROT}$ is outputted from the register call timing generating circuit 114 (in FIG. 16) so that the corresponding registers are selected. More specifically, the respective n-th registers are designated out of the registers $B_1$ to $B_7$ and $b_1$ to $b_6$ shown in FIG. 15. In the subsequent step 203, the transformation matrices $M_1$ to $M_6$ and $M_1'$ to $M_6'$ of the above stated equation (19) are stored in the corresponding registers $B_1$ to $B_7$ and $b_1$ to $b_6$ (in FIG. 15), respectively. More specifically, first, one element of Mk, Mk' (k=1 to 6) is stored in the n-th registers (in FIG. 14) out of the registers. As a result, the registers $B_1$ to $B_6$ and $b_1$ to $b_6$ in FIG. 15 are successively designated in response to the tip selecting signals $\overline{CS}$. Thus, one element of the corresponding transformation matrix is stored in the respective n-th registers of the registers $B_1$ to $B_7$ and $b_1$ to $b_6$. Then, in the step 204, it is determined whether the value in the counter is 16 or not (this value corresponding to the number of the registers shown in FIG. 14). Unless n=16, the count is incremented in the step 205 and the same operation is iterated. If n=16 in the step 204, it means that all the elements of the transformation matrices $M_1$ to $M_6$ and $M_1'$ to $M_6'$ are stored in all the registers 300 to 315 (shown i FIG. 14) of the registers $B_1$ to $B_7$ and $b_1$ to $b_6$.

Subsequently, the CPU1 provides a calculation start command signal START. Then, the flip-flop 109 is set and the flip-flop 107 is reset so that the output $\overline{Q}$ of the flip-flop 107 becomes "1". As a result, the AND gates 110 to 113 are opened and the shift timing signals U, V and W and the clock $\emptyset$ from the shift timing generating circuit 102 are enabled to be outputted. In this state, multiplication is performed.

Multiplication of the matrices is performed in accordance with FIG. 18 when the shift timing signals are generated from the shift timing generating circuit 102 with timing as shown in FIG. 20 and shifting operation is performed in accordance with FIG. 19. During this time, the data transferring (shifting) direction in the circuit shown in FIG. 15 is controlled by the shift direction detecting circuit 105 and the data selecting flip-flop 106. More specifically, the data shifting direction shown in the FIG. 12 circuit is controlled by the shift direction detecting circuit 105 and the flip-flop 106. As the data shifting operation is performed five times, the output of the flip-flop 106 is provided as a data selecting signal D1/D2. However, at this time, no signal is provided from the shift number detecting circuit 104 and therefore, the AND gate 108 does not generate output.

Whenever each calculation of $W_{44}$, $W_{43}$, ... in the above stated equation is ended, a signal is applied from the shift timing signal generating circuit 102 to the shift number detecting circuit 104. Since the number detecting circuit 104 includes a hexadecimal counter, as described above, a signal "1" is outputted when 16 signals are supplied from the shift timing generating circuit 102, that is, when all the operations in the above stated equation (19) are completed. At this time, the output of the flip-flop 106 is also "1" and a signal "1" is applied from the AND gate 108 as a reset signal of the flip-flop 109. consequently, the output $\overline{Q}$ from the flip-flop 109 becomes "1", which is supplied to the CPU1. In the CPU1, it is determined in the step 207 whether the calculation is completed or not, based on the state of the output $\overline{Q}$ of the flip-flop 109.

When the calculation is completed as described above, data are read from the respective registers 300 to 315 (in FIG. 14) of the registers $B_1$ to $B_7$ and $b_1$ to $b_6$ shown in FIG. 15, in the steps 208, 209, 210, 211 and 212, in the same manner as in the preceding steps 201, 202, 203, 204 and 205. It goes without saying that the signal R/W from the CPU1 is made to be "0" at this time, as is different from the case of writing of data. Thus, the CPU1 inputs the respective elements of Jacobian from the calculation circuit 2 so as to calculate the change amount of each articulation angle based on the above stated equation (18). At this time, the CPU performs calculating operation as shown in FIG. 22.

FIG. 22 shows a calculation loop in Resolved Motion Rate Control. In more detail, as shown in FIG. 22, the CPU calculates the change amount $d\vec{X}_{i+1}=\vec{X}_{i+1}-\vec{X}_i$ in the Cartesian coordinate system and then calculates the change amount $d\vec{\alpha}_{i+1}$ in the articular coordinate system using an inverse $[J(\vec{\alpha}_i)]^{-1}$ of the Jacobian $J(\vec{\alpha}_i)$ and $d\vec{X}_{i+1}$ calculated as described above. Finally, the immediately previous position $d\alpha_i$ in the articular coordinate system and the above stated change amount $d\vec{\alpha}_{i+1}$ are added so that the position $\vec{\alpha}_{i+1}$ at the next point in the articular coordinate system is obtained. Thus, coordinate transformation from the Cartesian coordinate system into the articular coordinate system is performed using the Jacobian.

Figure 23:
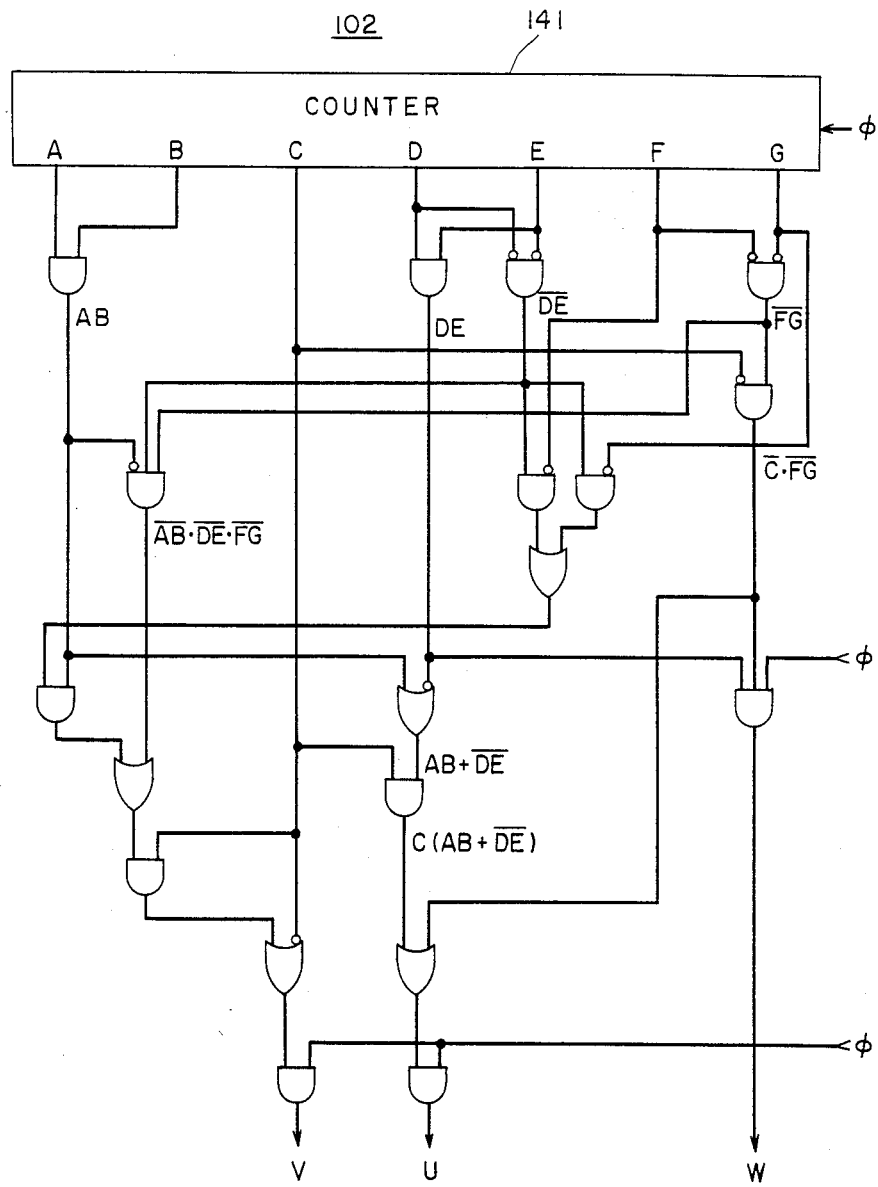
FIG. 23 is a circuit diagram showing another example of a shift timing generating circuit.

FIG. 23 is a circuit diagram showing another embodiment of a shift timing generating circuit. In this embodiment, the shift timing generating circuit 102 includes a 7-bit counter 141. A clock $\emptyset$ is applied to the count input of this counter 141. The counter 141 is structured as a binary counter having 7 bits A, B, C, D, E, F and G from the highest order bit A to the lowest order bit G. The shift timing signals U, V and W are provided respectively according to the equation (22).

$$\left. \begin{array}{l} U = \overline{C} \cdot \overline{F} \cdot \overline{G} + C\,(\overline{D} \cdot \overline{E} + AB) \\ V = \overline{C} + C\,\{\overline{AB} \cdot \overline{D\,E\,F\,G} \cdot AB \cdot (\overline{D\,D\,F} + \overline{D\,E\,G})\} \\ W = \overline{C} \cdot D\,E\,F\,G \end{array} \right\} \quad (22)$$

The clock is entered in a suitable gate for the purpose of synchronization between the respective shift timing signals and the clock. If the shift timing generating circuit as shown in FIG. 23 is utilized, an extremely simplified circuit structure can be realized as compared with the circuit shown in FIG. 17.

As described in the foregoing, in accordance with the present embodiment, calculation of the respective elements of the matrices is performed in a calculation circuit composed of specially provided hardware so that coordinate transformation is made between the Cartesian coordinate system and the articular coordinate system, and the CPU needs only to make enter the calculation results and to substitute them into suitable transformation equations. As a result, the calculation time required for coordinate transformation in the CPU is remarkable shortened, and accordingly, strictly accurate coordinate transformation can be performed without using a high speed microprocessor or microcomputer. Therefore, in contrast to a conventional type, a considerably important error will never be made and the number of the degree of freedom simultaneously controllable is not limited, and furthermore precision of follow-up control can be expected. In addition, since the time required for calculation of coordinate transformation is extremely shortened in the present embodiment, other functions can be easily included in the CPU. Furthermore, the calculation circuit only iterates similar calculation many times and can be easily adjusted to the increase or decrease in the number of the degrees of freedom to be controlled. Since such adjustment can be made only by increasing or decreasing operational functions applicable in the calculation circuit and little modification is needed in the software (program) of the CPU. This is especially advantageous in that an adjustment can be made easily according to the changes in the degrees of freedom in case where a different kind of the degree of freedom are required in changing the type of an end effecter in an articulated robot.

The method of calculation of Jacobian $J(\vec{\alpha})$ described in the foregoing will be summarized hereinafter for a more complete understanding.

Generally, transformation of $\vec{X} \rightarrow \vec{\alpha}$ can be expressed only implicitly and accordingly, in some examples in the past, the Newton-Raphson method and the like were used for solution. In addition, even if it could be expressed explicitly, it would become a complicated non-linear equation and much time was required for its calculation. In consequence, a method of making transformation of $d\vec{X} \rightarrow d\vec{\alpha}$ in the position feedback loop has been proposed. This method is called Resolved Motion Rate Control. According to this method, the relation of $d\vec{X} = d\vec{\alpha}$ becomes linear and calculation time can be shortened, but transformation must be made at high speed so that sample frequency of feedback may be heightened for practical use. This resolved motion rate control method comprises the following three steps.

(i) The coefficient of Jacobian $J(\vec{\alpha})$ is obtained.
(ii) The Jacobian inverse $[J(\alpha)]^{-1}$ is obtained.
(iii) Calculation of $d\alpha = [J(\alpha)]^{-1} \cdot d\vec{X}$ is made.

$$\ldots \ldots (18)$$

Especially for the step (i), an extremely long time was required in a conventional method using software. Therefore, in the above described embodiment, calculation of Jacobian $J(\vec{\alpha})$ is made using hardware. In the above described embodiment, calculation of the Jacobian inverse $[J(\vec{\alpha})]^{-1}$ and calculation of the equation (18) are made by the software of a microcomputer.

Now, another embodiment in which Jacobian $J(\vec{\alpha})$ is obtained by hardware will be described. Briefly stated, this embodiment comprises: matrix resisters connected as shift registers the number of which corresponds to the number of degrees of freedom (N, for example) and which serve to maintain the motion of each degree of freedom as a coordinate transformation matrix; similarly, matrix registers connected as shift registers the number of which corresponds to the number of degrees of freedom and which serve to maintain differential as to the motion of the axis of the above described coordinate transformation matrix of each degree of freedom; and a matrix multiplier. According to this embodiment, matrix multiplication is made properly in the process where matrix shifting is made in the respective shift registers, and with respect to only one matrix out of N matrices, N kinds of product matrices using differential matrices are obtained so that the coefficient of N×N Jacobian matrix is obtained.

Figure 24A:
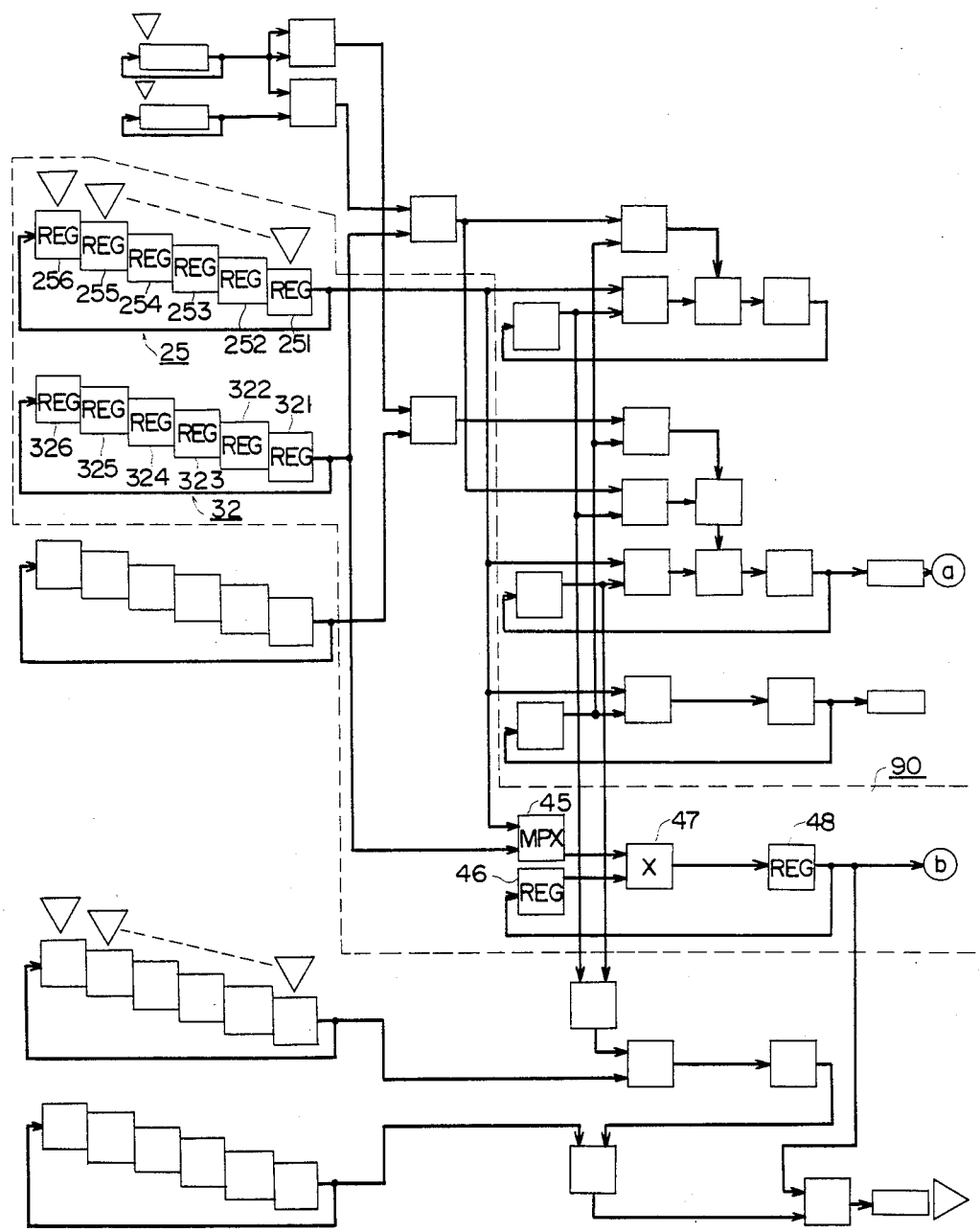
FIGS. 24A and 24B are block diagrams for explaining an apparatus for calculating a Jacobian $J(\vec{\alpha})$.
Figure 24B:
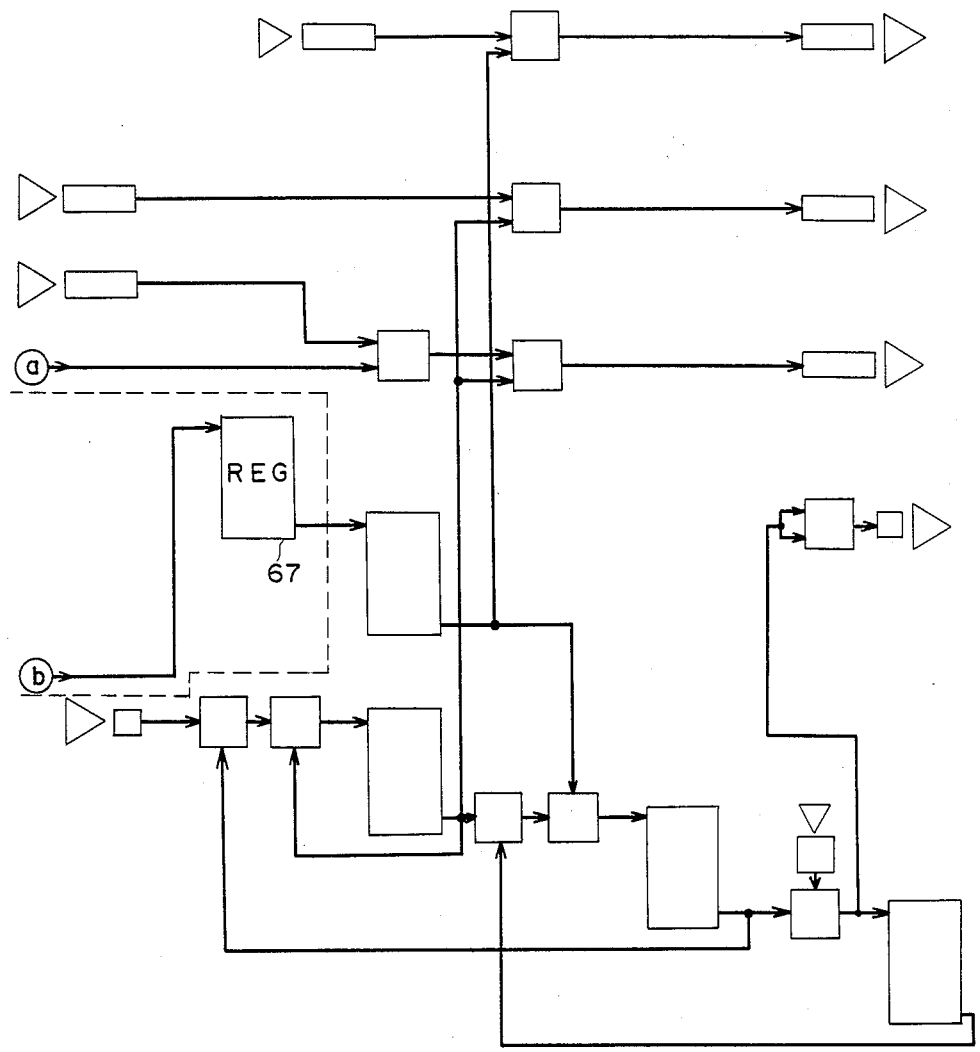

FIGS. 24A and 24B are block diagrams for explaining an apparatus of calculating Jabocian $J(\vec{\alpha})$. These figures correspond to FIGS. 2A and 2B and the portion surrounded by a dotted line shows a Jacobian calculating portion 90. Matrix shift registers 25 and 32 are connected to the input portion of a matrix multiplexer 45. The output portion of the matrix multiplexer 45 is connected to the input portion of a matrix multiplier 47. To the input portion of the matrix multiplier 47, a matrix register 46 is further connected. A matrix register 48 is connected to the output portion of the matrix multiplier 47 and a matrix register 67 is connected to the output portion of the matrix register 48. The matrix shift register 25 comprises six matrix registers 251 to 256. In the same manner, the matrix shift register 32 comprises six matrix registers 321 to 326.

The matrix shift register 25 maintains coordinate transformation matrices $M_1$ to $M_6$ of the respective degrees of freedom. These coordinate transformation matrices are supplied from a microcomputer (not shown). The matrix shift register 32 maintains differential matrices $M_1'$ to $M_6'$ concerning the motions of the axes of the coordinate transformation matrices in the respective degrees of freedom. These differential matrices are supplied also from the microcomputer. The matrix multiplexer 45 is a selector by which either the matrix shift register 25 or the matrix shift register 32 is selected so that it is connected to the matrix multiplier 47. The matrix multiplier 47 and matrix registers 48 and 46 are respectively equivalent to the matrix multiplier 41 and matrix register 42 and 43 described with reference to FIG. 6. The matrix register 67 is a 6×6 matrix register.

Figure 25A:
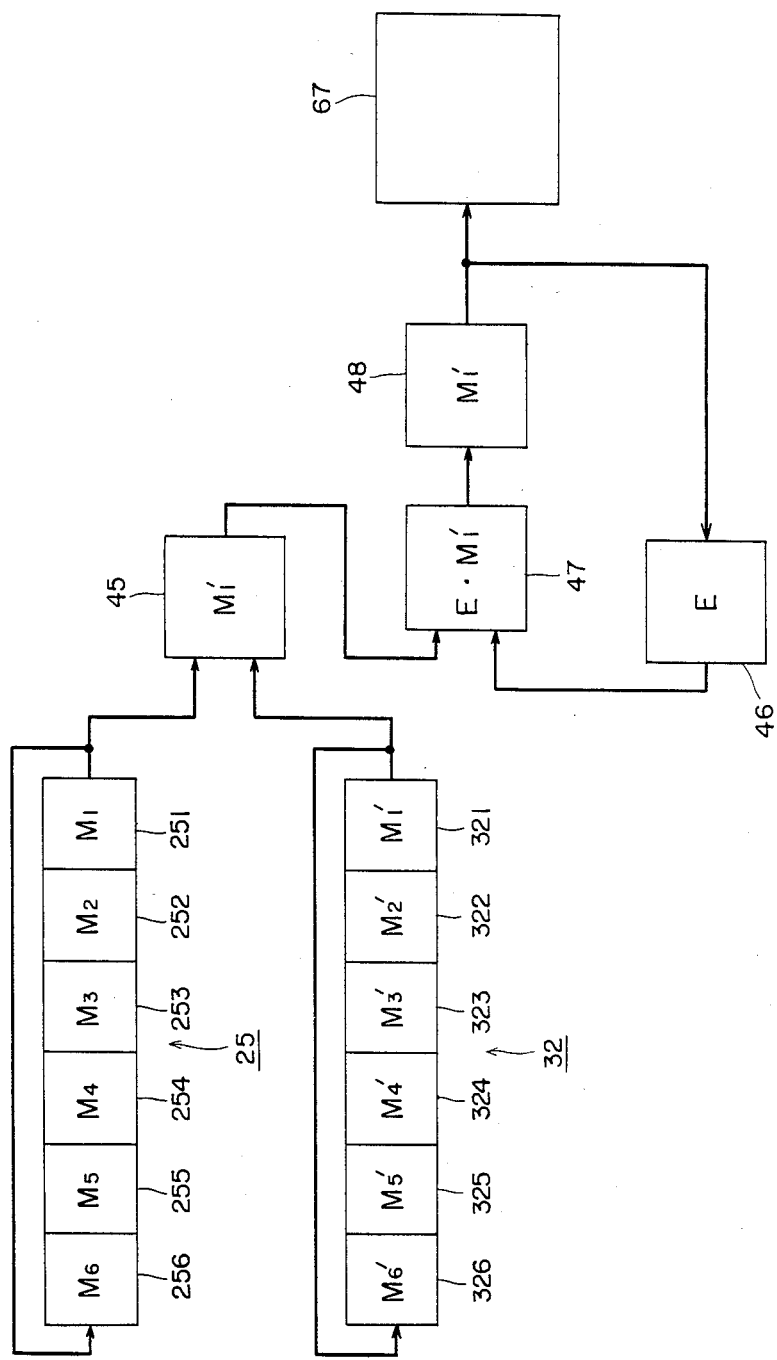
FIGS. 25A to 25C are views explaining the operation of a Jacobian calculating portion.
Figure 25:
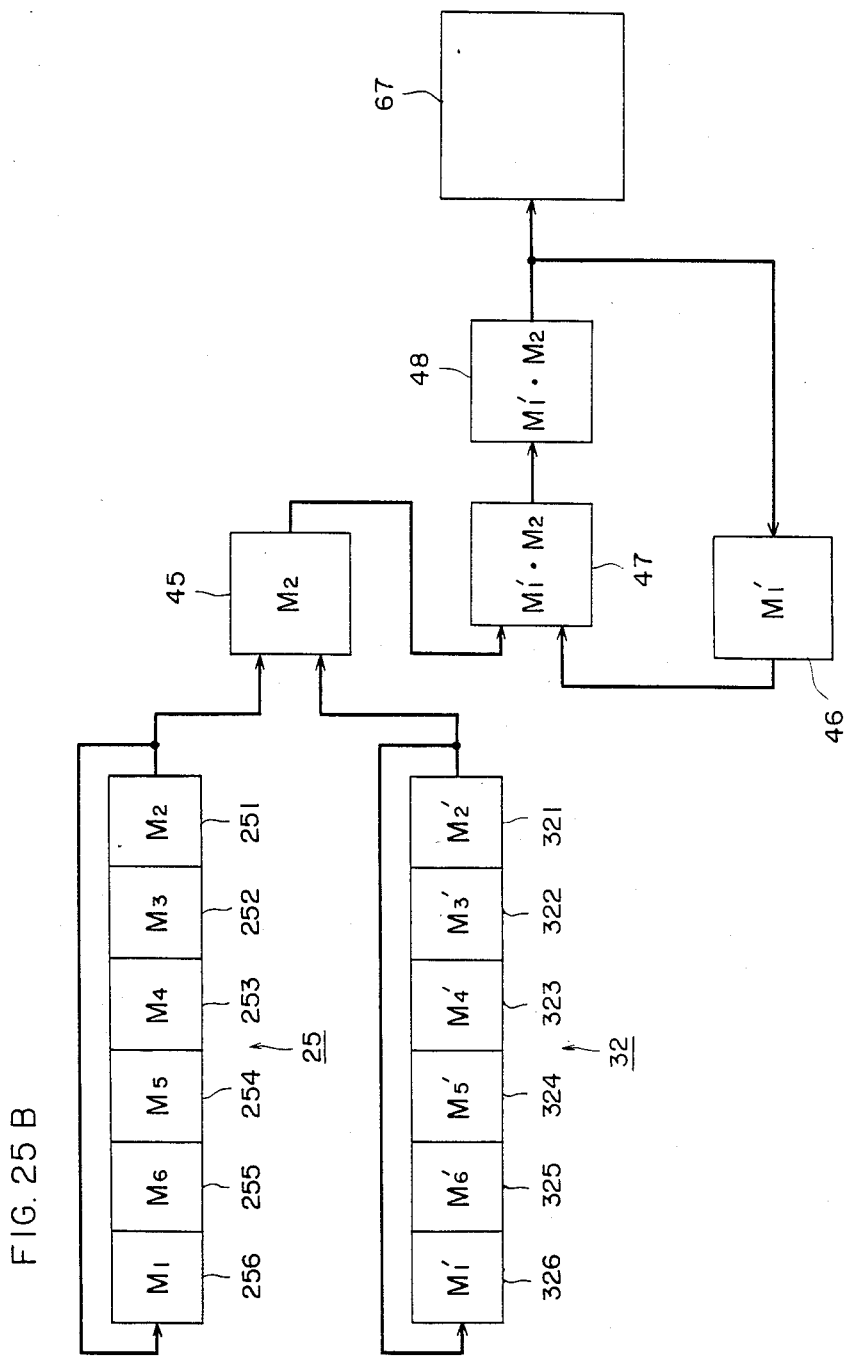
Figure 25:
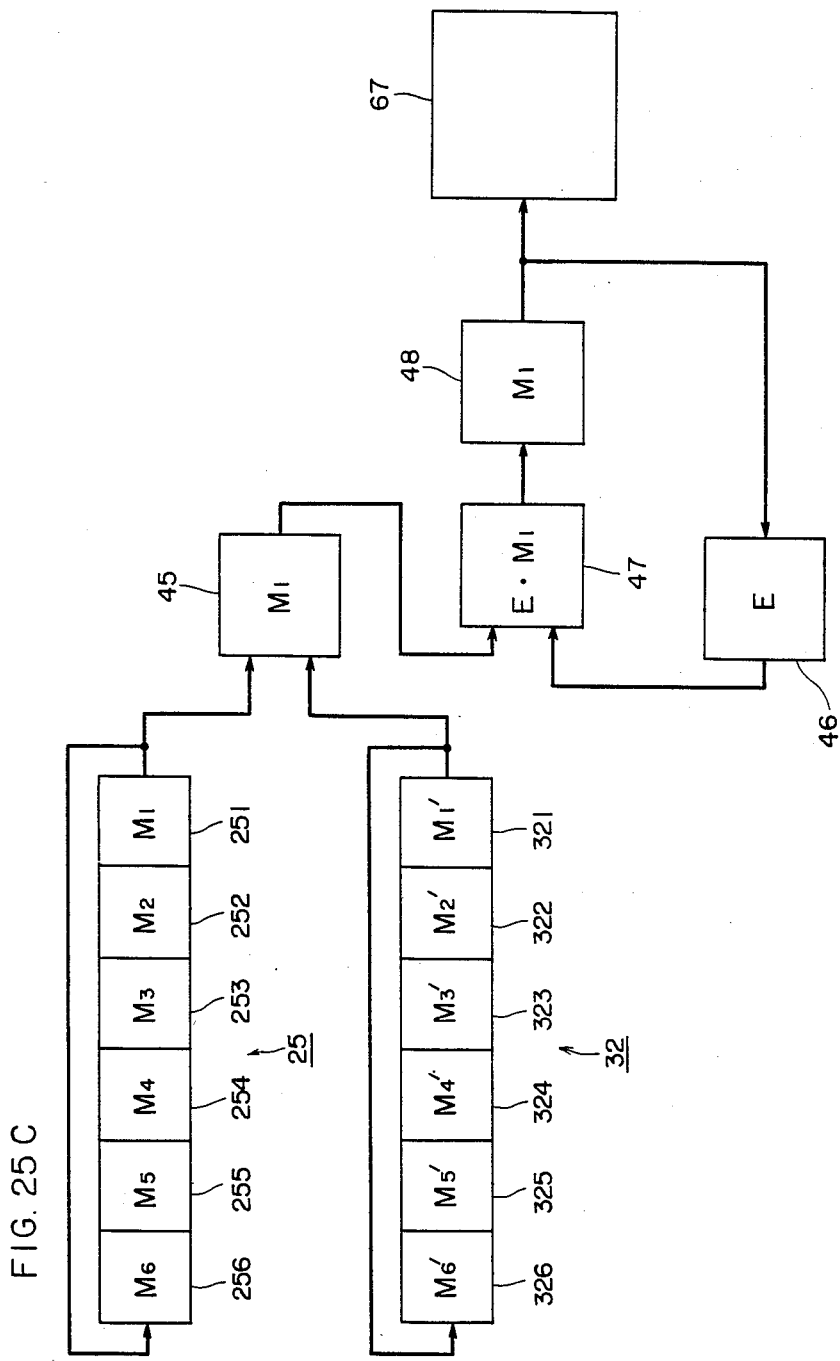

In the following, the operation will be described. FIGS. 25A to 25C are view for explaining the operation of a Jacobian calculating portion 90. First, referring to FIG. 25A, matrices $M_1$ to $M_6$ are maintained respectively in the matrix registers 251 to 256 of the matrix shift register 25. Matrices $M_1'$ to $M_6'$ are maintained respectively in the matrix registers 321 to 326 of the matrix shift register 32. The matrix multiplexer 45 is made to select the matrix shift register 32. The matrix register 46 is initialized to the unit matrix E. Consequently, a product of the matrix $M_1'$ and the unit matrix E is obtained in the matrix multiplier 47 and the matrix $M_1'$ obtained as the result is loaded in the matrix register 48.

Then, referring to FIG. 25B, in response to the above described clock signals $\emptyset A$ and $\emptyset B$, the contents of the matrix shift registers 25 and 32 are rotated by one block in the right direction shown in the drawing. The matrix multiplexer 45 is made to select the matrix shift register 25 (and this state is maintained hereinafter). In the matrix register 46, the matrix $M_1'$ which is the content of the matrix register 48 is loaded. In the matrix multiplier 47, the product of the matrix $M_2$ and the matrix $M_1'$ is obtained and a matrix $M_1' \cdot M_2$ obtained as the result is loaded in the matrix register 48.

Subsequently, in the same manner, matrices $M_1' \cdot M_2 \cdot M_3$, $M_1' \cdot M_2 \cdot M_3 \cdot M_4$, $M_1' \cdot M_2 \cdot M_3 \cdot M_4 \cdot M_5$ are loaded successively in the matrix register 48 and finally, a matrix:

$$M_1' \cdot M_2 \cdot M_3 \cdot M_4 \cdot M_5 \cdot M_6 \qquad (23)$$

is loaded in the matrix register 48. At this moment, the first calculation process is brought to an end. The equation (23) is one of the matrix products of the above described equation (19). From the equation (23), six elements of Jacobian $J(\vec{\alpha})$: $\partial P_X/\partial \alpha_1$, $\partial P_Y/\partial \alpha_1$, $\partial P_Z/\partial \alpha_1$, $\partial n_X/\partial \alpha_1$, $\partial n_Y/\partial \alpha_1$ and $\partial n_Z/\partial \alpha_1$ are obtained and these elements are loaded in a suitable portion in the matrix register 67, for example, in the sixth column.

Next, referring the FIG. 25C, the second calculation process will be described. At first, matrices $M_1$ to $M_6$ are maintained respectively in the matrix registers 251 to 256 and matrices $M_1'$ to $M_6'$ are maintained respectively in the matrix registers 321 to 326. The matrix multiplexer 45 is made to select the matrix shift register 25 and in the matrix register 46, initialization is made with the unit matrix E. By calculation in the matrix multiplier 47, the matrix $M_1$ is loaded in the matrix register 48.

Then, in the same manner as described above, in response to the clock signals $\emptyset A$ and $\emptyset B$, the contents of the matrix shift registers 25 and 32 are rotated by one block in the right direction shown in the drawing. As a result, the matrix $M_1$ is loaded in the matrix register 46 and the matrix multiplexer 45 is made to select the matrix shift register 32. By calculating operation in the matrix multiplier 47, a matrix $M_1 \cdot M_2'$ is loaded in the matrix register 48.

Then, the matrix multiplexer 45 is made to select the matrix shift register 25 and the same operation as described above is performed. Finally, a matrix:

$$M_1 \cdot M_2' \cdot M_4 \cdot M_5 \cdot M_6 \qquad (24)$$

is loaded in the matrix register 48. This equation (24) is also one of the matrix products of the above described equation (19). Accordingly, from the equation (24), six elements for differential $\alpha_2$ of Jacobian $J(\vec{\alpha})$ are obtained. As a result, the contents of the above stated sixth column of the matrix register 67 are shifted to the fifth column and the above described six elements are loaded in the sixth column.

Subsequently, the same calculating process as described above is iterated and when the sixth process is completed, all the elements of Jabocian $J(\vec{\alpha})$ are loaded in the matrix register 67, and thus, Jacobian $J(\vec{\alpha})$ is obtained.

Also in this embodiment, calculation can be made at high speed and universality of the apparatus can be realized as in the previously stated embodiment.

Calculation of $[J(\vec{\alpha})]^{-1}$

In the following, description will be made of a method and apparatus for obtaining the Jacobian inverse $[J(\vec{\alpha})]^{-1}$. This description is related to a part of the coordinate transforming portion 6 shown in FIGS. 1A and 1B.

Calculation of the Jacobian inverse means solution of N-ary simultaneous linear equations. For the purpose of solving such equations, a sweeping out method such as the Gauβ-Jordan method is generally used for obtaining a solution at a time and also an approximation method by iteration is used in some cases. In the present embodiment, the Jacobian inverse is calculated at the servo rate, that is, at the Resolved Motion Rate and as a result, the state of the arms changes only by an infinitesimal amount. Therefore, making full use of the characteristic that the Jacobian and the Jacobian inverse change only by an infinitesimal amount and considering that approximation by iteration has only to be made once or several times at most, this embodiment provides in the form of hardware a means for calculating the Jacobian inverse, which will be described hereinafter in detail.

First, a method of approximately calculating a Jacobian inverse $J^{-1}$ (an inverse matrix of Jacobian) from Jacobian $J$ will be described.

In this embodiment, an approximation method called a method of steepest descent is used. For the purpose of clarifying the mathematical meaning of this approximation method, description is made of a case where the inverse matrix $[B]$ (whose ij element is $B_{ij}$) is obtained from an arbitrary $M \times N$ matrix $[A]$ (whose ij element is $A_{ij}$).

Since the matrix $[B]$ is an inverse matrix of the matrix $[A]$, the following relation is established:

$$[A] \times [B] = [E] \qquad (25)$$

where $[E]$ (whose ij element is $E_{ij}$) is a unit matrix. If this relation is represented as a relation between the elements, the equation:

$$\sum_k A_{ik} \cdot B_{kj} = E_{ij} \qquad (26)$$

is obtained according to the well known definition of matrix multiplication. If this equation (26) is modified, the equation:

$$\sum_k A_{ik} \cdot B_{kj} - E_{ij} = 0 \qquad (27)$$

is obtained. The equation (27) is established for all the groups of i and j, and accordingly it is a simultaneous equation composed of $M \times N$ equations.

The Jacobian in this description is related to the coordinate transformation in the real space and the respective coefficients and the solution of the equation (27) are real numbers. Accordingly, from the equation (27), if an amount V is defined as follows:

$$V = \sum_i \sum_j \left( \sum_k A_{ik} \cdot B_{kj} - E_{ij} \right)^2 \qquad (28)$$

the amount V takes zero (0) with respect to the solution of the equation (27) and a positive value with respect to other real numbers. In case of $V > 0$, the closer V gets to 0, the more accurate approximate solution can be obtained.

In the method of steepest descent, an initial value is given to $B_{mn}$ to be obtained and after that, iteration is made according to the below indicated equation for obtaining the $(s+1)$th approximate solution from the s-th approximate solution, so that an approximate solution with higher precision is obtained.

$$B_{mn}^{(S+1)} = B_{mn}^{(s)} - \lambda^{(s)} \frac{V^{(s)}}{\partial B_{mn}^{(s)}}, (S = 1, 2, 3, \ldots) \qquad (29)$$

As can be seen from the second term in the right side of the equation (28), which includes partial differentials for $B_{mn}^{(s)}$ of $V^{(s)}$, the $(s+1)$th approximate solution is obtained by moving the s-th approximate solution according to the inclination of V. $\lambda^{(s)}$ of the equation (29) is defined such that $V^{(s)}$ is minimal in $B_{mn}$. More particularly, $\lambda^{(s)}$ may be obtained from the following equation.

$$\partial V^{(s)} / \partial \alpha^{(s)} = 0 \qquad (30)$$

Since it is generally complicated to solve the equation (30) with respect to $\lambda^{(s)}$, $V^{(s)}$ is expressed as Taylor series in $\lambda^{(s)}$ so as to perform approximation, leaving only the lowest order term. Then, the following equation is obtained.

$$\lambda^{(s)} = V^{(s)} / \sum_m \sum_n \left( \frac{\partial V^{(s)}}{\partial B_{mn}^{(s)}} \right)^2 \qquad (31)$$

If the equation:

$$U^{(s)} = \sum_m \sum_n \left( \frac{\partial V^{(s)}}{\partial B_{mn}^{(s)}} \right)^2 \qquad (32)$$

is established, the following equation is obtained.

$$\lambda^{(s)} = V^{(s)}/U^{(s)} \tag{33}$$

Since $V^{(s)}$ is defined by the equation (33), the following equation is obtained in a concrete manner.

$$\frac{\partial V^{(s)}}{\partial B_{mn}^{(s)}} = -2 \sum_i A_{im} \cdot \left( E_{in} - \sum_k A_{ik} \cdot B_{kn} \right) \tag{34}$$

The method described above is summarized as follows.

(i) Using the inverse matrix $[B^{(s)}]$ which is the s-th approximate solution, the equation:

$$[A^{(S)}] \times [B^{(S)}] = [A^{(s)}B^{(s)}] \tag{35}$$

is obtained and from this equation, the matrix $[E - A^{(s)}B^{(s)}]$ is obtained. The square summation of the components of this matrix is calculated and represented as $V^{(s)}$.

(ii) From the equation:

$$[A^T] \times [E - A^{(s)}B^{(s)}] = [A^T(E - A^{(s)}B^{(s)})] \tag{36}$$

a matrix in the right side is obtained. As seen from the concrete calculating operation, the mn component element of the matrix in the right side is $\partial V^{(s)}/\partial B_{mn}^{(s)}$. Calculating the square summation of each component of this matrix, $U^{(s)}$ is obtained. In the above stated equation (36), T indicates a transposed matrix.

(iii) From $V^{(s)}$ and $U^{(s)}$, the equation: $\lambda^{(s)} = V^{(s)}/U^{(s)}$ is established.

(iv) Substituting the above described amounts into the right side of the following equation corresponding to the equation (29), $$[B^{(s+1)}] = [B^{(s)}] - \lambda^{(s)}[A^{T(s)}(E - A^{(s)}B^{(s)})] \tag{37}$$

the (s+1)th approximate inverse matrix $[B^{(S+1)}]$ is obtained.

In the foregoing, description was made of the method for obtaining the inverse matrix [B] of an arbitrary matrix [A]. Accordingly, in order to calculate an inverse $J^{-1}$ of Jacobian J in accordance with the above described method, it is only needed to consider the matrix [A] as the Jacobian J and the matrix [B] as the Jacobian inverse $J^{-1}$.

Next, description will be made of an apparatus for obtaining the Jacobian inverse $J^{-1}$ using the above described method.

Figure 26:
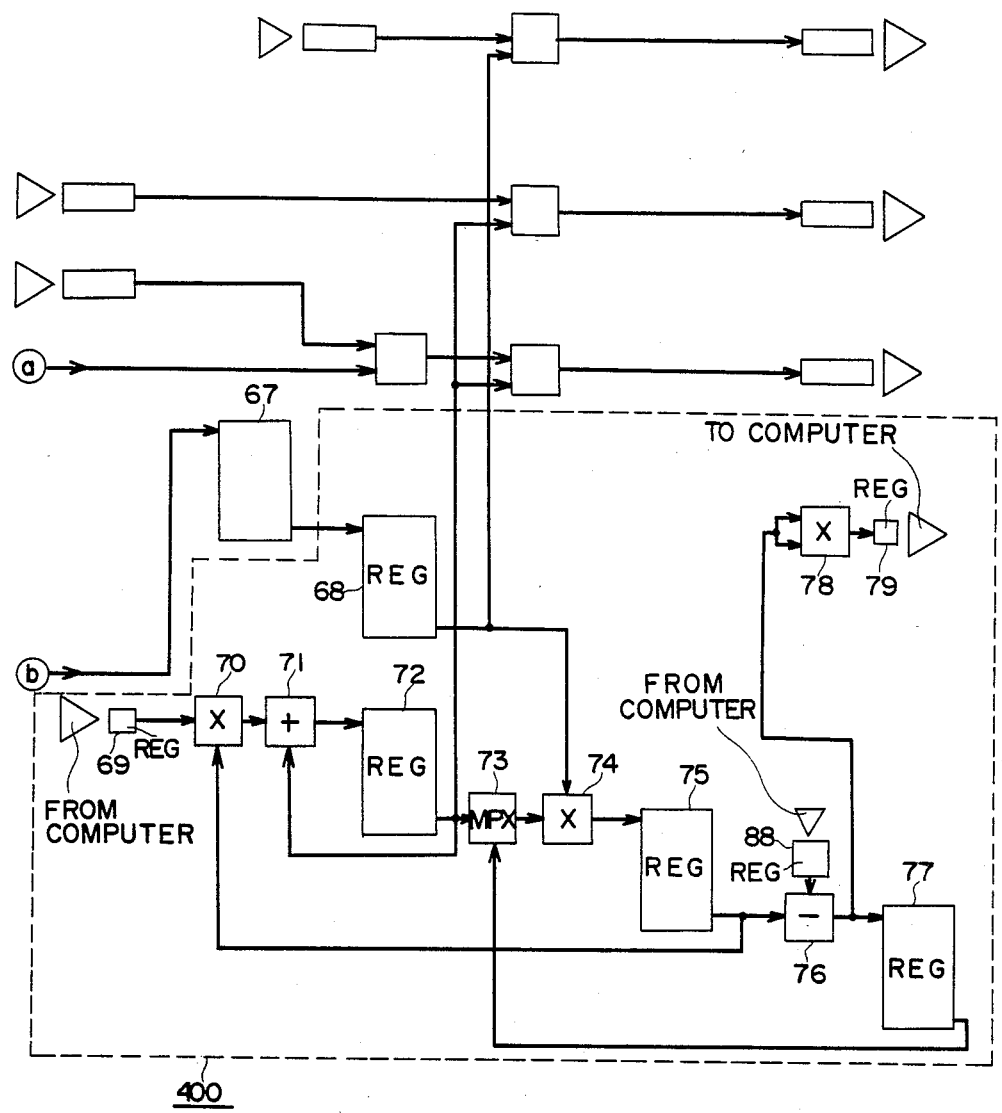
FIG. 26 is a block diagram explaining an apparatus for calculating a Jabocian inverse $J^{-1}$.

FIG. 26 is a block diagram explaining an apparatus for calculating the Jacobian inverse $J^{-1}$. FIG. 26 corresponds to FIG. 2B and the portion surrounded by a dotted line is a Jacobian inverse calculating portion 400. FIG. 27A to 27D are view for explaining the operation of the Jacobian inverse calculating portion 400.

First, referring to FIG. 26, the input portion of a buffer register 69 is connected to the microcomputer (not shown) and the output portion thereof is connected to one input portion of a matrix multiplier 70. The other input portion of the matrix multiplier 70 is connected to the output portion of a matrix register 75 to be described below. The output portion of the matrix multiplier 70 is connected to one input portion of a matrix adder 71 and the other input portion of the matrix adder 71 is connected to the output portion of a matrix register 72. The output portion of the matrix adder 71 is connected to the input portion of the matrix register 72 and the output portion of the matrix register 72 is connected to one input portion of a matrix multiplexer 73. The other input portion of the matrix multiplexer 73 is connected to the output portion of a matrix register 77 to be described below. The output portion of the matrix multiplexer 73 is connected to one input portion of a matrix multiplier 74 and the other input portion of the matrix multiplier 74 is connected to the output portion of the matrix register 68. The input portion of the matrix register 68 is connected to the output portion of the above described matrix register 67. The output portion of the matrix multiplier 74 is connected to the input portion of a matrix register 75 and the output portion of the matrix register 75 is connected to one input portion of a matrix subtracter 76. The other input portion of the matrix subtracter 76 is connected to a matrix register 88. This matrix register 88 serves to maintain 0 or the unit matrix E supplied from the microcomputer. Thus, the matrix register 88 is a register for maintaining a constant matrix and accordingly, the same operation as this can be performed by means of the control signals from the host system, without using the matrix register 88. The output portion of the matrix subtracter 76 is connected to the two input portions of a multiplier-adder 78 and to the input portion of a matrix register 77. The output portion of the multiplier-adder 78 is connected to the microcomputer (not shown) through a buffer register 79. The respective functions of these devices are the same as described above. For example, the functions of the matrix multipliers 70 and 74 are equivalent to the functions of the previously described matrix multiplier 41. More specifically, a scalar value λ and a matrix $[A^T(E-AB)]$ are outputted from the buffer register 69 and the matrix register 75, respectively, so that the product of them is obtained in the matrix multiplier 70. The product $[A^T(E-AB)]$ of the scalar value and the matrix $[A^T(E-AB)]$ is represented by the following equation:

$$\lambda[A^T(E-AB)] = \lambda E \times [A^T(E-AB)]$$

where E is a unit matrix. Accordingly, the scalar value maintained in the buffer register 69 can be regarded as the following matrix λE.

$$\lambda E = \begin{bmatrix} \lambda & 0 & 0 & 0 \\ 0 & \lambda & 0 & 0 \\ 0 & 0 & \lambda & 0 \\ 0 & 0 & 0 & \lambda \end{bmatrix}$$

Therefore, it may be said that the functions of the matrix multiplier 70 are the same as the functions of the matrix multiplier 41. The matrix registers 68, 72, 75 and 77 are expectively 6×6 matrix registers, the functions of which are the same as the functions of the matrix register 67 described above. The functions of the matrix multiplexer 73 are the same as the functions of the above described matrix multiplexer 45. The functions of the multiplier-adder 78 are the same as those of the above described multiplier-adder 82. The matrix adder 71 makes addition of two matrices. It will be easy to enable this matrix adder 71 to make subtraction between two matrices. The matrix subtracter 76 makes subtraction between two matrices.

Now, operation of the Jacobian inverse calculating portion 400 will be described. The operation to be described below is performed in response to the above described clock signals ØA and ØB.

Figure 27A:
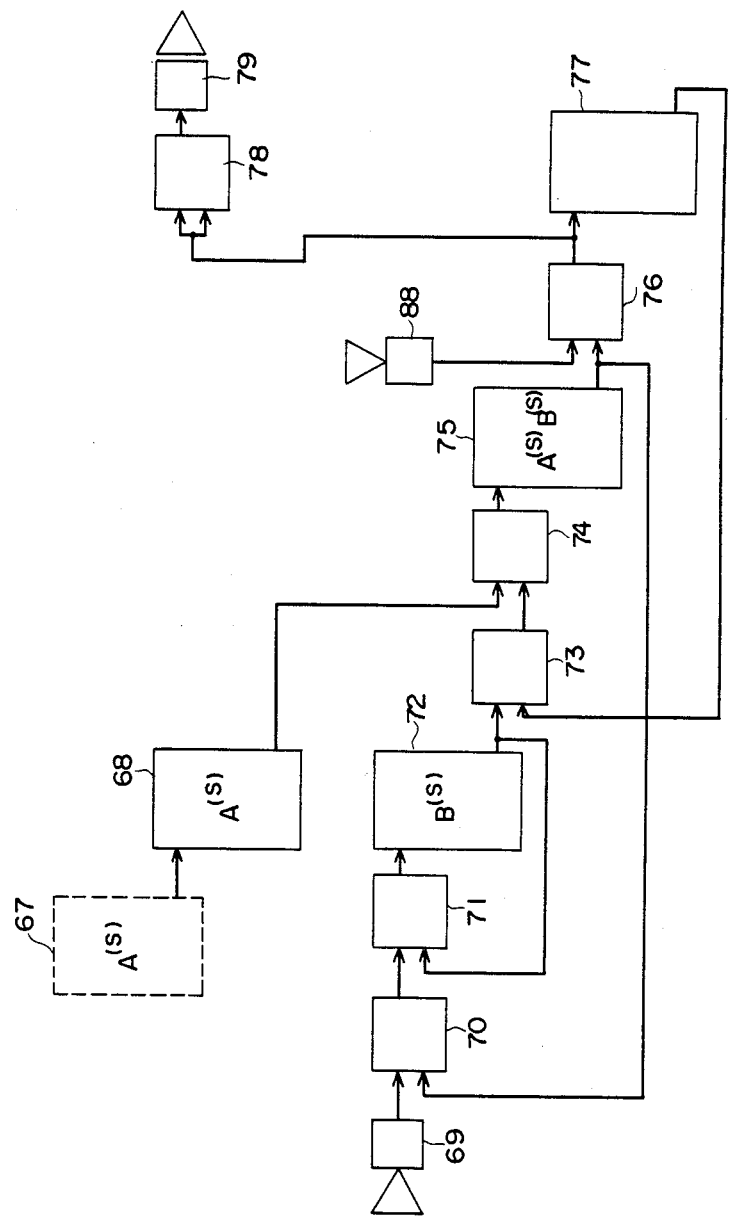

First, referring to FIG. 27A, a matrix multiplying process and the result will be described. The matrix register 68 receives the matrix [A$^{(s)}$] of the above stated equation (35) from the matrix register 67, for example. In the matrix register 72, the matrix [B$^{(s)}$] of the equation (35) is supposed to be maintained. The matrix multiplexer 73 is made to select the matrix register 72 and multiplication of the equation (35) is performed in the matrix multiplier 74 and the result of multiplication is maintained in the matrix register 75.

Then, referring to FIG. 27B, description will be made of a shifting process and the result. The unit matrix E is maintained in the matrix register 88. In the matrix subtracter 76, calculating operation for obtaining [E−A$^{(s)}$B$^{(s)}$] is performed and the result is maintained in the matrix register 77. In addition, in the multiplier-adder 78, the square summation of the components of this matrix is calculated and the result V$^{(s)}$ is maintained in the buffer register 79, from which V$^{(s)}$ is outputted to the microcomputer.

Figure 27C:
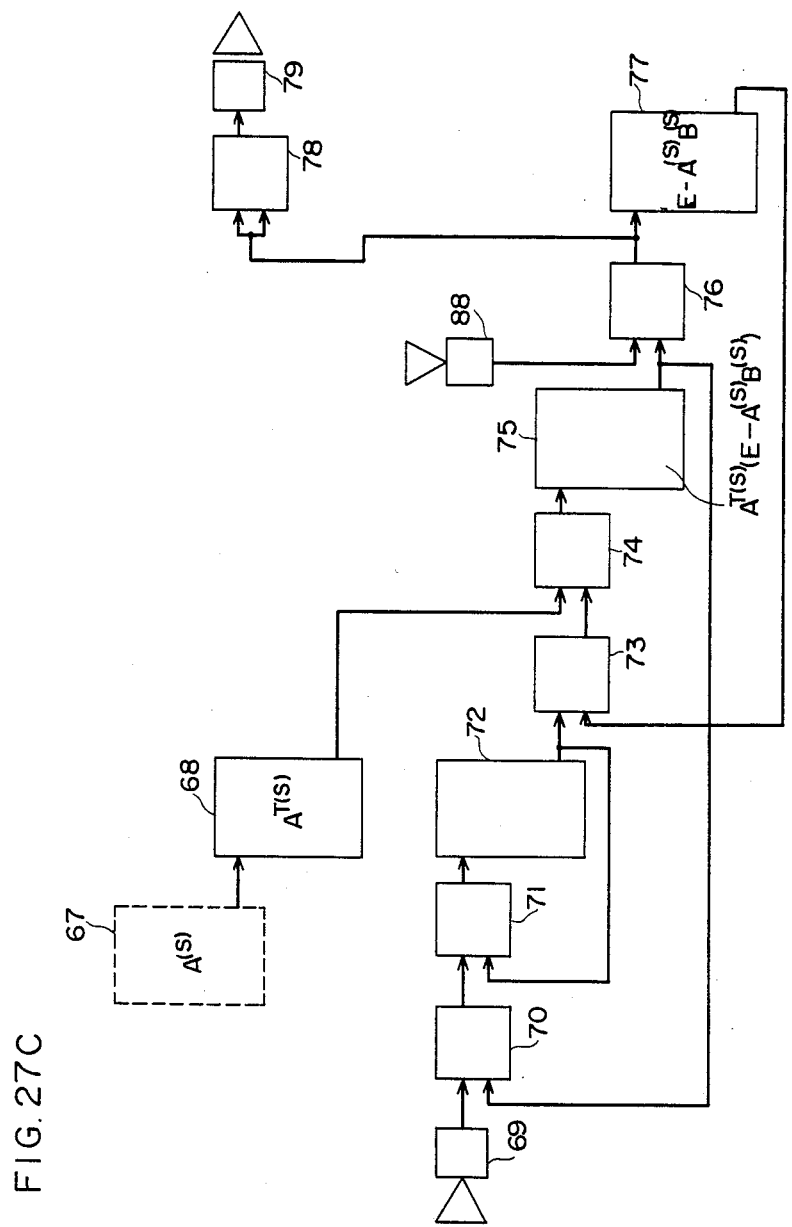

Furthermore, referring to FIG. 27C, other matrix multiplication process and the result will be described. In this matrix multiplication process, the order of supplying the data from the matrix register 68 is controlled so that the transposed matrix A$^{T(s)}$ can be assumed to have existed in appearance in the matrix register 68. The matrix multiplexer 73 is made to select the matrix register 77. The calculation of the above described equation (36) is made in the matrix multiplier 74 and the result is maintained in the matrix register 75.

Figure 27D:
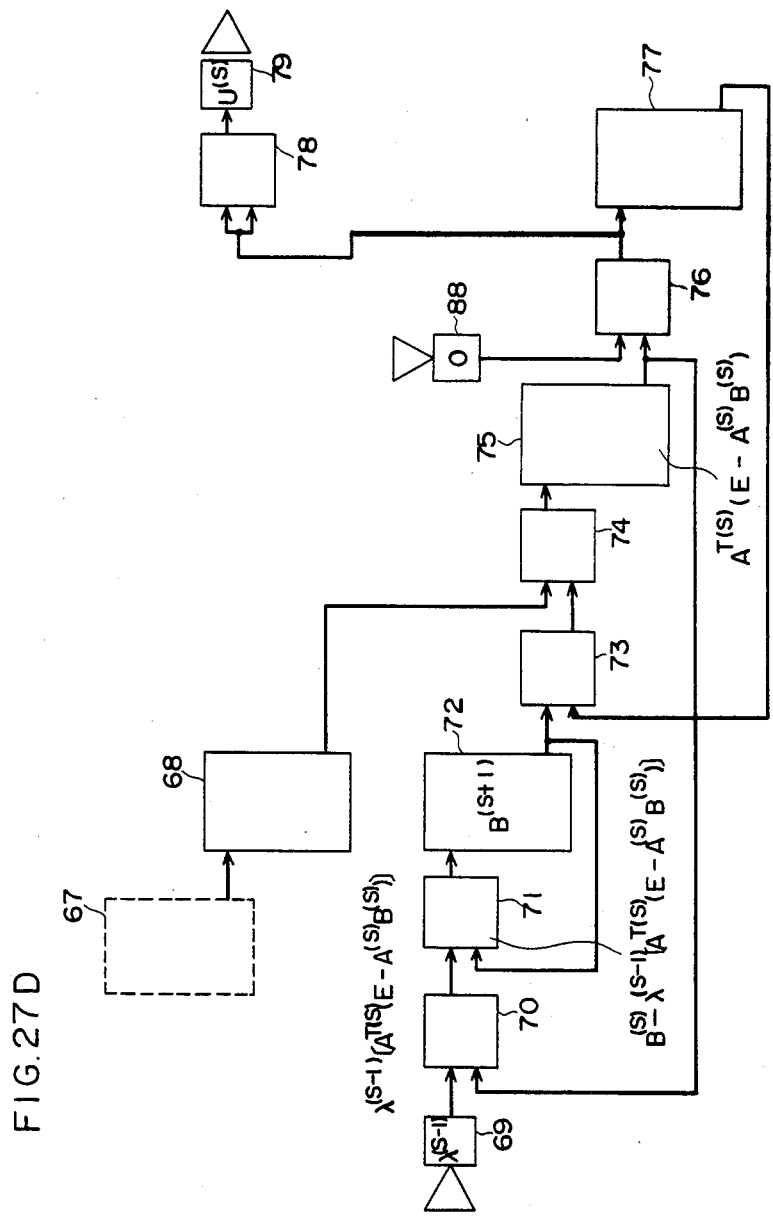

Finally, referring to FIG. 27D, other shifting process and the result will be described. Output is not given from the matrix register 88 and accordingly, the square summation of the components of the right side of the equation (36) as described above is calculated in the multiplier-adder 78 and the result U$^{(s)}$ is maintained in the buffer register 79. This U$^{(s)}$ is supplied to the microcomputer, where λ$^{(s)}$ of the equation (33) is obtained using V$^{(s)}$ obtained in the previous calculation process and U$^{(s)}$ obtained in this process. On the other hand, λ$^{(s-1)}$ given from the microcomputer is maintained in the buffer register 69. (s−1) signifies the result of the previous calculation. The result of the previous calculation is used because the result of the present calculation cannot be applied so fast, but it does not cause a serious problem. In the matrix multiplier 70, the previously described calculation of the second term of the equation (37) is performed and in the matrix adder 71, calculation of the equation (37) is performed, so that the result is maintained in the matrix register 72.

As the result of all the calculating operations described above, a new approximate matrix [B] which is an inverse matrix of the matrix [A] can be obtained using as an initial value the matrix [B] obtained in the previous calculation. Therefore, if the matrix [A] is assumed to be Jacobian J, in other words, if the matrix register 68 is made to receive Jacobian J from the matrix register 67, the Jacobian inverse J$^{-1}$ can be obtained in the output portion of the matrix register 72.

If such Jacobian inverse J$^{-1}$ is obtained using the software of a computer, the calculation time would become very long, 30 m sec, for example. On the other hand, if the Jacobian inverse J$^{-1}$ is obtained by means of hardware as in the present embodiment, the calculation time becomes very short. For example, it was ascertained to be 1 m sec or less.

Transformation from dX to dα

Description will be made hereinafter of a method and apparatus for transformation from dX to dα, which correspond to the coordinate transforming portion 6 shown in FIGS. 1A and 1B.

Figure 28:
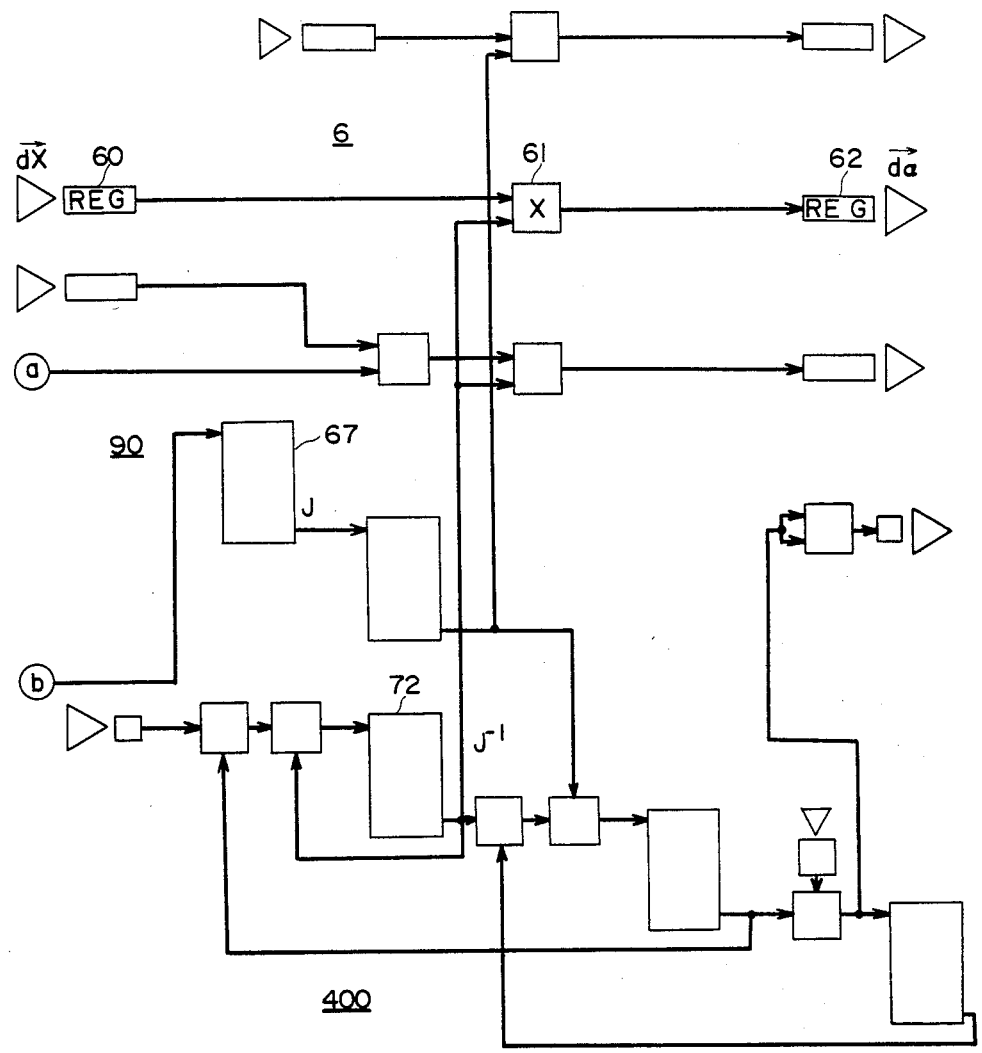
FIG. 28 is a block diagram for explaining a portion for coordinate transformation from $d\vec{X}$ to $d\vec{\alpha}$.

FIG. 2B is a block diagram explaining a portion for coordinate transformation from dX to dα. FIG. 28 corresponds to FIG. 2B. The coordinate transforming portion 6 further comprises a buffer register 60, a matrix multiplier 61 and a buffer register 62, besides the above described Jacobian calculating portion 90 and Jacobian inverse calculating portion 400. The input portion of the buffer register 60 is connected to the microcomputer (not shown) and the output portion thereof is connected to one input portion of the matrix multiplier 61. The other input portion of the matrix multiplier 61 is connected to the output portion of the above described matrix register 72. The output portion of the matrix multiplier 61 is connected to the input portion of the buffer register 62 and the output portion of the buffer register 62 is connected to the microcomputer.

The matrix multiplier 61 has the same functions as in the above described matrix multiplier 41, and multiplication of two matrices is performed in the matrix multiplier 61. More particularly, as described afterwards, a vector amount $d\vec{X}$ and a matrix $[J(\vec{\alpha})]^{-1}$ are outputted from the buffer register 60 and from the matrix register 72, respectively, so that the product of them is obtained in the matrix multiplier 61. The product $[J(\vec{\alpha})]^{-1} d\vec{X}$ of the vector amount $d\vec{X}$ and the matrix $[J(\vec{\alpha})]^{-1}$ is represented as follows:

$$[J(\vec{\alpha})]^{-1} d\vec{X} = [J(\vec{\alpha})]^{-1} \times [d\vec{x}\ \vec{0}\ \vec{0}\ \vec{0}]$$

Accordingly, the vector amount $d\vec{X}$ maintained in the buffer register 60 can be regarded as the following matrix:

$$[d\vec{X}\ \vec{0}\ \vec{0}\ \vec{0}]$$

Accordingly, it may be said that the functions of the matrix multiplier 61 are the same as the functions of the matrix multiplier 41. It is the same with the matrix multipliers 58 and 65, which will be described below.

As described in the foregoing, the Jacobian $J(\vec{\alpha})$ is supplied to the output portion of the matrix register 67 in the Jacobian calculating portion 90 and the Jacobian inverse $[J(\vec{\alpha})]^{-1}$ is supplied to the output portion of the matrix register 72 in the Jacobian inverse calculating portion 400. On the other hand, $d\vec{X}$ is supplied from the microcomputer in the host system 4 to the buffer register 60. Calculation of the above described equation (18) is performed in the matrix multiplier 61 and the result of calculation is maintained in the buffer register 62. Thus, coordinate transformation from $d\vec{X}$ to $d\vec{\alpha}$ is performed.

In the above described apparatus for coordinate transformation, the time required for coordinate transformation is less than 1 m sec. Conventionally, the calculation speed was too slow and such coordinate transformation could not be performed in the five or six dimensions. In addition, in case of coordinate transformation using software, the calculation time is approximately 20 m sec, whereas in the present embodiment, the calculation time becomes less than 1 m sec as described above and thus, the control performance is by far improved. This is because calculation speed is extremely high in the process of calculation of Jacobian $J(\alpha)$, the process of calculation of Jacobian inverse $[J(\alpha)]^{-1}$ and the process of coordinate transformation.

Transformation from $d^2\vec{X}$ to $d^2\vec{\alpha}$

Next, a method and apparatus for coordinate transformation from $d^2\vec{X}$ to $d^2\vec{\alpha}$ will be described in the following. This description relates to the coordinate transforming portion 7 shown in FIGS. 1A and 1B. $d^2\alpha$ is needed to solve the inverse problem of an equation of motion to be described below so that feedforward control can be performed.

First, description will be made of a method of transformation from $d^2\vec{X}$ to $d^2\vec{\alpha}$. In feedforward control, motion of each articulation, that is, motion of the end effecter is indicated and the force to be applied for making the motion is calculated and produced. Accordingly, it is necessary to calculate torque $\tau$ by applying an amount for describing the motion in the $\alpha$ system as $d^2\alpha$, $d\alpha$ and $\alpha$, that is, $\ddot{\alpha}$, $\dot{\alpha}$ and $\alpha$, so that the motion can be realized by the torque $\tau$.

For a practical use of a robot, it is convenient to give the motions of an end effecter in the absolute coordinate system. For this reason, the motion of the tip end of the end effecter is defined as $d^2X$, $dX$, that is, $\ddot{X}$, $\dot{X}$ and transformation from $\ddot{X}$, $\dot{X}$ to $\ddot{\alpha}$, $\dot{\alpha}$ is required. Since the transformation from $\dot{X}$ to $\dot{\alpha}$ was always described, transformation from $\ddot{X}$ to $\ddot{\alpha}$ will be described in the following.

First, the matrix $[M]$ is differentiated by time and the equation:

$$\frac{d}{dt}[M] = \sum_i \left(\frac{\partial}{\partial \alpha_i}[M]\right)\frac{d\alpha_i}{dt} \tag{38}$$

is obtained, and this equation is further differentiated by time and the equation:

$$\frac{d^2}{dt^2}[M] = \sum_i \left(\frac{\partial}{\partial \alpha_i}[M]\right)\frac{d^2\alpha_i}{dt^2} + \sum_i \sum_j \left(\frac{\partial^2}{\partial \alpha_i \partial \alpha_j}[M]\right)\frac{d\alpha_i}{dt}\frac{d\alpha_j}{dt} \tag{39}$$

is obtained. Transporting the second term of the right side of this equation to the left side, the equation:

$$\frac{d^2}{dt^2}[M] - \sum_i \sum_j \left(\frac{\partial^2}{\partial \alpha_i \partial \alpha_j}[M]\right)\dot{\alpha}_i\dot{\alpha}_j = \sum_i \left(\frac{\partial}{\partial \alpha_i}[M]\right)\frac{d^2\alpha_i}{dt^2} \tag{40}$$

is obtained. The first term of the left side of the equation (40) is a time differential of second order of the matrix $[M]$, which is an amount related to $\ddot{X}$. The $\dot{\alpha}$ in the second term of the left side can be obtained from $\vec{X} \to \vec{\alpha}$. The right side of the equation (40) can be represented as follows:

$$[J] \times \ddot{\vec{\alpha}} \tag{41}$$

Therefore, if both sides of the equation (40) are multiplied by the Jacobian inverse $[J^{-1}]$ from left, the following equation can be obtained.

$$[J^{-1}] \times \left[\frac{d^2}{dt^2}[M] - \sum_i \sum_j \left(\frac{\partial^2}{\partial \alpha_i \partial \alpha_j}[M]\right)\dot{\alpha}_i\dot{\alpha}_j\right] = \ddot{\vec{\alpha}} \tag{42}$$

Accordingly, calculating each amount in the left side of the equation (42), $\ddot{\vec{\alpha}}$ in the right side can be obtained. Since the equation (42) is represented in the vector form and the equation:

$$\ddot{\vec{\alpha}} = \begin{bmatrix} \ddot{\alpha}_1 \\ \ddot{\alpha}_2 \\ \cdot \\ \cdot \\ \cdot \\ \ddot{\alpha}_6 \end{bmatrix} \tag{43}$$

is established, the equation (43) is a simultaneous equation. Among the amounts in the left side of the equation (43), it is necessary to newly obtain $\Sigma\Sigma$, that is:

$$\sum_i \sum_j \left(\frac{\partial^2}{\partial \alpha_i \partial \alpha_j}[M]\right)\dot{\alpha}_i\dot{\alpha}_j \tag{44}$$

If each term of the equation (44) is represented as $H_{ij}$, the equation (44) becomes as follows:

$$\sum_i \sum_j H_{ij} \tag{46}$$

where the following equations are established.

$$H_{ij} = \left(\frac{\partial^2}{\partial \alpha_i \partial \alpha_j}[M]\right)\dot{\alpha}_i\dot{\alpha}_j \tag{47}$$

$$H_{ij} = H_{ji} \tag{48}$$

Using this $H_{ij}$, the equation (44), that is, the equation (46) is represented concretely as follows:

$$\Sigma\Sigma = 2 \times [\tfrac{1}{2}H_{11} + H_{12} + H_{13} + H_{14} + H_{15} + H_{16} \\ + \tfrac{1}{2}H_{22} + H_{23} + H_{24} + H_{25} + H_{26} \\ + \tfrac{1}{2}H_{33} + H_{34} + H_{35} + H_{36} \\ + \tfrac{1}{2}H_{44} + H_{45} + H_{46} \\ + \tfrac{1}{2}H_{55} + H_{56} \\ + \tfrac{1}{2}H_{66}] \tag{49}$$

where the relation of the equation (48) is utilized.

An example of each term of the equation (49) is represented concretely as follows:

$$H_{11} = (M_1'\dot{\alpha}_1{}^2)M_2M_3M_4M_5M_6$$

$$H_{12} = (M_1''\dot{\alpha}_1)(M_2'\dot{\alpha}_2)M_3M_4M_5M_6$$

The equation (46) including 36 terms is rewritten as the equation (49) including 21 terms using the relation of the equation (48). Between these terms, a certain regularity exists and by combining regularly $M_1$ to $M_6$, $M_1'$ to $M_6'$ and $M_1''$ to $M_6''$, the value of the equation (49) can be obtained relatively easily.

Next, description will be made of an apparatus for transformation from $d^2\vec{X}$ to $d^2\vec{\alpha}$ using the above described method.

Figure 29A:
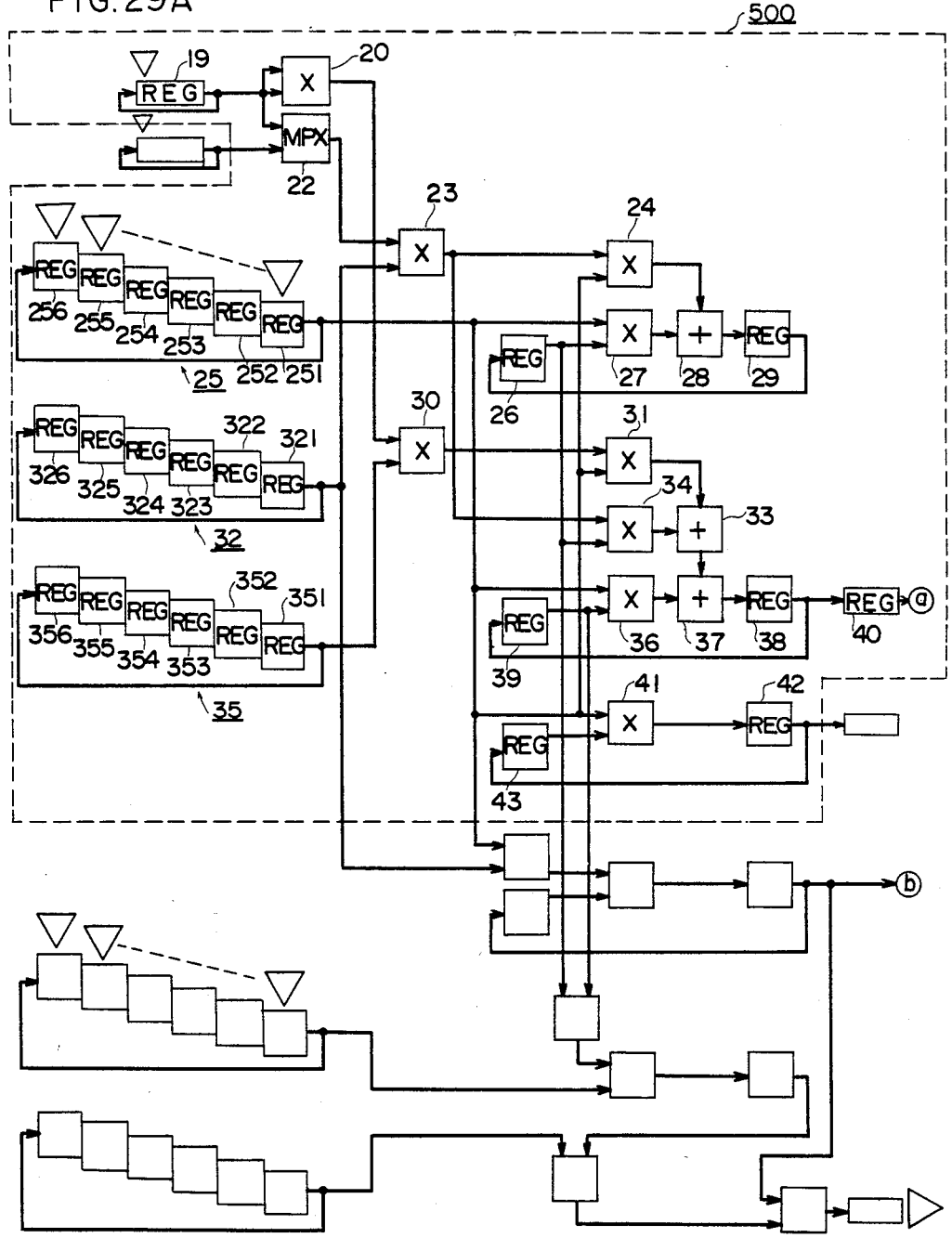
FIG. 29A is a block diagram explaining an apparatus for calculating $\Sigma\Sigma$ shown in the equation (44).
Figure 29B:
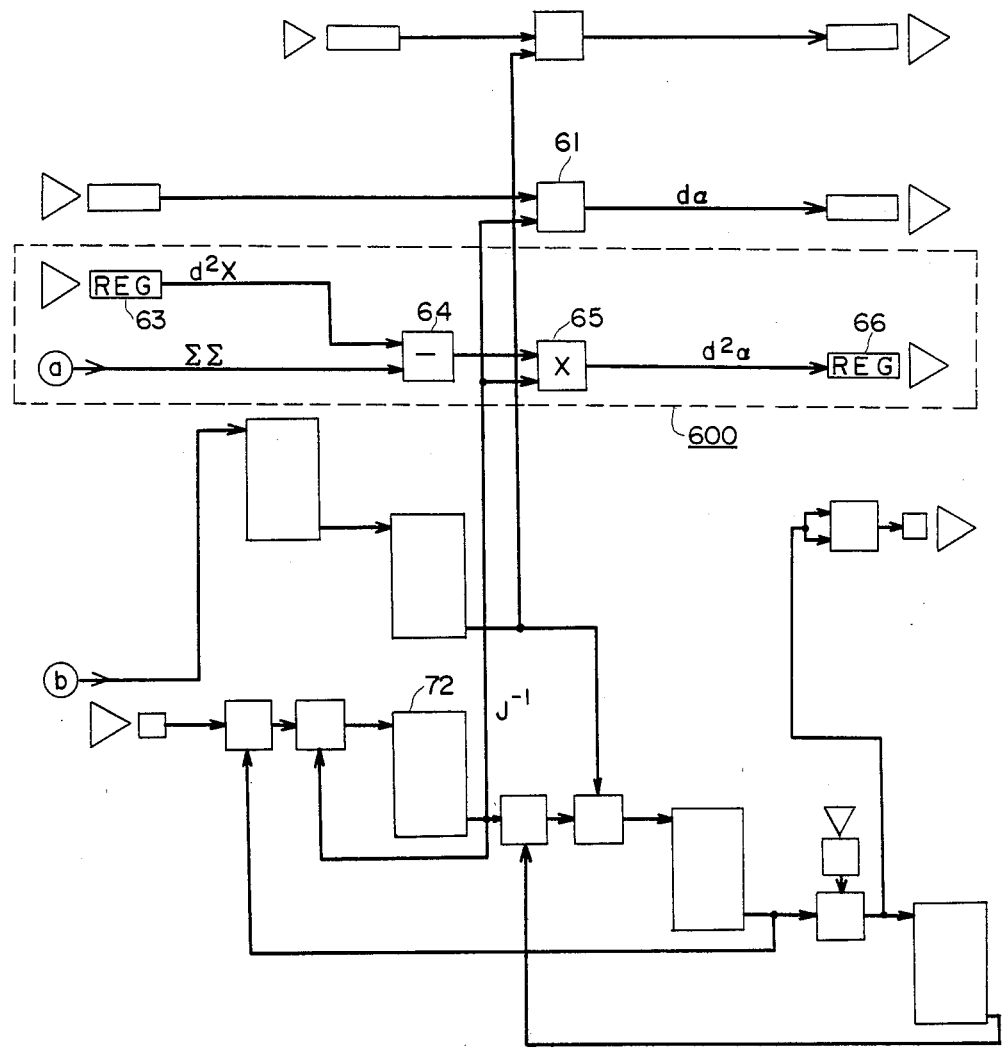
FIG. 29B is a block diagram explaning an apparatus for calculation of $d^2\vec{\alpha}$.

FIG. 29A is a block diagram for explaining an apparatus of calculating ΣΣ shown in the equation (44). This FIG. 29A corresponds to FIG. 2A. The portion surrounded by a dotted line is a ΣΣ calculating portion 500. FIG. 29B is a block diagram for explaining an apparatus of calculating $d^2\vec{\alpha}$. This FIG. 29B corresponds to FIG. 2B. The portion surrounded by a dotted line is a $d^2\vec{\alpha}$ calculating portion 600. The ΣΣ calculating portion 500 and $d^2\vec{\alpha}$ calculating portion 600 constitute the coordinate transforming portion 7 shown in FIGS. 1A and 1B.

Figure 30A:
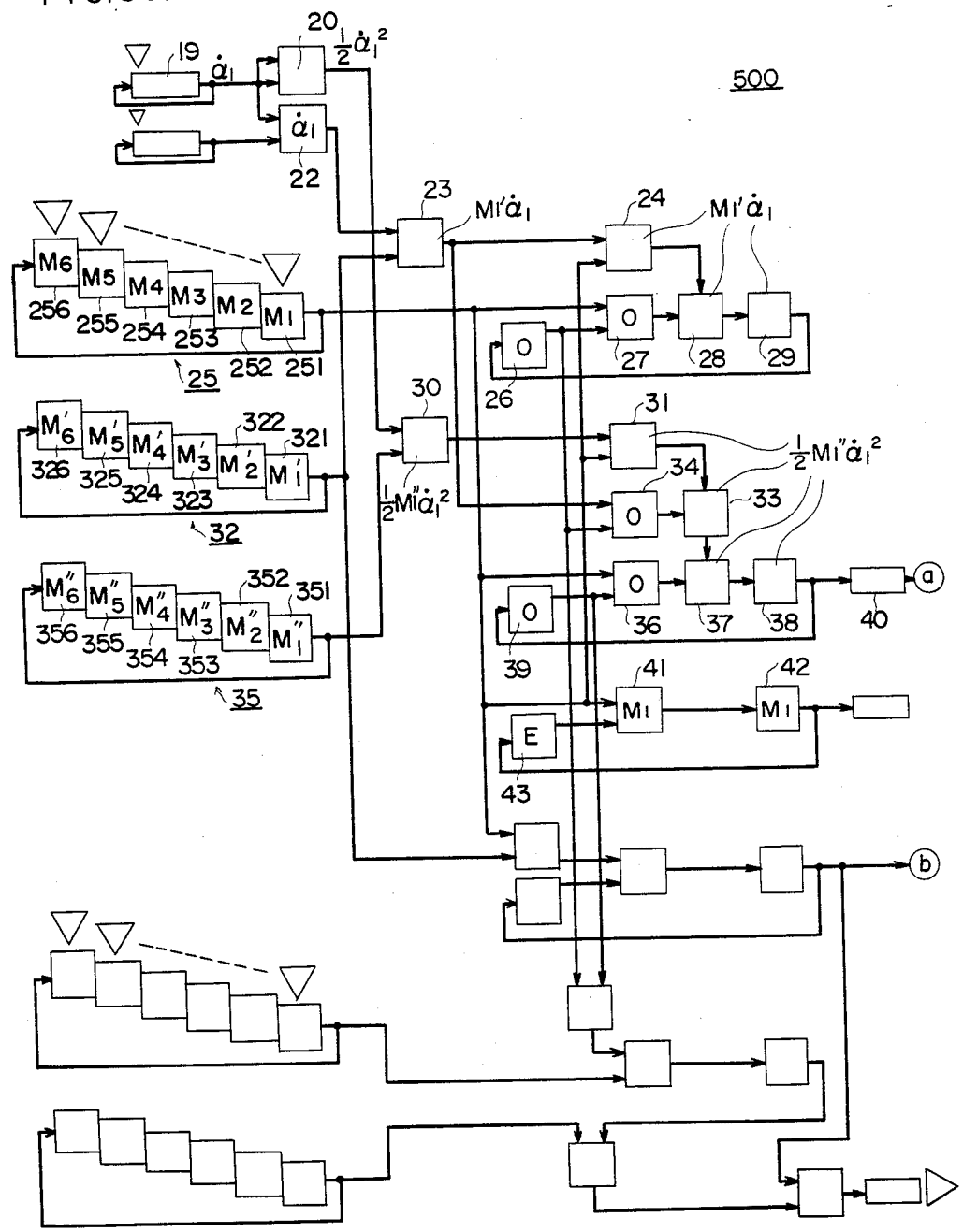

FIGS. 30A and 30B are views for explaining the operation of the ΣΣ calculating portion 500.

First, referring to FIG. 29A, the input portion of the buffer register 19 is connected to the microcomputer (not shown) and the input portion and the output portion thereof are connected with each other. The output portion of the buffer register 19 is connected to two input portions of the matrix multiplier 20 and one input portion of the matrix multiplexer 22. The output portion of the matrix multiplier 20 is connected to one input portion of the matrix multiplier 30. To the other input portion of the matrix multiplier 30, the output portion of the matrix shift register 35 is connected. The output portion of the matrix multiplexer 22 is connected to one input portion of the matrix multiplier 23 and the other input portion of the matrix multiplier 23 is connected to the output portion of the matrix shift register 32. The output portion of the matrix multiplier 23 is connected to one input portion of the matrix multiplier 24 and to one input portion of the matrix multiplier 34. The other input portion of the matrix multiplier 24 is connected to the output portion of the matrix register 43. One input portion of the matrix multiplier 27 is connected to the output portion of the matrix shift register 25 and the other input portion is connected to the output portion of the matrix register 26. Two input portions of the matrix adder 28 are connected to the output portion of the matrix multiplier 24 and the output portion of the matrix multiplier 27, respectively. The output portion of the matrix adder 28 is connected to the input portion of the matrix register 29. The output portion of the matrix register 29 is connected to the input portion of the matrix register 26. Connecting manners of the matrix multipliers 31, 34 and 36, matrix adders 33 and 37 and matrix registers 38 and 38 are the same as described above. To the output portion of the matrix register 38, the input portion of the buffer register 40 is connected.

As to the matrix shift register 25, matrix multiplier 41 and matrix registers 42 and 43, description was given in conjunction with the coordinate transforming portion 5 in FIG. 6. Also, the matrix shift register 32 was described as a part of the Jacobian calculating portion 90 in FIG. 24A. The functions of the matrix shift register 35 are the same as the previously described functions of the matrix shift registers 25 and 32. The matrix multipliers 20, 23, 24, 27, 30, 31, 34 and 36 have the same functions as in the matrix multiplier 41 described above. The functions of the matrix multiplexer 22 are the same as the functions of the matrix multiplexer 45 described above with reference to FIG. 24A. The functions of the matrix adders 28, 33 and 37 are the same as the functions of the matrix adder 71 described above with reference to FIG. 26. The matrix registers 29 and 38 have the same functions as in the matrix register 42 described above. The functions of the matrix registers 26 and 39 are the same as the functions of the matrix register 43 previously described. Also, the functions of the buffer registers 19 and 40 are the same as the functions of the buffer register 44 previously described in conjunction with FIG. 6.

Now, referring to FIG. 29B, the input portion of the buffer register 63 is connected to the microcomputer (not shown) and the output portion thereof is connected to one input portion of the matrix subtractor 64. The other input portion of the matrix subtractor 64 is connected to the output portion of the above described buffer register 40. The output portion of the matrix subtracter 64 is connected to one input portion of the matrix multiplier 65. The other input portion of the matrix multiplier 65 is connected to the output portion of the matrix register 72. The output portion of the matrix multiplier 65 is connected to the input portion of the buffer register 66. The output portion of the buffer register 66 is connected to the microcomputer.

The buffer register 19 maintains $\alpha_1$ to $\alpha_6$ supplied from the microcomputer and rotates them. The functions of the matrix subtracter 64 are the same as the functions of the matrix subtracter 76 described above with reference to FIG. 26. Also, the functions of the buffer register 63, matrix multiplier 65 and buffer register 66 are respectively the same as the functions of the buffer register 60, matrix multiplier 61 and buffer register 62 described above with reference to FIG. 28.

Referring now to FIGS. 30A and 30B, description will be made of the operation in which the above described ΣΣ is loaded in the matrix register 38. The operation described hereinafter is performed in response to the above described signals ∅A and ∅B.

First, referring to FIG. 30A, the operation in the first unit time will be described. $\dot{\alpha}_1$ maintained in the buffer register 19 is given to the matrix multiplier 20, where $\frac{1}{2}\dot{\alpha}_1^2$ is obtained. The matrix multiplexer 22 is made to select the buffer register 19 and this state is maintained hereinafter. Matrices $M_1$ to $M_6$ are loaded from the microcomputer into the matrix registers 251 to 256, respectively, in the matrix shift register 25. Matrices $M_1'$ to $M_6'$ which are time differentials of first order of the matrix M are loaded respectively from the microcomputer into the matrix registers 321 to 326 in the matrix shift register 32. In the same manner, matrices $M_1''$ to $M_6''$ which are time differentials of second order of the matrix M are loaded respectively from the microcomputer into the matrix registers 351 to 356 in the matrix shift register 35. In the matrix multiplier 23, the product of $\dot{\alpha}_1$ from the matrix multiplier 22 and $M_1'$ from the matrix shift register 32 is obtained. In the matrix register 43, the unit matrix E is loaded. Accordingly, $M_1'\dot{\alpha}_1$ is obtained in the matrix multiplier 24. In the matrix register 26, 0 is loaded and accordingly, the result of calculation in the matrix multiplier 27 is 0. In the matrix adder 28, $M_1'\dot{\alpha}_1$ from the matrix multiplier 24 and 0 from the matrix multiplier 27 are added up and the result is loaded in the matrix register 29.

In the matrix multiplier 30, $\frac{1}{2}\dot{\alpha}_1^2$ from the matrix multiplier 20 and $M_1''$ from the matrix shift register 35 are multiplied and the result $\frac{1}{2}M_1''\dot{\alpha}_1^2$ is obtained. In the matrix multiplier 31, the product of $\frac{1}{2}M_1''\dot{\alpha}_1^2$ from the matrix multiplier 30 and the unit matrix E from the matrix register 43 is obtained. One input of the matrix multiplier 34 is 0 from the matrix register 26 and the result of calculation therein is 0. In the same manner, since one input of the matrix multiplier 36 is 0 from the matrix register 39, the result of calculation in the matrix multiplier 36 is 0. Accordingly, $\frac{1}{2}M_1''\dot{\alpha}_1^2$ is loaded in the matrix register 38.

Next, referring to FIG. 30B, operation in the second unit time will be described. The buffer register 19 makes rotate by one block the content maintained therein and outputs $\dot{\alpha}_2$. The matrices loaded in the matrix shift registers 25, 32 and 35 are shifted by one block in the right direction. Accordingly, matrices $M_2$, $M_2'$ and $M_2''$ are loaded in the matrix registers 251, 321 and 351, respectively. $M_1'\dot{\alpha}_1$ which is the result of calculation in the first unit time is loaded from the matrix register 29 into the matrix register 26. In the same manner, $\frac{1}{2}M_1''\dot{\alpha}_1^2$ is loaded in the matrix register 39 and $M_1$ is loaded in the matrix register 43. Then, by the same calculating operation as described above, $M_1M_2'\dot{\alpha}_2 + M_1'\dot{\alpha}_1M_2$ is loaded in the matrix register 29. In the matrix register 38, $\frac{1}{2}M_1M_2''\dot{\alpha}_2^2 + M_1'\dot{\alpha}_1M_2'\dot{\alpha}_2 + \frac{1}{2}M_1''\dot{\alpha}_1^2M_2$ is loaded. In the matrix 42, $M_1M_2$ is loaded.

Subsequently, calculating operation is performed in the same manner, and after the sixth unit time, the above described $\Sigma\Sigma$ is loaded in the matrix register 38.

Then, referring to FIG. 29B, the operation in the subsequent unit time be described. From the microcomputer, $d^2\vec{X}$ is supplied to the buffer register 63 and further to one input portion of the matrix subtracter 64. On the other hand, to the other input portion of the matrix subtracter 64, $\Sigma\Sigma$ obtained in the previous unit time is supplied through the buffer register 40. In the matrix subtracter 64, the calculation of the left side of the above described equation (40) is performed and the result of calculation is supplied to one input portion of the matrix multiplier 65. To the other input portion of the matrix multiplier 65, the Jacobian inverse $J^{-1}$ is supplied from the matrix register 72. The method of calculation of the Jacobian inverse $J^{-1}$ was previously described. In the matrix multiplier 65, the calculation of the previously described equation (42) is performed and the result $d^2\alpha$ is loaded in the buffer register 66. This $d^2\alpha$ is further supplied to the microcomputer. Thus, transformation from $d^2X$ to $d^2\alpha$ is performed.

Equation of Motion

In the following, description will be made of a method and apparatus for solving the inverse problem of an equation of motion using the above described $d\alpha$ and $d^2\alpha$. This description is related to the calculating portion 9 for equation of motion shown in FIGS. 1A and 1B.

The inverse problem of an equation of motion is presented as a procedure for obtaining the force to be applied in the dynamical system with a view to realizing the motion given as a condition in the dynamical system to be considered. In this description, the Lagrange formalism is adopted for purpose of deducing an equation of motion.

In the Lagrange formalism, the Lagragian L is obtained by the following equation (50), assuming that kinetic energy in the dynamical system to be considered is K and potential energy is P.

$$L = K - P \tag{50}$$

In an equation of Lagrange, generalized coordinates exist. Let us assume the generalized coordinates to be $\alpha_i$. If generalized force with respect to this $\alpha_i$ is represented as $F_i$, an equation of motion of Lagrange is established as follows:

$$F_i = \frac{d}{dt}\left(\frac{\partial}{\partial \dot{\alpha}_i} L\right) - \frac{\partial}{\partial \alpha_i} L \quad (i = 1, 2, \ldots, 6) \tag{51}$$

If the inverse problem of the equation of motion is solved, it means that $F_i$ is obtained by calculation of the right side of the equation (51).

Next, K and P will be obtained in a concrete manner and the equation (51) will be represented in a concrete form.

(a) Kinetic Energy K

Assuming that the coordinates of the respective portions of a robot in the absolute coordinate system are represented by the following equation:

$$\vec{x} = \begin{pmatrix} x \\ y \\ z \\ 1 \end{pmatrix} \tag{52}$$

and that the mass of an infinitesimal part of each portion of the robot is represented as dm, the total kinetic energy is obtained by the following equation:

$$K = \tfrac{1}{2}\int dm(\dot{x}^2 + \dot{y}^2 + \dot{z}^2) + R \tag{53}$$

in the above indicated equation (53), R is a term independent of the position and state of the arms of the robot and represents for example, inertia of a rotor and the like. Noticing that the equation:

$$\vec{\dot{x}}\vec{\dot{x}}^T = \begin{pmatrix} \dot{x}^2 & \dot{x}\dot{y} & \dot{x}\dot{z} & 0 \\ \dot{y}\dot{x} & \dot{y}^2 & \dot{y}\dot{z} & 0 \\ \dot{z}\dot{x} & \dot{z}\dot{y} & \dot{z}^2 & 0 \\ 0 & 0 & 0 & 0 \end{pmatrix} \tag{54}$$

is established, the following equation is obtained:

$$K = \tfrac{1}{2}\int dm\, Tr(\vec{\dot{x}}\vec{\dot{x}}^T) + R \tag{55}$$

where Tr indicates a trace (diagonal sum). In this integration, if the coordinates in the i-th portions of the arms in the absolute coordinate system are represented as $\vec{X}_i$, the equation (55) can be rewritten as a sum of integration of each arm and the following equation is obtained.

$$K = \tfrac{1}{2}\sum_i dm\, Tr(\vec{\dot{X}_i}\vec{\dot{X}_i}^T) + R \tag{56}$$

$X_i$ can be represented as follows:

$$\vec{X}_i = M_1 \times M_2 \times \ldots \times M_i \vec{x}_0^i \tag{57}$$

where $\vec{X}_0^i$ is a position vector in the coordinate system fixed to the i-th articulation. Accordingly, if an amount $M^i$ is defined by the equation, $$M^i = M_1 \times M_2 \times \ldots \times M_i \tag{58}$$

the following equation (59) can be established since $x_i = M^i\vec{x}_0^i$.

$$\dot{\vec{X}}_i = \frac{d}{dt}(M^i \vec{X}_0^i) \qquad (59)$$
$$= \sum_j \frac{\partial}{\partial \alpha_j} M^i \vec{X}_0^i \dot{\alpha}_j$$

On the other hand, since R can be represented as $$(\tfrac{1}{2}) \sum_i I a_i \dot{\alpha}_i^2$$

(where $a_i$ is a constant), the following equation is obtained:

$$K = \tfrac{1}{2} \sum_i \int dm\, Tr\left[\left(\sum_j \frac{\partial}{\partial \alpha_j} M^i \vec{X}_0^i \dot{\alpha}_j\right)\left(\frac{\partial}{\partial \alpha_k} M^i \vec{X}_0^i \dot{\alpha}_k\right)^T\right] + \qquad (60)$$
$$\tfrac{1}{2} \sum_i a_i \dot{\alpha}_i^2$$

$$= \tfrac{1}{2} \sum_i Tr\left[\sum_j \sum_k \frac{\partial M^i}{\partial \alpha_j} \dot{\alpha}_j (\int \vec{X}_0^i dm \vec{X}_0^{iT}) \frac{\partial M^{iT}}{\partial \alpha_k} \dot{\alpha}_k\right] + \tfrac{1}{2} \sum_i a_i \dot{\alpha}_i^2$$

$$= \tfrac{1}{2} \sum_i Tr\left[\sum_j \sum_k \frac{\partial M^i}{\partial \alpha_j} Q_j \frac{\partial M^{iT}}{\partial \alpha_k} \dot{\alpha}_j \dot{\alpha}_k\right] + \tfrac{1}{2} \sum_i a_i \dot{\alpha}_i^2$$

where $Q_i$ is a tensor of inertia and defined as follows:

$$Q_i = \int \vec{X}_0^i dm\, \vec{X}_0^{iT} \qquad (61)$$

$$= \begin{pmatrix} \int x^{i2}dm & \int x^i y^i dm & \int x^i z^i dm & \int x^i dm \\ \int x^i y^i dm & \int y^{i2}dm & \int y^i z^i dm & \int y^i dm \\ \int x^i z^i dm & \int y^i z^i dm & \int z^{i2}dm & \int z^i dm \\ \int x^i dm & \int y^i dm & \int z^i dm & \int dm \end{pmatrix}$$

(b) Potential Energy P

As potential energy, gravitational energy can be considered. Accordingly, if the vector indicating gravitational acceleration is $\vec{G}$ and the third component of absolute axes is given in the direction of gravity, the equation:

$$P = \int dm\, \vec{G}^T \vec{x} \qquad (62)$$
$$= \sum_i \int dm\, \vec{G}^T M^i \vec{X}_0^i$$

is established. If a gravitational matrix $Y_i$ is defined by the following equation, $$Y_1 = \begin{pmatrix} \vec{0} \\ \vec{0} \\ g \int dm\, \vec{X}_0^{iT} \\ \vec{0} \end{pmatrix} \qquad (63)$$

$$= \begin{pmatrix} 0 & 0 & 0 & 0 \\ 0 & 0 & 0 & 0 \\ g\int dm x_0^i & g\int dm y_0^i & g\int dm z_0^i & g\int dm \\ 0 & 0 & 0 & 0 \end{pmatrix}$$

P can be represented as follows:

$$P = \sum_i Tr[Y_i M^{iT}] \qquad (64)$$

where g indicates gravitational acceleration.

(c) Lagrange Equation or Motion

Substituting K and P described above in (a) and (b) into the equation (50), L is obtained. Substituting L thus obtained into the equation (51), the following equation is obtained.

$$F_i = \frac{d}{dt}\left(\frac{\partial}{\partial \dot{\alpha}_i} L\right) - \frac{\partial}{\partial \alpha_i} L \qquad (65)$$

$$F_i = \sum_{j=i}^{6} Tr\left[\left(\sum_{k=1}^{j} \sum_{m=1}^{j} \dot{\alpha}_k \dot{\alpha}_m \frac{\partial^2}{\partial \alpha_k \partial \alpha_m} M^j\right) Q_j \frac{\partial M^{jT}}{\partial \alpha_i}\right] +$$

$$\sum_{j=1}^{6} Tr\left[\left(\sum_{k=1}^{j} \ddot{\alpha}_k \frac{\partial}{\partial \alpha_k} M^j\right) Q_j \frac{\partial M^{jT}}{\partial \alpha_i}\right] +$$

$$\sum_{j=1}^{6} Tr\left[Y_j \frac{\partial M^j}{\partial \alpha_i}\right] + I a_i \ddot{\alpha}_i$$

The above equation (65) is summarized as follows:

$$F_i = \sum_{j=1}^{6} Tr\left[A_j Q_j \frac{\partial M^{jT}}{\partial \alpha_i}\right] + \sum_{j=1}^{6} Tr\left[B_j Q_j \frac{\partial M^{jT}}{\partial \alpha_i}\right] + \qquad (66)$$

$$\sum_{j=1}^{6} Tr\left[Y_j \frac{\partial M^{jT}}{\partial \alpha_i}\right] + I a_i \ddot{\alpha}_i$$

where the following conditions are established:

$$A_j = \sum_{k=1}^{j} \sum_{m=1}^{j} \dot{\alpha}_k \dot{\alpha}_m \frac{\partial^2}{\partial \alpha_k \partial \alpha_m} M^j \qquad (67)$$

$$B_j = \sum_{k=1}^{j} \ddot{\alpha}_k \frac{\partial}{\partial \alpha_k} M^j \qquad (68)$$

If the respective terms of the equations (67) and (68) are represented as $R_{km}^{(j)}$, $W_k^{(j)}$, respectively, these equations are represented in a concrete manner as follows:

$$A_1 = 2 \times [\tfrac{1}{2} R_{11}^{(1)}]$$
$$A_2 = 2 \times [\tfrac{1}{2} R_{11}^{(2)} + R_{12}^{(2)} + \tfrac{1}{2} R_{22}^{(2)}]$$
$$A_3 = 2 \times [\tfrac{1}{2} R_{11}^{(3)} + R_{12}^{(3)} + R_{13}^{(3)} + \tfrac{1}{2} R_{22}^{(3)} + R_{23}^{(3)} + \tfrac{1}{2} R_{33}^{(3)}]$$

$$\vdots$$

$$B_1 = W_1^{(1)}$$
$$B_2 = W_1^{(2)} + W_2^{(2)}$$

$$\vdots$$

where the following conditions are given:

$$R_{km}^{(j)} = \dot{\alpha}_k \dot{\alpha}_m \frac{\partial^2}{\partial \alpha_k \partial \alpha_m} M^j$$

-continued $$W_k^{(j)} = \ddot{\alpha}_K \frac{\partial}{\partial \alpha_k} M^j$$

and the relation $W_{km}^{(j)} = R_{mk}^{(j)}$ is established.

In the equation (66), the first term is a term including a quadratic form of a time differential of an angular variable and represents centrifugal force and Coriolis' force; the second term is a term of inertia including a time differential of second order of an angular variable; the third and fourth terms are terms independent of the position and state of the arms of a robot as described above.

If calculation is performed according to the equation (66), generalized force $F_i$ can be obtained. For this calculating operation, which is to be performed by hardware, a method using equations of iteration is adopted. More particularly, if iteration is made by the following equation, $$a_j = a_{j-1} \times M_j, \; a_0 = E \qquad (70)$$

the equation:

$$a_j = M_1 \times M_2 \times \ldots \times M_j \qquad (71)$$

is obtained. If iteration is made with respect to j by the following equation, $$b_j^i = \begin{cases} b_{j-1}^i \times M_j (j \neq i), \; b_0^i = E \\ b_{j-1}^i \times M_j' (j \neq i) \end{cases} \qquad (72)$$

the equation (73) is obtained.

$$b_j^i = M_1 \times M_2 \times \ldots \times M_i' \times \ldots \times M_j \qquad (73)$$

In addition, iteration is made as follows:

$$c_j = c_{j-1} \times M_j + a_{j-1} \times \ddot{\alpha}_j M_j', \; c_0 = 0 \qquad (74)$$

$$c_j^* = c_{j-1}^* \times M_j + a_{j-1} \times \dot{\alpha}_j M_j', \; c_0^* = 0$$

$$d_j = d_{j-1} \times M_j + c_{j-1}^* \times \dot{\alpha}_j M_j' + a_{j-1} \times \frac{1}{2} \dot{\alpha}_j^2 M_j'', \; d_0 = 0$$

Then, the amounts indicated in the respective terms of the equation (66) can be obtained in the same manner, and finally the following equation:

$$F_i = F_i^1 + F_i^2 + F_i^3 + I_{ai}\ddot{\alpha}_i \qquad (75)$$

$$F_i^1 = \sum_{j=1}^{6} Tr(c_j Q_j b_j^{iT})$$

$$F_i^2 = \sum_{j=1}^{6} Tr(d_j Q_j b_j^{iT})$$

$$F_i^3 = \sum_{j=1}^{6} Tr(Y_j b_j^{iT})$$

is obtained, whereby $F_i$ can be calculated. In the equation (75), the term $I_{ai}\ddot{\alpha}_i$ is a term independent of the position and state of the arms of a robot and therefore, this term is not calculated in hardware since the calculation thereof is made by software.

More particularly, for obtaining $F_i$, it is only needed to calculate matrix products in (10) of $F_i^1$, $F_i^2$ and $F_i^3$ of the equation (75) and to obtain a sum by calculating the traces (diagonal sums) thereof. Noticing that the content of (10) to be calculated for obtaining a diagonal sum takes the form of $A \cdot B^T$, it is only needed to take the elements of A and B and to obtain the sum of the products of these elements. This is clearly explained by the following equation.

$$A \cdot B^T = \begin{bmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{bmatrix} \begin{bmatrix} b_{11} & b_{21} & b_{31} & b_{41} \\ b_{12} & b_{22} & b_{32} & b_{42} \\ b_{13} & b_{23} & b_{33} & b_{43} \\ b_{14} & b_{24} & b_{34} & b_{44} \end{bmatrix}$$

$$= \begin{bmatrix} a_{11}b_{11} + a_{12}b_{12} + a_{13}b_{13} + a_{14}b_{14}, & \Delta, & \Delta, & \Delta \\ \Delta, & a_{21}b_{21} + a_{22}b_{22} + a_{23}b_{23} + a_{24}b_{24}, & \Delta, & \Delta \\ \Delta, & \Delta, & a_{31}b_{31} + a_{32}b_{32} + a_{33}b_{33} + a_{34}b_{34}, & \Delta \\ \Delta, & \Delta, & \Delta, & a_{41}b_{41} + a_{42}b_{42} + a_{43}b_{43} + a_{44}b_{44} \end{bmatrix}$$

$$\therefore Tr[A \cdot B^T] = \sum_{j=1}^{4} \sum_{j=1}^{4} a_{ij}b_{ij}$$

Next, description will be made of an apparatus for calculating $F_i^1$, $F_i^2$ and $F_i^3$ in the equation (75). For performing such calculation, all the devices shown previously in FIG. 2A are used. Since almost all the devices in FIG. 2A were already described, only the portions not yet described will be explained hereinafter.

The output portion of the matrix shift register 50 is connected to one input portion of the matrix multiplier 51. The matrix shift register 50 comprises matrix registers 501 to 506 in the same manner as in the previously stated matrix shift registers 25, 32 and 35. The other input portion of the matrix multiplier 51 is connected to the output portion of the matrix multiplier 49 and two input portions of the matrix multiplexer 49 are connected to the output portions of previously stated matrix registers 26 and 39, respectively. The output portion of the matrix multiplier 51 is connected to one input portion of the matrix multiplexer 54 through the matrix register 52. To the other input portion of the matrix multiplexer 54, the output portion of the matrix shift register 53 is connected. The matrix shift register 53 comprises matrix registers 531 to 536, similarly to in the matrix shift register 50. The output portion of the matrix multiplexer 54 is connected to one input portion of the trace calculating circuit 55, the other input portion thereof being connected with the output portion of the above stated matrix register 48. The output portion of the trace calculating portion 55 is connected to the microcomputer (not shown) through the buffer register 56.

The functions of the matrix shift registers 50 and 53 are the same as the functions of the previously stated matrix shift register 25 and the like. The functions of the matrix multiplexers 49 and 54 are the same as the functions of the previously stated matrix multiplexer 45 and the like. The functions of the matrix multiplier 51 are the same as the functions of the previously stated matrix multiplier 41 and the like. The functions of the matrix register 52 are the same as the functions of the above stated matrix register 42 and the like. The functions of the buffer register 56 are the same as those of the above stated buffer register 44 and the like. The trace calculating circuit 55 functions to calculate a trace Tr as shown in the equation (75).

Figure 31A:
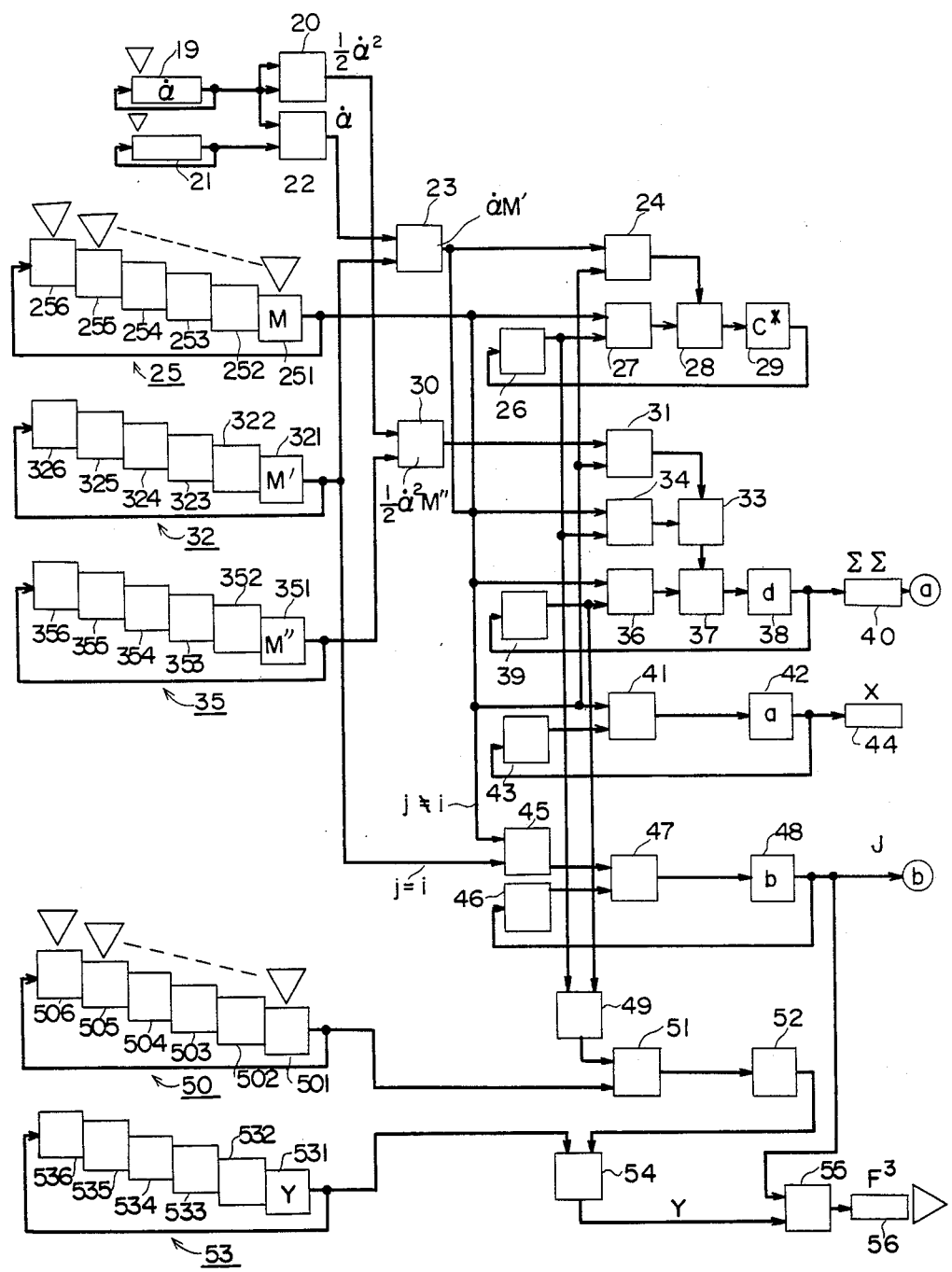
FIGS. 31A to 31C are views explaining the operation of a calculating portion for equation of motion.
Figure 31B:
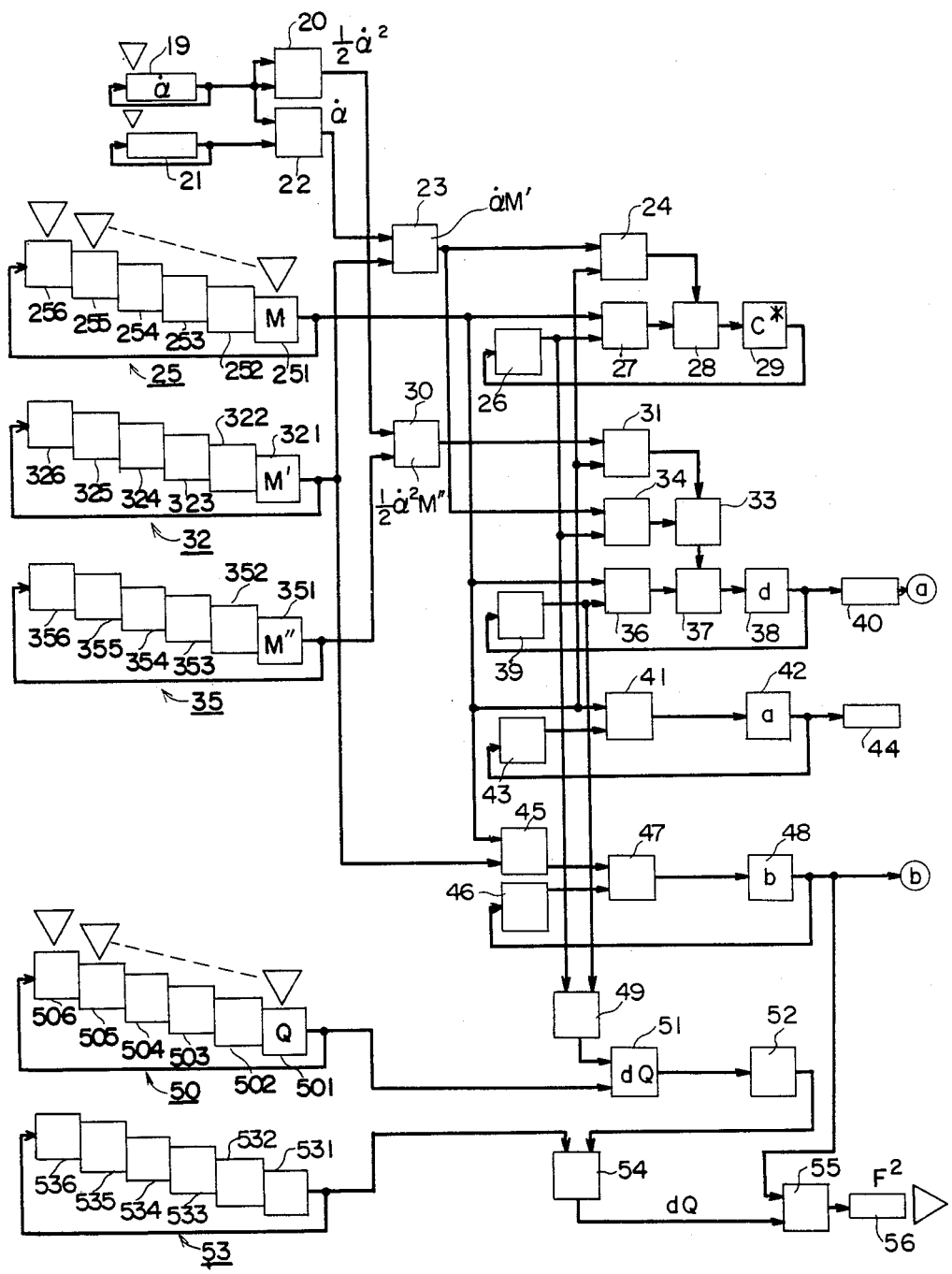
Figure 31C:
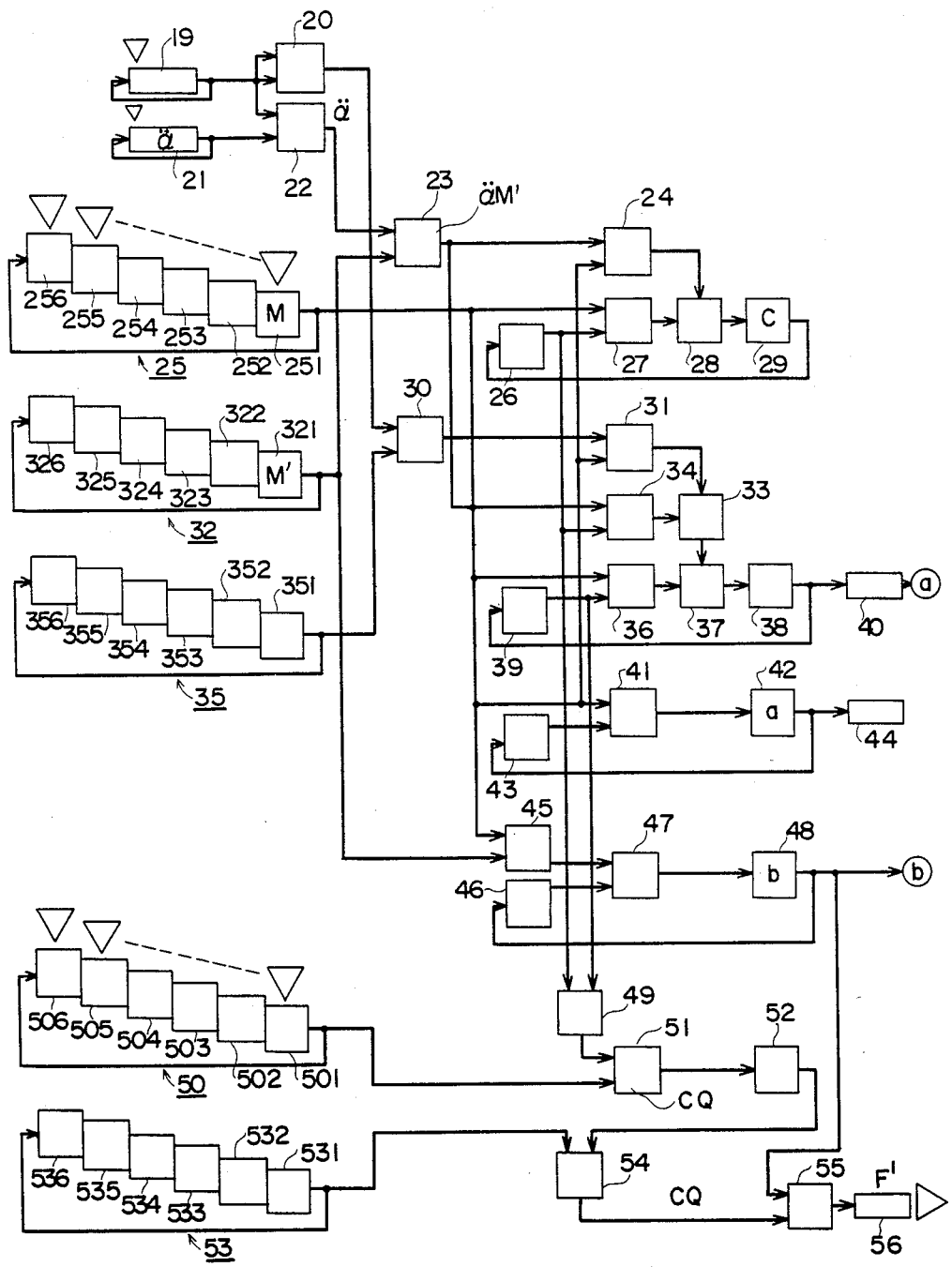

Now, description will be made of the operation for solving the equation of motion. FIGS. 31A to 31C are views for explaining the operation of the calculating portion 9 for equation of motion. The operation of solving the equation of motion comprises three phases.

First, referring to FIG. 31A, the first phase will be described. In this phase, calculation of $F_i^3$ is performed and simultaneously, the above described operations of transformation from $\vec{a}$ to $\vec{X}$, calculation of $\Sigma\Sigma$ for obtaining $d^2\vec{a}$ and calculation of the coefficient of Jacobian J are performed. Thus, the calculation time is made as short as possible. In the matrix shift register 25, the matrix $M_j$ is loaded as described above. In the matrix shift register 32, the previously stated matrix $M_j'$ is loaded. The matrix multiplexer 45 is made to select the matrix shift register 32 in case of $j=i$, and is made to select the matrix shift register 25 in case of $j \neq i$. In the matrix multiplier 47, the matrix $M_j$ and the matrix $M_j'$ are multiplied according to the equation (72) and the result $b_j^i$ is loaded in the matrix register 48. On the other hand, in the matrix shift register 53, the previously described matrix $Y_j$ supplied from the microcomputer (not shown) is loaded. The matrix multiplexer 54 is made to select the matrix shift register 53 and accordingly, $b_j^i$ and $Y_j$ are inputted to the input portion of the trace calculating circuit 55, where calculation of $F_i^3$ of the equation (75) is performed. In this case $F_i^3$ is obtained in 36 clock periods (where $i=1$ to 6 and $j=1$ to 6). In this calculation, since any b is not yet loaded in the matrix register 48 in the first clock period, it is necessary to delay the output of the matrix $Y_j$ by one clock period. For such purpose, a delay circuit may be provided between the matrix shift register 53 and the matrix multiplexer 54, or without such delay circuit, the operation of the matrix shift register 53 may be stopped for one clock period.

Simultaneously with the above described calculating operation, the calculating operation described below is performed. In the buffer register 19, $\ddot{a}$ is loaded and since the matrix multiplexer 22 is made to select the buffer register 19 in this first phase, $\ddot{a}$ is supplied to the matrix multiplier 23. Accordingly, $\ddot{a}_j M_j'$ is calculated in the matrix multiplier 23 and the result is supplied to one input portion of the matrix multiplier 24. To the other input portion of the matrix multiplier 24, the below described $a_{j-1}$ obtained in the previous clock period is supplied from the matrix register 43. To one input portion of the matrix shift register 27, the matrix $M_j$ is supplied from the matrix shift register 25 and to the other input portion thereof, $C_{j-1}^*$ obtained in the previous clock period and maintained in the matrix register 26 is supplied. Consequently, calculation of $c_j^*$ shown in the equation (74) is performed in the matrix multiplier 27 and matrix adder 28 and the result is loaded in the matrix register 29. On the other hand, the matrix $M_j$ is supplied from the matrix shift register 25 to one input portion of the matrix multiplier 41 and $a_{j-1}$ obtained in the previous clock period and maintained in the matrix register 43 is supplied to the other input portion of the matrix shift register 25. Consequently, calculation shown in the equation (70) is performed in the matrix multiplier 41 and the result is loaded in the matrix register 42. The $a_j$ loaded in the matrix register 42 can also be said to be the result of the above described transformation from $\vec{a}$ to $\vec{X}$. In addition, in the matrix multiplier 20, $(\frac{1}{2})\dot{a}^2$ is obtained and this results is supplied to one input portion of the matrix multiplier 30. To the other input portion of the matrix multiplier 30, the matrix $M_j''$ is supplied from the matrix shift register 35. In the same principle as described above, operation for calculating $d_j$ shown in the equation (74) is performed in the matrix multipliers 30 and 31, matrix adder 33, matrix multipliers 34 and 36 and matrix adder 37, and the result is loaded in the matrix register 38. This $d_j$ can also be said to be the previously described $\Sigma\Sigma$.

Next, referring to FIG. 31B, the second phase will be described. In the matrix shift register 50, the previously described tensor of inertia $Q_j$ supplied from the microcomputer (not shown) is loaded. A delay means as described above with reference to FIG. 31A may be provided between the matrix shift register 50 and the matrix multiplier 51, for the reason also described above. The matrix multiplexer 49 is made to select the matrix register 39 in this phase and accordingly, the product of $Q_j$ from the matrix shift register 50 and $d_j$ from the matrix register 39 is obtained in the matrix multiplier 51. The matrix multiplexer 54 is made to select the matrix register 52 in this phase and accordingly, in the trace calculating circuit 55, calculation of $F_i^2$ shown in the equation (75) is performed using $d_j Q_j$ from the matrix multiplexer 54 and $b_j^i$ from the matrix register 48. This operation of calculation of $F_i^2$ is also performed in 36 clock periods (where $i=1$ to 6 and $j=1$ to 6).

Furthermore, referring to FIG. 31C, the third phase will be described. In the buffer register 21, $\ddot{a}_j$ is loaded. In this third phase, the matrix multiplexer 22 is made to select the buffer register 21 and accordingly, $\ddot{a}_j$ is supplied to one input portion of the matrix multiplier 23. To the other input portion of the matrix multiplier 23, $M_j'$ is supplied from the matrix shift register 32. In the sample principle as described above, $c_j$ shown in the equation (74) is loaded in the matrix register 29. In this phase, contrary to the case of the second phase, the matrix multiplexer 49 is made to select the matrix register 26. The matrix multiplexer 54 is made to select the matrix register 52 also in this phase. Accordingly, in the matrix multiplier 51, the product of the tensor of inertia $Q_j$ from the matrix shift register 50 and $c_j$ from the matrix register 26 is obtained and the result $c_j Q_j$ is supplied to one input portion of the trace calculating circuit 55. To the other input portion of the trace calculating circuit 55, $b_j^i$ is supplied from the matrix register 48. In the trace calculating circuit 55, operation for calculating $F_i^1$ shown in the equation (75) is performed. This operation of calculation of $F_i^1$ is also performed in 36 clock periods (where $i=1$ to 6 and $j=1$ to 6).

$F_i^3$, $F_i^2$ and $F_i^1$ obtained by the above described operations are supplied from the buffer register 56 to the microcomputer, where calculation of $F_i$ shown in the equation (75) is performed using these results.

Conventionally, a very long time was required for calculating an equation of motion. Such calculation was impossible in the real time. This is because the articulations interfere complicatedly with each other and coordinate transformation is included in an equation of motion, thus making the time for calculation of an equation of motion extremely long. As a result, solution of an equation of motion could not be practically applied as a means of control. However, in accordance with a method and apparatus in the present embodiment as described above, it becomes possible to solve an equation of motion in the real time.

Transformation from $d\vec{F}$ to $d\vec{\tau}$

In the following, description will be made of a method and apparatus for transformation from $d\vec{F}$ to $d\vec{\tau}$.

This description is related to the coordinate transforming portion 8 shown in FIGS. 1A and 1B.

First, a method of transformation from $d\vec{F}$ to $d\vec{\tau}$ will be described. If the principle of virtual work is applied, work $W_X$ performed by the force $\vec{F}$ applied to the end effecter in the $\vec{X}$ coordinate system and the infinitesimal displacement $d\vec{X}$ caused thereby is equivalent to work $\delta W_x$ performed by the force f applied to each axis in the $\alpha$ coordinate system and the infinitesimal displacement $d\alpha$ caused thereby. More particularly, the following equation is established.

$$\delta W_x = \vec{F}^T \delta \vec{X} = \delta W = \vec{f}^b \cdot d\vec{\alpha} \tag{76}$$

On the other side, $d\vec{X}$ shown previously in the equation (17), is rewritten as follows:

$$d\vec{X} = \vec{J} \cdot d\vec{\alpha} \tag{77}$$

Accordingly, from the above stated equations (76) and (77), the following relation (78) can be established.

$$\vec{f} = \vec{J}^T \cdot \vec{F} \tag{78}$$

In this equation (78), the force $\vec{f}$ in the $\alpha$ coordinate system may be represented as torque $\vec{\tau}$, and since the equation (78) is established also for an infinitesimal amount, the equation (78) can be represented as the following equation (79).

$$d\vec{\tau} = \vec{J}^T \cdot d\vec{F} \tag{79}$$

Therefore, if the calculation of the equation (79) is performed, it follows that transformation from $d\vec{F}$ to $d\vec{\tau}$ is performed.

Figure 32:
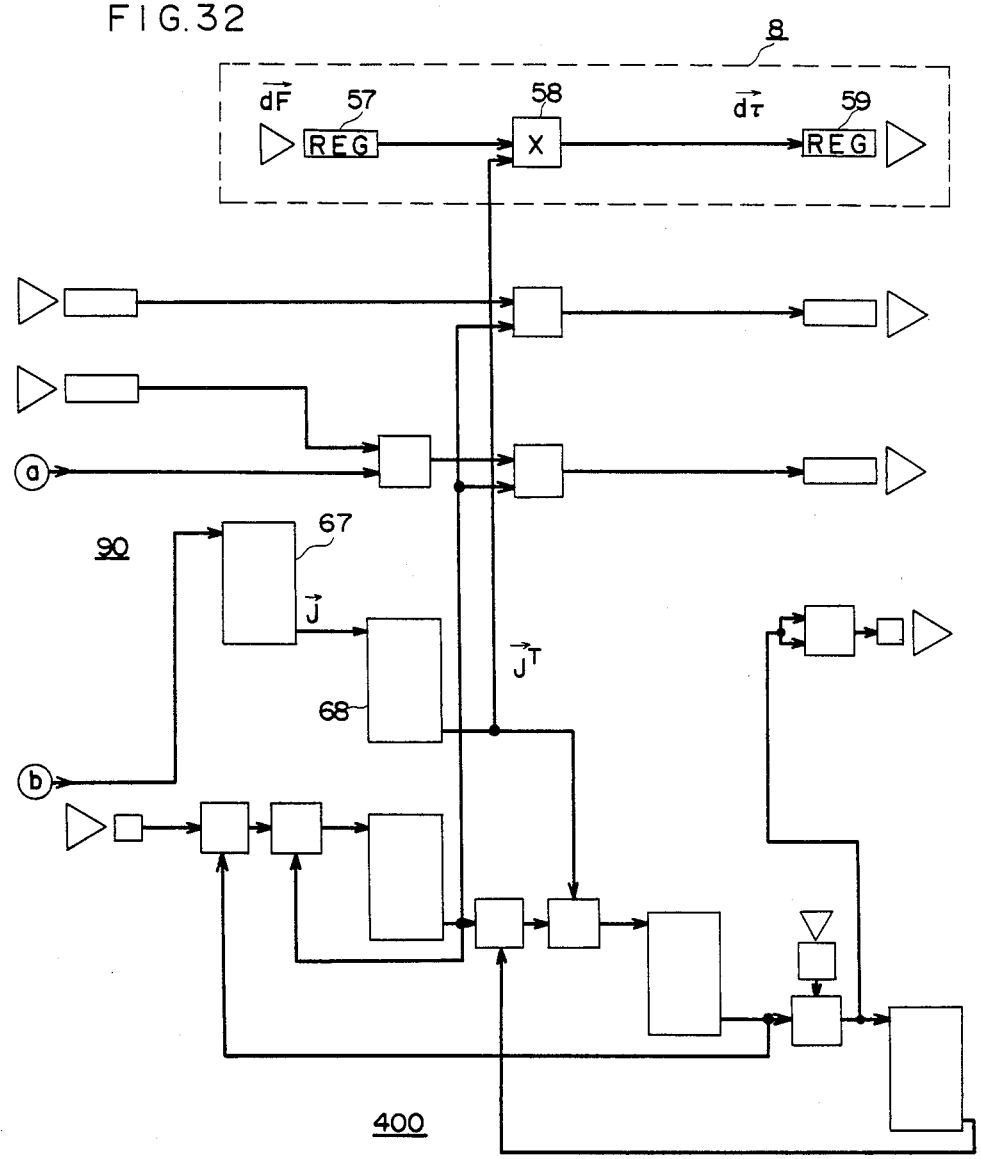
FIG. 32 is a block diagram explaining a portion for coordinate transformation from $d\vec{F}$ to $d\vec{\tau}$.

Then, description will be made of an apparatus for performing transformation as described above. FIG. 32 is a block diagram for explaining the portion 8 for transforming coordinates from $d\vec{F}$ to $d\vec{\tau}$. This FIG. 32 corresponds to FIG. 2B. The coordinate transforming portion 8 comprises a buffer register 57, a matrix multiplier 58 and a buffer register 59. The input portion of the buffer register 57 is connected to the microcomputer (not shown) and the output portion thereof is connected to one input portion of the matrix multiplier 58. The other input portion of the matrix multiplier 58 is connected to the output portion of the matrix register 68 in the previously described Jacobian inverse calculating portion 400. The output portion of the matrix multiplier 58 is connected to the input portion of the buffer register 59 and the output portion of the buffer register 59 is connected to the microcomputer.

As described in the foregoing, the Jacobian $\vec{J}$ is outputted in the output portion of the matrix register 67 in the Jacobian calculating portion 90 and $\vec{J}^T$ which is a transposed matrix of Jabocian $\vec{J}$ in appearance is outputted in the output portion of the matrix register 68 in the Jacobian inverse calculating portion 400. On the other hand, $d\vec{F}$ is supplied from the microcomputer to the buffer register 57. In the matrix multiplier 58, calculation of the above stated equation (79) is performed and the result $d\tau$ is loaded into the buffer register 59 and is also supplied to the microcomputer. Thus, transformation from $d\vec{F}$ to $d\vec{\tau}$ is performed.

The above described coordinate transformation can also be performed with an extremely high speed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A coordinate transforming apparatus for transforming position data in the articular coordinate system in an articulated robot having a plural number N of degrees of freedom into position data in the Cartesian coordinate system, said coordinate transforming apparatus comprising:

coordinate transformation matrix calculating means for obtaining, by the number of degrees of freedom, coordinate transformation matrices $M_j$ in the articular coordinate system corresponding to the motions of said degrees of freedom, a matrix shift register connected to said coordinate transformation matrix calculating means for maintaining said coordinate transformation matrices of the number of degrees of freedom and successively outputting them by shifting them one by one, matrix multiplying means using two matrices as inputs for calculating a product of two matrices inputted thereto and outputting a product matrix, a matrix register connected to said matrix multiplying means for maintaining and outputting said product matrix, said matrix register being able to be initialized to a unit matrix E, one input portion of said matrix multiplying means being connected to the output portion of said matrix shift register and the other input portion thereof being connected to the output portion of said matrix register, and control means connected to said matrix shift register, said matrix multiplying means and said matrix register for controlling them so as to obtain in said matrix multiplying means, a product matrix $a_j$ represented by the following equation:

$$a_j = a_{j-1} \times M_j, \quad a_0 = E$$

where j is an integer from 0 to N and E is a unit matrix.

2. A coordinate transforming apparatus in accordance with claim 1, wherein said matrix shift register comprises matrix registers connected in series by the number of said degrees of freedom.

3. A calculating apparatus for obtaining a Jacobian matrix to be used for transforming speed data in the Cartesian coordinate system in an articulated robot having a plural number N of degrees of freedom into speed data in the articular coordinate system, said calculating apparatus comprising:

coordinate transformation matrix calculating means for obtaining by the number of degrees of freedom, coordinate transformation matrices $M_j$ in the articular coordinate system, corresponding to the motions of said degrees of freedom, differential matrix calculating means for obtaining differential matrices $M_j'$ of said coordinate transformation matrices of each of said degrees of freedom concerning the motions of said degrees of freedom, a first group of a plurality of matrix registers connected with each other for maintaining respectively said coordinate transformation matrices, one matrix register of said first group of matrix registers being connected to said coordinate transformation matrix calculating means, a second group of a plurality of matrix registers connected with each other for maintaining respectively said differential matrices, one matrix register of said second group of matrix registers being connected to said differential matrix calculating means, a plurality of matrix multiplying means connected to determined matrix registers among said first and second groups of matrix registers for performing multiplication of two matrices, and control means connected to said first and second groups of matrix registers and said matrix multiplying means for controlling them so as to obtain a matrix $b_j^i$ represented by the following equation in said matrix multiplying means, $$b_j^i = \begin{cases} b_{j-1}^i \times M_j, j \neq i, \ b_0^i = E \\ b_{j-1}^i \times M_j', j = i \end{cases}$$

where j is an integer from 0 to N, i is an integer from 0 to N and E is a unit matrix.

4. A calculating apparatus in accordance with claim 3, wherein:
said first group of matrix registers forms first and second matrix shift registers which can be shifted in both directions,
said second group of matrix registers forms third and fourth matrix shift registers which can be shifted in both directions,
a matrix register in one end of said first matrix shift register is connected to said coordinate transformation matrix calculating means,
a matrix register in one end of said third matrix shift register is connected to said differential matrix calculating means,
said plurality of matrix multiplying means comprises first to fourth matrix multiplying means,
said first and second matrix multiplying means, combined with matrix registers, respectively calculate a product of the matrix maintained and a newly inputted matrix and form first and second matrix multiplying-maintaining means for newly maintain the result,
said first and second matrix multiplying-maintaining means are connected to a matrix register in the other end of said first matrix shift register and a matrix register in one end of said second matrix shift register,
two input portions of said third matrix multiplying means are connected respectively of a matrix register in the other end of said third matrix shift register and said first matrix multiplying-maintaining means and the output portion thereof is connected to a matrix register in one end of said fourth matrix shift register,
two input portions of said fourth matrix multiplying means are connected respectively to said matrix register in one end of said fourth matrix shift register and said second matrix multiplying-maintaining means and the output portion thereof is connected to said other end of said third matrix shift register, and
said control means shifts reciprocatingly said first to fourth matrix shift registers.

5. A calculating apparatus in accordance with claim 3, wherein:
said first group of matrix registers comprise first to 2Nth matrix registers, the first to Nth matrix registers being interconnected in series, the N+1th to 2Nth matrix registers being also interconnected in series, the N−1th to N+2th matrix registers being interconnected in a loop, and the first matrix registers being connected to said coordinate transformation matrix calculating means,
said second group of matrix registers comprise first to 2N−1th matrix registers interconnected in series, the first matrix register being connected to said differential matrix calculating means, and
said plurality of matrix multiplying means comprise:
first matrix multiplying means two input portions thereof being connected respectively to the N−1th and Nth matrix registers of said first group and the output portion thereof being connected to the Nth matrix register of said first group,
second matrix multiplying means, two input portions thereof being connected respectively to the Nth and N+1th matrix registers of said first group and the output portion thereof being connected to the N+1th matrix register of said first group,
third matrix multiplying means, two input portions thereof being connected respectively to the Nth matrix register of said first group and the N−1th matrix register of said second group and the output portion thereof being connected to the Nth matrix register of said second group, and
fourth matrix multiplying means, two input portions thereof being connected respectively to the N+1th matrix register of said first group and the N+1th matrix register of said second group and the output portion thereof being connected to the Nth matrix register of said second group.

6. A calculating apparatus in accordance with claim 3, wherein:
said first and second groups of matrix registers form respectively first and second matrix circulation registers which can be circulated in both directions,
said plurality of matrix multiplying means comprise first and second matrix multiplying means,
said first matrix multiplying means, combined with a matrix register, calculates a product of the maintained matrix and a newly inputted matrix and forms matrix multiplying-maintaining means for newly maintaining the result,
said matrix multiplying-maintaining means uses the output of one matrix register of said first matrix circulation registers as input,
a circulation loop formed by said second matrix circulation registers is closed through said second matrix multiplying means multiplying the output of one matrix register in the loop and the output of said matrix multiplying-maintaining means, and
said control means changes the directions of said first and second matrix circulation registers and circulates them respectively once.

7. A calculating apparatus in accordance with claim 3, wherein:
said first group of matrix registers comprises first to N+1th matrix registers, the first to Nth matrix registers being interconnected in a loop, the first to N−1th and N+1th matrix registers being also interconnected in a loop, and the first matrix register being connected to said coordinate transformation matrix calculating means, said second group of matrix registers comprises first to Nth matrix registers interconnected in a loop, the first matrix register being connected to said differential matrix calculating means, said plurality of matrix multiplying means comprise:
first matrix multiplying means, two input portions thereof being connected respectively to the N−1th and Nth matrix registers of said first group and the output portion thereof being connected to the Nth matrix register of said first group, second matrix multiplying means, two input portions thereof being connected respectively to the first and N+1th matrix registers of said first group and the output portion thereof being connected to the N+1th matrix register of said first group, third matrix multiplying means, two input portions thereof being connected respectively to the Nth matrix register of said first group and the N+1th matrix register of said second group and the output portion thereof being connected to the Nth matrix register of said second group, and fourth matrix multiplying means, two input portions thereof being connected respectively to the N+1th matrix register of said first group and the first matrix register of said second group and the output portion thereof being connected to the Nth matrix register of said second group.

8. A calculating apparatus for obtaining a Jacobian matrix to be used for transforming speed data in the Cartesian coordinate system in an articulated robot having a plural number N of degrees of freedom into speed data in the articular coordinate system, said calculating apparatus comprising:

coordinate transformation matrix calculating means for obtaining by the number of degrees of freedom, coordinate transformation matrices $M_j$ in the articular coordinate system corresponding to the motions of said degrees of freedom, differential matrix calculating means for obtaining a differential matrix $M_j'$ of said coordinate transformation matrix of each of degree of freedom concerning the motion of each degree of freedom, a first matrix shift register connected to said coordinate transformation matrix calculating means for maintaining said coordinate transformation matrices of the number equal to the number of said degrees of freedom and outputting them successively by shifting them one by one, a second matrix shift register connected to said differential matrix calculating means for maintaining said differential matrices of the number equal to the number of said degrees of freedom and outputting them successively by shifting them one by one, switching means connected to said first and second matrix shift registers for selecting and outputting a matrix from either of them, matrix multiplying means having two input portions for obtaining a product of the matrices respectively inputted thereto so as to output a product matrix, a matrix register connected to said matrix multiplying means for maintaining and outputting said product matrix, said matrix register being able to be initialized to a unit matrix, one input portion of said matrix multiplying means being connected to the output portion of said switching means and the other input portion thereof being connected to the output portion of said matrix register, and control means connected to said first and second matrix shift registers, said switching means, said matrix multiplying means and said matrix register for controlling them so as to obtain a product matrix $b_j^i$ represented by the following equation in said matrix multiplying means, $$b_j^i = \begin{cases} b_{j-1}^i \times M_j, j \neq i, b_0^i = E \\ b_{j-1}^i \times M_j', j = i \end{cases}$$

where j is an integer from 0 to N, i is an integer from 0 to N and E is a unit matrix.

9. A coordinate transforming apparatus for transforming speed data $d\vec{X}$ in the Cartesian coordinate system in an articulated robot having a plural number N of degrees of freedom into speed data $d\vec{\alpha}$ in the articular coordinate system, said coordinate transforming apparatus comprising:

coordinate transformation matrix calculating means for obtaining by the number of degrees of freedom, coordinate transformation matrices $M_j$ in the articular coordinate system, corresponding to the motions of said degrees of freedom, differential matrix calculating means for obtaining differential matrices $M_j'$ of said coordinate transformation matrices for each of said degrees of freedom concerning the motions of each degrees of freedom, a first group of a plurality of matrix registers connected with each other for maintaining respectively said coordinate transformation matrices, one matrix register of said first group of matrix registers being connected to said coordinate transformation matrix calculating means, a second group of a plurality of matrix registers connected with each other for maintaining respectively said differential matrices, one matrix register of said second group of matrix registers being connected to said differential matrix calculating means, a plurality of matrix multiplying means connected to determined matrix registers among said first and second groups of matrix registers for performing multiplication of two matrices, control means connected to said first and second groups of matrix registers and said matrix multiplying means for controlling them so as to obtain a matrix $b_j^i$ represented by the following equation in said matrix multiplying means, $$b_j^i = \begin{cases} b_{j-1}^i \times M_j, j \neq i, b_0^i = E \\ b_{j-1}^i \times M_j', j = i \end{cases}$$

where j is an integer from 0 to N, i is an integer from 0 to N and E is a unit matrix, inverse matrix calculating means connected to one matrix register of said first group of matrix registers and one matrix register of said second group of matrix registers for calculating an inverse matrix of a Jacobian matrix obtained from said product matrix $b_j^i$, and multiplying means connected to said inverse matrix calculating means for obtaining a product of said inverse matrix and said speed data $d\vec{X}$ in the Cartesian coordinate system, whereby said speed data $d\vec{X}$ is transformed into said speed data $d\vec{\alpha}$ in the articular coordinate system.

10. A coordinate transforming apparatus for transforming speed data $d\vec{X}$ in the Cartesian coordinate system in an articulated robot having a plural number N of degrees of freedom into speed data $d\vec{\alpha}$ in the articular coordinate system, said coordinate transforming apparatus comprising:

coordinate transformation matrix calculating means for obtaining by the number of degrees of freedom, coordinate transformation matrices $M_j$ in the articular coordinate system corresponding to the motions of said degrees of freedom, differential matrix calculating means for obtaining a differential matrix $M_j'$ of said coordinate transformation matrix of each of degree of freedom concerning the motion of each degree of freedom, a first matrix shift register connected to said coordinate transformation matrix calculating means for maintaining said coordinate transformation matrices of the number equal to the number of said degrees of freedom and outputting them successively by shifting them one by one, a second matrix shift register connected to said differential matrix calculating means for maintaining said differential matrices of the number equal to the number of said degrees of freedom and outputting them successively by shifting them one by one, switching means connected to said first and second matrix shift registers for selecting and outputting a matrix from either of them, a first matrix multiplying means having two input portions for obtaining a product of the matrices respectively inputted thereto so as to output a product matrix, a first matrix register connected to said first matrix multiplying means for maintaining and outputting said product matrix, said first matrix register being able to be initialized to a unit matrix, one input portion of said first matrix multiplying means being connected to the output portion of said switching means and the other input portion thereof being connected to the output portion of said matrix register, control means connected to said first and second matrix shift registers, said switching means, said first matrix multiplying means and said first matrix register for controlling them so as to obtain a product matrix $b_j^i$ represented by the following equation in said first matrix multiplying means, $$b_j^i = \begin{cases} b_{j-1}^i \times M_j, & j \neq i,\ b_0^i = E \\ b_{j-1}^i \times M_j', & j = i \end{cases}$$

where j is an integer from 0 to N, i is an integer from 0 to N and E is a unit matrix, a second matrix register connected to said first matrix register for maintaining the s-th Jacobian matrix $A^{(s)}$ obtained from said product matrix $b_j^i$, where s is an arbitrary integer, a third matrix register for maintaining an inverse matrix $B^{(s)}$ which is an approximate solution of said matrix $A^{(s)}$, second matrix multiplying means for obtaining a matrix $[A^{(s)}B^{(s)}]$ using said Jacobian matrix $A^{(s)}$ and said inverse matrix $B^{(s)}$, initializing means for applying a unit matrix E, first matrix subtracting means for obtaining a matrix $[E - A^{(s)}B^{(s)}]$ using said matrix $[A^{(s)}B^{(s)}]$ and said unit matrix E, first multiplying-adding means for obtaining a scalar value $V^{(s)}$ by calculating the square summation of the respective elements of said matrix $[E - A^{(s)}B^{(s)}]$, third matrix multiplying means for obtaining a matrix $[A^{T(s)}(E - A^{(s)}B^{(s)})]$ using a transposed matrix $A^{T(s)}$ of said matrix $A^{(s)}$ and said matrix $[E - A^{(s)}B^{(s)}]$, second multiplying-adding means for obtaining a scalar value $U^{(s)}$ by calculating the square summation of the respective elements of said matrix $[A^{T(s)}(E - A^{(s)}B^{(s)})]$, calculating means for obtaining a scalar value $\lambda^{(s)} = V^{(s)}/U^{(s)}$ using said scalar values $V^{(s)}$ and $U^{(s)}$, fourth matrix multiplying means obtaining a matrix $\lambda^{(s)}[A^{T(s)}(E - A^{(s)}B^{(s)})]$ using said matrix $[A^{T(s)}(E - A^{(s)}B^{(s)})]$ and said scalar value $\lambda^{(s)}$, second matrix subtracting means for obtaining, using said matrix $B^{(s)}$ and said matrix $\lambda^{(s)}[A^{T(s)}(E - A^{(s)}B^{(s)})]$, the (s+1)th approximate matrix $[B^{(s+1)}]$ represented by the following equation:

$$[B^{(s+1)}] = [B^{(s)}] - \lambda^{(s)}[A^{T(s)}(E - A^{(s)}B^{(s)})]$$

and fifth matrix multiplying means connected to the output portion of said second matrix subtracting means for obtaining a product of said inverse matrix B and said speed data $d\vec{X}$ in the Cartesian coordinate system, whereby said speed data $d\vec{X}$ is transformed into said speed data $d\vec{\alpha}$ in the articular coordinate system.

* * * * *